(12) United States Patent
Atefi

(10) Patent No.: US 10,321,405 B2
(45) Date of Patent: Jun. 11, 2019

(54) APPARATUSES, METHODS, AND COMPUTER-READABLE MEDIUM FOR COMMUNICATION IN A WIRELESS LOCAL AREA NETWORK

(71) Applicant: Ali Atefi, Los Angeles, CA (US)

(72) Inventor: Ali Atefi, Los Angeles, CA (US)

( * ) Notice: Subject to any disclaimer, the term of this patent is extended or adjusted under 35 U.S.C. 154(b) by 28 days.

(21) Appl. No.: 15/396,729

(22) Filed: Jan. 2, 2017

(65) Prior Publication Data

US 2017/0150525 A1     May 25, 2017

Related U.S. Application Data

(63) Continuation of application No. 15/322,118, filed as application No. PCT/US2016/042487 on Jul. 15, 2016, now Pat. No. 10,045,299.

(Continued)

(51) Int. Cl.
*H04W 74/08*       (2009.01)
*H04B 17/318*      (2015.01)
(Continued)

(52) U.S. Cl.
CPC ...... *H04W 52/0245* (2013.01); *H04B 17/318* (2015.01); *H04W 52/0216* (2013.01);
(Continued)

(58) Field of Classification Search
CPC ......... H04W 52/0216; H04W 52/0219; H04W 52/0229; H04W 52/0245; H04W 52/14;
(Continued)

(56) References Cited

U.S. PATENT DOCUMENTS 9,860,034 B2 *    1/2018   Syed ................ H04L 69/22
10,045,299 B2 *   8/2018   Atefi .............. H04W 52/146
(Continued)

FOREIGN PATENT DOCUMENTS

CN          104284408 A     1/2015
EP          3068183 A1      9/2016
(Continued)

OTHER PUBLICATIONS

Brian Hart, "Link Aware CCA," Sep. 15, 2014, 11-14/1224r0, Institute of Electrical and Electronics Engineers.
(Continued)

*Primary Examiner* — Tri H Phan

(57) ABSTRACT

Various aspects related to various apparatuses, methods, and computer-readable medium are described herein. Some aspects may enable an apparatus to protect downlink (DL) communication(s). Some aspects may enable an apparatus to perform DL communication(s). Some aspects may enable an apparatus to communicate regarding uplink (UL) communication(s). Some aspects may enable an apparatus to perform operation(s) related to an allocation vector. Some aspects may enable an apparatus to perform operation(s) related to random access. Some aspects may enable an apparatus to perform UL communication(s). The written description and appended drawings provide detailed descriptions regarding these and many other aspects.

19 Claims, 6 Drawing Sheets

Related U.S. Application Data

(60) Provisional application No. 62/193,497, filed on Jul. 16, 2015, provisional application No. 62/219,639, filed on Sep. 16, 2015, provisional application No. 62/254,153, filed on Nov. 11, 2015, provisional application No. 62/281,167, filed on Jan. 20, 2016, provisional application No. 62/309,109, filed on Mar. 16, 2016.

(51) Int. Cl.
*H04W 72/04* (2009.01)
*H04W 52/02* (2009.01)
*H04W 52/14* (2009.01)
*H04W 52/24* (2009.01)
*H04W 52/36* (2009.01)
*H04W 74/00* (2009.01)
*H04W 84/12* (2009.01)

(52) U.S. Cl.
CPC ..... *H04W 52/0229* (2013.01); *H04W 52/146* (2013.01); *H04W 52/241* (2013.01); *H04W 52/242* (2013.01); *H04W 52/365* (2013.01); *H04W 72/0473* (2013.01); *H04W 74/0808* (2013.01); *H04W 52/0219* (2013.01); *H04W 72/0446* (2013.01); *H04W 74/006* (2013.01); *H04W 84/12* (2013.01); *Y02D 70/00* (2018.01); *Y02D 70/10* (2018.01); *Y02D 70/14* (2018.01); *Y02D 70/142* (2018.01); *Y02D 70/20* (2018.01); *Y02D 70/22* (2018.01); *Y02D 70/26* (2018.01)

(58) Field of Classification Search
CPC ........... H04W 52/146; H04W 52/241–52/242; H04W 52/365; H04W 72/04; H04W 72/0446; H04W 72/0473; H04W 74/006; H04W 74/08; H04W 74/0808; H04W 84/12; H04B 17/318
See application file for complete search history.

(56) References Cited

U.S. PATENT DOCUMENTS

| | | | | |
|---|---|---|---|---|
| 10,057,884 | B2* | 8/2018 | Atefi | H04W 72/046 |
| 2011/0096796 | A1 | 4/2011 | Zhang et al. | |
| 2011/0255582 | A1 | 10/2011 | Prasad et al. | |
| 2013/0286959 | A1 | 10/2013 | Lou et al. | |
| 2013/0301551 | A1 | 11/2013 | Gosh et al. | |
| 2015/0063111 | A1 | 3/2015 | Merlin et al. | |
| 2015/0063191 | A1 | 3/2015 | Merlin et al. | |
| 2015/0139106 | A1 | 5/2015 | Masuda et al. | |
| 2016/0087775 | A1* | 3/2016 | Hedayat | H04L 1/12 370/329 |
| 2016/0316472 | A1* | 10/2016 | Kwon | H04L 5/0055 |
| 2016/0337100 | A1* | 11/2016 | Yang | H04L 5/0055 |
| 2017/0170937 | A1* | 6/2017 | Chun | H04L 5/0048 |
| 2017/0367118 | A1* | 12/2017 | Choi | H04W 84/12 |
| 2018/0041918 | A1* | 2/2018 | Kim | H04W 28/06 |
| 2018/0139740 | A1* | 5/2018 | Atefi | H04W 72/046 |
| 2018/0198496 | A1* | 7/2018 | Seok | H04B 7/0452 |
| 2018/0213558 | A1* | 7/2018 | Kim | H04W 74/00 |
| 2018/0376423 | A1* | 12/2018 | Atefi | H04W 52/146 |
| 2018/0376460 | A1* | 12/2018 | Atefi | H04W 72/046 |

FOREIGN PATENT DOCUMENTS

| | | |
|---|---|---|
| WO | 2012115432 A2 | 8/2012 |
| WO | 2015068968 A1 | 5/2015 |
| WO | 2016069399 A1 | 6/2016 |
| WO | 2016129979 A1 | 8/2016 |

OTHER PUBLICATIONS

Jun Luo, et al., "Considerations on CCA for OBSS Operation in 802.11ax," Sep. 15, 2014, 11-14/1225r0, Institute of Electrical and Electronics Engineers.
Tianyu Wu, et al., "OFDMA performance analysis," Sep. 15, 2014, 11-14/1227r0, Institute of Electrical and Electronics Engineers.
Minho Cheong, et al., "Issues on 256-FFT per 20MHz," Sep. 15, 2014, 11-14/1228r0, Institute of Electrical and Electronics Engineers.
Alan Jauh, et al., "Dynamic OFDM Symbol Duration," Sep. 15, 2014, 11-14/1229r0, Institute of Electrical and Electronics Engineers.
Reza Hedayat, et al., "On Multi-STA Aggregation Mechanisms in 11ax," Sep. 15, 2014, 11-14/1232r0, Institute of Electrical and Electronics Engineers.
Young Hoon Kwon, et al., "Adaptive CCA for 11ax," Sep. 15, 2014, 11-14/1233r0, Institute of Electrical and Electronics Engineers.
Katsuo Yunoki, et al., "Efficiency Measurement for RTS CTS," Oct. 29, 2014, 11-14/1380r0, Institute of Electrical and Electronics Engineers.
Katsuo Yunoki, et al., "Novel RTS CTS," Oct. 29, 2014, 11-14/1381r0, Institute of Electrical and Electronics Engineers.
Katsuo Yunoki, et al., "Responses to the comments on doc1169," Oct. 29, 2014, 11-14/1382r0, Institute of Electrical and Electronics Engineers.
Myeong-Jin Kim, et al., "Discussion on Frame Structure for Future WLAN Systems with OFDMA," Oct. 31, 2014, 11-14/1397r0, Institute of Electrical and Electronics Engineers.
Masahito Mori, et al., "Performance Analysis of BSS Color and DSC," Nov. 3, 2014, 11-14/1403r0, Institute of Electrical and Electronics Engineers.
Yuichi Morioka, et al., "11aa GCR-BA Performance in OBSS," Nov. 3, 2014, 11-14/1404r0, Institute of Electrical and Electronics Engineers.
Chuck Lukaszewski, et al., "Observed Protocol Violations Caused by DSC for Roaming STAs," Nov. 3, 2014, 11-14/1416r0, Institute of Electrical and Electronics Engineers.
Yongho Seok, et al., "HEW PPDU Transmission Discussion," Nov. 3, 2014, 11-14/1417r0, Institute of Electrical and Electronics Engineers.
Gustav Wikstrom, et al., "DSC and legacy coexistence," Nov. 2, 2014, 11-14/1426r0, Institute of Electrical and Electronics Engineers.
Gustav Wikstrom, et al., "DSC Performance," Nov. 2, 2014, 11-14/1427r0, Institute of Electrical and Electronics Engineers.
Kwang-Cheng Chen, et al., "Clear Channel Assessment for OFDMA PHY," Nov. 2, 2014, 11-14/1428r0, Institute of Electrical and Electronics Engineers.
Young Hoon Kwon, et al., "Issues on UL-OFDMA," Nov. 3, 2014, 11-14/1431r0, Institute of Electrical and Electronics Engineers.
Sigurd Schelstraete, et al., "Protocol and signaling framework for OFDMA," Nov. 2, 2014, 11-14/1433r0, Institute of Electrical and Electronics Engineers.
Jianhan Lui, et al., "Considerations on OBSS Spatial Reuse," Nov. 2, 2014, 11-14/1435r0, Institute of Electrical and Electronics Engineers.
Pengfei Xia, et al., "Overhead Analysis for Simuitaneous Downlink Transmissions," Nov. 2, 2014, 11-14/1436r0, Institute of Electrical and Electronics Engineers.
Jinsoo Ahn, et al., "Efficient Wider Bandwidth Operation in IEEE 802.11ax," Nov. 3, 2014, 11-14/1437r0, Institute of Electrical and Electronics Engineers.
Daewon Lee, et al., "Preamble Considerations in Large Channel Delay Spread Scenarios," Nov. 3, 2014, 11-14/1439r0, Institute of Electrical and Electronics Engineers.
Woojin Ahn, et al., "Considerations on DL OFDMA control mechanism," Nov. 3, 2014, 11-14/1442r0, Institute of Electrical and Electronics Engineers.
Esa Tuomaala, et al., "Adapting CCA and Receiver Sensitivity," Nov. 3, 2014, 11-14/1443r0, Institute of Electrical and Electronics Engineers.

(56) References Cited

OTHER PUBLICATIONS

Leif Wilhelmsson, et al., "Analysis of frequency and power requirements for UL-OFDMA," Nov. 3, 2014, 11-14/1446r0, Institute of Electrical and Electronics Engineers.
Reza Hedayat, et al., "Considerations for Adaptive CCA," Nov. 3, 2014, 11-12/1448r0, Institute of Electrical and Electronics Engineers.
Leif Wilhelmsson, et al., "Frequency selective scheduling in OFDMA," Nov. 3, 2014, 11-14/1452r0, Institute of Electrical and Electronics Engineers.
Minho Cheong, "Proposed 802.11ax specification framework document," Nov. 3, 2014. 11-14/1429r0, Institute of Electrical and Electronics Engineers.
Minho Cheong, "Proposed 802.11ax specification framework—background," Nov. 3, 2014, 11-14/1432r0, Institute of Electrical and Electronics Engineers.
Robert Stacey, et al., "Spec Framework Proposal," Nov. 3, 2014, 11-14/1453r0, Institute of Electrical and Electronics Engineers.
John Son, et al., "Proposed Spec Framework Document for 11ax considering potential tech features," Nov. 3, 2014, 11-14/1447r0, Institute of Electrical and Electronics Engineers.
Yongho Seok, et al., "Downlink OFDMA Protocol Design," Jan. 12, 2015, 11-15/0066r0, Institute of Electrical and Electronics Engineers.
Daewon Lee, et al., "OFDM Numerology for 11ax," Jan. 12, 2015, 11-15/0079r0, Institute of Electrical and Electronics Engineers.
Woojin Ahn, et al., "UL-OFDMA procedure in IEEE 802.11ax," Jan. 12, 2015, 11-15/0091r0, Institute of Electrical and Electronics Engineers.
Jinsoo Ahn, et al., "DL-OFDMA Procedure in IEEE 802.11ax," Jan. 12, 2015, 11-15/0092r0, Institute of Electrical and Electronics Engineers.
Taeyoon Kim, et al., "Discussion on integrated UL-DL MU-MIMO-MAC," Jan. 8, 2015, 11-15/0040r0, Institute of Electrical and Electronics Engineers.
Tomoko Adachi, et al., "Consideration on UL-MU overheads," Jan. 11, 2015, 11-15/0064r0, Institute of Electrical and Electronics Engineers.
Reza Hedayat, et al., "Uplink MU Transmission and Legacy Coexistence," Jan. 12, 2015, 11-15/0086r0, Institute of Electrical and Electronics Engineers.
Leonardo Lanante Jr., et al., "MAC Efficiency Gain of Uplink Multi-user Transmission," Jan. 12, 2015, 11-15/0089r0, Institute of Electrical and Electronics Engineers.
Katsuo Yunoki, et al., "Scalable Channel Utilization," Jan. 8, 2015, 11-15/0035r0, Institute of Electrical and Electronics Engineers.
Minseok Oh, et al., "Structural Format Change," Jan. 8, 2015, 11-15/0037r0, Institute of Electrical and Electronics Engineers.
Yuichi Morioka, et al., "11 aa GCR-BA Performance in OBSS," Jan. 12, 2015, 11-15/0046r0, Institute of Electrical and Electronics Engineers.
Sigurd Schelsstraete, "Uplink RTS/CTS Control," Jan. 11, 2015, 15/005910, Institute of Electrical and Electronics Engineers.
Xiaofei Wang, et al., "MAC Overhead Analysis of MU Transmissions," Mar. 6, 2015, 11-15/0336r0, Institute of Electrical and Electronics Engineers.
Simone Merlin, et al., "Multi-STA BA," Mar. 8, 2015, 11-15/0366r0, Institute of Electrical and Electronics Engineers.
Yonggang Fang, et al., "Beacon Transmisson Issues," Mar. 9, 2015, 11-15/0362r0, Institute of Electrical and Electronics Engineers.
Yusuke Tanaka, et al., "GCR-BA with Measurement Report Performance in OBSS," Mar. 8, 2015, 11-15/0320r0, Institute of Electrical and Electronics Engineers.
Kiseon Ryu, et al., "UL MU Procedure," Mar. 9, 2015, 11-15/0365r0, Institute of Electrical and Electronics Engineers.
Graham Smith, "Enterprise Scenario TPC and DSC," Mar. 12, 2016, 11-16/0350r0, Institute of Electrical and Electronics Engineers.
Junishi Iwatani, et al., "Simulation results of spatial reuse with various MCSs," Mar. 13, 2016, 11-16/0360r0, Institute of Electrical and Electronics Engineers.

Yunbo Li, et al., "Discussion on Spatial Reuse Operations in 11ax," Mar. 14, 2016, 11-16/0382r0, Institute of Electrical and Electronics Engineers.
James Wang, et al., "Adjustment Rules for Adaptive CCA and TPC," Mar. 14, 2016, 11-16/0414r0, Institute of Electrical and Electronics Engineers.
Frank Hsu, et al., "Spatial Re-Use with Adaptive CCA and TPC Simulation," Mar. 14, 2016, 11-16/0403r0, Institute of Electrical and Electronics Engineers.
Kome Oteri, et al., "Power Control for Multi-User Transmission in 802.11ax," Mar. 12, 2016, 11-16/0331r0, Institute of Electrical and Electronics Engineers.
Stephane Baron, et al., "Issue related to unused UL OFDMA RUs," Mar. 13, 2016, 11-16/0333r0, Institute of Electrical and Electronics Engineers.
Leonardo Lanante, et al., "Random Access UL MU Resource Allocation and Indication," Mar. 12, 2016, 11-16/0340r0, Institute of Electrical and Electronics Engineers.
Jing Ma, et al., "Further consideration for MU-RTS/CTS," Mar. 13, 2016, 11-16/0371r0, Institute of Electrical and Electronics Engineers.
Simone Merlin, et al., "Trigger Frame Format," Mar. 14, 2016, 11-16/0379r0, Institute of Electrical and Electronics Engineers.
Arjun Bharadwaj, et al., "Power Control for UL MU," Mar. 14, 2016, 11-16/0413r0, Institute of Electrical and Electronics Engineers.
Yu Wang, "Backoff Procedure Handling Upon TF Reception," May 13, 2016, 11-16/0583r0, Institute of Electrical and Electronics Engineers.
Yu Wang, et al., "Need of SDU Fragmentation to Reduce Padding Ratio in UL-OFDMA Transmission," May 13, 2016, 11-16/0584r0, Institute of Electrical and Electronics Engineers.
Bo Li, et al., "Channel State Estimation based Bidirectional Initialized Random Access," May 12, 2016, 11-16/0588r0, Institute of Electrical and Electronics Engineers.
Mao Yang, et al., "Multi-BSS Association for Edge Users¡ Throughput Improvements," May 12, 2016, 11-16/0590r0, Institute of Electrical and Electronics Engineers.
Alfred Asterjadhi, et al., "BlockAck generation and selection rules," May 16, 2016, 11-16/0616r0, Institute of Electrical and Electronics Engineers.
Jayh Hyunhee Park, et al., "ROM Recovery Rules," May 16, 2016, 11-16/0627r0, Institute of Electrical and Electronics Engineers.
Jayh Hyunhee Park, et al., "Buffer Status Report in HE Control field," May 16, 2016, 11-16/0628r0, Institute of Electrical and Electronics Engineers.
Geonjung Ko, et al., "BSS Color Collision," May 16, 2016, 11-16/0640r0, Institute of Electrical and Electronics Engineers.
Woojin Ahn, et al., "Regarding HE fragmentation," May 16, 2016, 11-16/0641r0, Institute of Electrical and Electronics Engineers.
Liwen Chu, et al., "HE Control Scheduling," May 16, 2016, 11-16/0643r0, Institute of Electrical and Electronics Engineers.
Liwen Chu, et al., "SS Allocation in Trigger," May 16, 2016, 11-16/0644r0, Institute of Electrical and Electronics Engineers.
Liwen Chu, et al., "MU Minimum MPDU Start Spacing," May 16, 2016, 11-16/0645r0, Institute of Electrical and Electronics Engineers.
Liwen Chu, et al., "HE Beamforming Feedback," May 16, 2016, 11-16/0646r0, Institute of Electrical and Electronics Engineers.
Robert Stacey, et al., "In-device Multi-radio Coexistence and UL MU operation," May 16, 2016, 11-16/0657r0, Institute of Electrical and Electronics Engineers.
Hanseul Hon, et al., "EIFS excess problem of Acknowledgement for UL MU procedure," May 16, 2016, 11-16/0674r0, Institute of Electrical and Electronics Engineers.
Yonggang Fang, et al., "comment resolution for CID2383," May 16, 2016, 11-16/0675r0, Institute of Electrical and Electronics Engineers.
Evgeny Khorov, et al., "Channel Access Efficiency," May 16, 2016, 11-16/0684r0, Institute of Electrical and Electronics Engineers.

(56) References Cited

OTHER PUBLICATIONS

Evgeny Khorov, et al., "Random Access RU Allocation in the Trigger Frame," May 16, 2016, 11-16/0582r0, Institute of Electrical and Electronics Engineers.
Patrice Nezou, et al., "Issues related to OCW management," May 16, 2016, 11-16/0591r0, Institute of Electrical and Electronics Engineers.
Stephane Baron, et al., "Follow up on Issue related to unused UL OFDMA Rus," May 16, 2016, 11-16/0592r0, Institute of Electrical and Electronics Engineers.
Po-Kai Huang, et al., "MU-RTS/CTS PHY Format," May 16, 2016, 11-16/0648r0, Institute of Electrical and Electronics Engineers.
Leonardo Lanante, et al., "Adaptive Random Access UL OFDMA," May 16, 2016, 11-16/0661r0, Institute of Electrical and Electronics Engineers.
Jing Ma, "Further consideration on channel access rule to facilitate MU transmission opportunity," May 16, 2016, 11-16/0662r0, Institute of Electrical and Electronics Engineers.
Jing Ma, et al., "Consideration on backoff procedure for UL MU transmission ," May 16, 2016, 11-16/0664r0, Institute of Electrical and Electronics Engineers.
Dzevdann Kapetanovic, et al., "Some Notes on Interference Alignment for Downlink Multi-User MIMO," May 16, 2016, 11-16/0665r0, Institute of Electrical and Electronics Engineers.
Chittabrata Ghosh, et al., "Signaling of Multi-TID Aggregation Limit," May 16, 2016, 11-16/0667r0, Institute of Electrical and Electronics Engineers.
Jing Ma, et al., "Further consideration on channel access rule to facilitate MU transmission opportunity," May 16, 2016, 11-16/0662r0, Institute of Electrical and Electronics Engineers.
Dzevdan Kapetanovic, "Some Notes on Interference Alignment for Downlink Multi-User MIMO," May 16, 2016, 11-16/0665r0, Institute of Electrical and Electronics Engineers.
Chittabrata Ghosh, "Signaling of Multi-TID Aggregation Limit," May 16, 2016, 11-16/0667r0, Institute of Electrical and Electronics Engineers.
Institute of Electrical and Electronics Engineers.
Lei Wang, et al., "Proposed TGax Functional Requirements," May 12, 2014, 11-14/0567r0, Institute of Electrical and Electronics Engineers.
Yonggang Fang, et al., "Requirements for synchronization," Jul. 14, 2014, 11-14/0818r0, Institute of Electrical and Electronics Engineers.
Alireza Babaei, et al., "Coexistence Requirements of 802.11 WLAN and LTE in Unlicensed Spectrum," Jul. 15, 2014, 11-14/0821r0, Institute of Electrical and Electronics Engineers.
Joe Kwak, et al., "Functional Requirements Discussion," Jul. 15, 2014, 11-14/0835r0, Institute of Electrical and Electronics Engineers.
Graham Smith, "DSC Practical Usage," Jun. 25, 2014, 11-14/0779r0, Institute of Electrical and Electronics Engineers.
Dongguk Lim, et al., "Envisioning 11ax phy structure part ii," Jul. 14, 2014, 11-14/0801r0, Institute of Electrical and Electronics Engineers.
Jinyoung Chun, et al., "Consideration on UL MU transmission," Jul. 14, 2014, 11-14/0802rO, Institute of Electrical and Electronics Engineers.
Jinsoo Choi, et al., "Envisioning 11ax phy structure part-I," Jul. 15, 2014, 11-14/0804r0, Institute of Electrical and Electronics Engineers.
Woojin Ahn, et al., "Discussion on dual-link STR in IEEE 802.11ax," Jul. 14, 2014, 11-14/0838r0, Institute of Electrical and Electronics Engineers.
Jinsoo Ahn, et al., "Discussion on OFDMA in IEEE 802.11ax," Jul. 14, 2014, 11-14/0839r0, Institute of Electrical and Electronics Engineers.
Po-Kai Huang, et al., "Performance Evaluation of OBSS Densification," Jul. 14, 2014, 11-14/0832r0, Institute of Electrical and Electronics Engineers.
Frank La Sita, et al., "Residential Scenario Sensitivity and Transmit Power Control Simulation Results," Jul. 14, 2014, 11-14/0833r0, Institute of Electrical and Electronics Engineers.
Gwen Barriac, et al., "CCA Study in Residential Scenario," Jul. 15, 2014, 11-14/0846r0, Institute of Electrical and Electronics Engineers.
John (Ju-Hyung) Son, et al., "Further Considerations on Enhanced CCA for 11ax," Jul. 15, 2014, 11-14/0847r0, Institute of Electrical and Electronics Engineers.
William Carney, et al., "DSC and Legacy Coexistence," Jul. 14, 2014, 11-14/0854r0, Institute of Electrical and Electronics Engineers.
Brian Hart, et al., "Techniques for Short Downlink Frames," Jul. 14, 2014, 11-15/0855r0, Institute of Electrical and Electronics Engineers.
Brian Hart, et al., "Evaluating Dynamic CCA/Receiver Sensitivity Algorithms," Jul. 14, 2014, 11-15/0856r0, Institute of Electrical and Electronics Engineers.
Kaushik Josiam, et al., "Analysis on Frequency Sensitive Multiplexing in WLAN Systems," Jul. 15, 2014, 11-14/0858r0, Institute of Electrical and Electronics Engineers.
Sayantan Choudhury, et al., "Impact of CCA adaptation on spatial reuse in dense residential scenario," Jul. 15, 2014, 11-14/0861r0, Institute of Electrical and Electronics Engineers.
Johan Soder, et al., "UL & DL DSC and TPC MAC simulations," Jul. 15, 2014, 11-14/0868r0, Institute of Electrical and Electronics Engineers.
Sean Coffey, et al., "A Protocol Framework for Dynamic CCA," Jul. 15, 2014, 11-14/0872r0, Institute of Electrical and Electronics Engineers.
James Wang, et al., "Increased Network Throughput with TX Channel Width Related CCA and Rules," Jul. 15, 2014, 11-14/0880r0, Institute of Electrical and Electronics Engineers.
Nihar Jindal. et al., "Performance Gains from CCA Optimizations," Jul. 15, 2014, 11-14/0889r0, Institute of Electrical and Electronics Engineers.
Yonggang Fang, et al., "TGax Functional Requirement Discussion," Sep. 15, 2014, 11-14/1167r0, Institute of Electrical and Electronics Engineers.
Masahito Mori, et al., "Functional Requirements Discussions on Coex with Legacy STAs," Sep. 14, 2014, 11-14/1170r0, Institute of Electrical and Electronics Engineers.
Lei Wang, et al., "Proposed 802.11ax Functional Requirements," Sep. 12, 2014 11-14/1009r0, Institute of Electrical and Electronics Engineers.
Lin Yingpei, et al., "Considerations of Functional Requirements Documents," Jul. 15, 2014, 11-14/0920r0, Institute of Electrical and Electronics Engineers.
Zhou Lan, et al., "Discussion on functional requirement," May 13, 2014,11-14/0636r0, Institute of Electrical and Electronics Engineers.
Joseph Levy, "Requirements Discussion," Sep. 15, 2014, 11-14/1234r0, Institute of Electrical and Electronics Engineers.
Leif Wilhelmsson, et al., "Impact of correlated shadowing in 802.11ax system evaluations," Sep. 15, 2014, 11-14/1214r0, Institute of Electrical and Electronics Engineers.
Jianhan Liu, et al., "Doppler Effect Evaluation for 11ax," Sep. 15, 2014, 11-14/1222r0, Institute of Electrical and Electronics Engineers.
Pengfei Xia, et al., "Comparisons of Simultaneous Downlink Transmissions," Sep. 15, 2014, 11-14/1186r0, Institute of Electrical and Electronics Engineers.
Peng Shao, et al., "WLAN Frame Coiiision Information," Sep. 5, 2014, 11-14/1106r0, Institute of Electrical and Electronics Engineers.
Marcin Filo, et al., "On TGax Scenario 4 channel model," Sep. 11, 2015, 11-14/1048r0, Institute of Electrical and Electronics Engineers.
Yonggang Fang, et al., "TGax PHY Frame Structure Discussion," Sep. 15, 2014, 11-14/1168r0, Institute of Electrical and Electronics Engineers.
Katsuo Yunoki, "DL-FDMA Considerations," Sep. 13, 2014, 11-14/1169r0, Institute of Electrical and Electronics Engineers.

(56) References Cited

OTHER PUBLICATIONS

Masahito Mori, et al., "DSC Simulation Results for Scenario 3," Sep. 14, 2014, 11-14/1171r0, Institute of Electrical and Electronics Engineers.
Yuichi Morioka, et al., "Multicast Performance in OBSS," Sep. 14, 2014, 11-14/1172r0, Institute of Electrical and Electronics Engineers.
Hyunduk Kang, et al., "Inter-BSS interference in WLANs," Sep. 15, 2014, 11-14/1178r0, Institute of Electrical and Electronics Engineers.
Gwangzeen Ko, et al., "Considerations for partial band interference between WLAN systems," Sep. 12, 2014, 11-14/1179r0, Institute of Electrical and Electronics Engineers.
Meng Yang, et al., "Discussions on Interference between TD-LTE & WLAN around 2.4GHz Band," Sep. 15, 2014, 11-14/1180r0, Institute of Electrical and Electronics Engineers.
John Son, et al., "Measurements on A-MPDU performances under various channel conditions," Sep. 15, 2014, 11-14/1181r0, Institute of Electrical and Electronics Engineers.
Kaiying LV, "frame-exchange-control-for-uplink-multi-user-transmission," Sep. 15, 2014, 11-14/1190r0, Institute of Electrical and Electronics Engineers.
Gwen Barriac, et al., "CCA Study in Residential Scenario—Part 2," Sep. 15, 2014, 11-14/1199r0, Institute of Electrical and Electronics Engineers.
Laurent Cariou, et al., "OBSS Reuse mechanism which preserves fairness," Sep. 15, 2014, 11-14/1207r0, Institute of Electrical and Electronics Engineers.
Jinsoo Ahn, et al., "MAC considerations on 802.11ax OFDMA," Sep. 15, 2014, 11-14/1208r0, Institute of Electrical and Electronics Engineers.
Woojin Ahn, "Multiple RF operation for 802.11ax OFDMA," Sep. 15, 2014, 11-14/1209r0, Institute of Electrical and Electronics Engineers.
Yongho Seok, et al., "HEW PPDU Format for Supporting MIMO-OFDMA," Sep. 16, 2014, 11-14/1210r0, Institute of Electrical and Electronics Engineers.
Yongho Seok, et al., "Ack Procedure for OFDMA," Sep. 15, 2014, 11-14/1211r0, Institute of Electrical and Electronics Engineers.
Jae Seung Lee, et al., "Consideration on Coexistence between LTE-U and 802.11 WLAN," Sep. 15, 2014, 11-14/1216r0, Institute of Electrical and Electronics Engineers.
IEEE Standard for Information Technology—Telecommunications and information exchange between systems Local and metropolitan area networks—Specific requirements, Part 11: Wireless LAN Medium Access Control (MAC) and Physical Layer (PHY) Specifications, IEEE Computer Society, Mar. 29, 2013, pp. 1-1400, IEEE, New York, NY.
Supplement to IEEE Standard for Information Technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band, IEEE Computer Society, Jun. 12, 2003, pp. 1-96, IEEE, New York, NY.
IEEE Standard for Information Technology—Telecommunications and information exchange between systems—Local and metropolitan area networks—Specific requirements—Part 11: Wireless LAN Medium Access Control (MAC) and Physical Layer (PHY) Specifications: Amendment 5: Enhancements for Higher Throughput, IEEE Computer Society, Oct. 29, 2009, pp. 1-536, IEEE, New York, NY.
Draft Standard for Information Technology—Telecommunications and information exchange between systems—Local and metropolitan area networks—Specific requirements—Part 11: Wireless LAN Medium Access Control(MAC) and Physical Layer (PHY) specifications—Amendment 4: Enhancements for Very High Throughput for Operation in Bands below 6 GHz, Jan. 2013, pp. 1-440, IEEE, New York, NY.
IEEE Standard for Information Technology—Telecommunications and information exchange between systems—Local and metropolitan area networks—Specific requirements—Part 11: Wireless LAN Medium Access Control (MAC) and Physical Layer (PHY) Specifications: Amendment 3: Enhancements for Very High Throughput in the 60 GHz Band, Dec. 28, 2012, pp. 1-628, IEEE, New York, NY.
IEEE Standard for Information Technology—Telecommunications and information exchange between systems—Local and metropolitan area networks—Specific requirements—Part 11: Wireless LAN Medium Access Control (MAC) and Physical Layer (PHY) Specifications: Amendment 1: Prioritization of Management Frames, Apr. 6, 2012, pp. 1-52, IEEE, New York, NY.
IEEE Standard for Information Technology—Telecommunications and information exchange between systems—Local and metropolitan area networks—Specific requirements—Part 11: Wireless LAN Medium Access Control (MAC) and Physical Layer (PHY) Specifications: Amendment 2: MAC Enhancements for Robust Audio Video Streaming, May 29, 2012, pp. 1-162, IEEE, New York, NY.
Proposed TGax draft specification, Mar. 2, 2016, pp. 1-160, IEEE, New York, NY.
IEEE Standard for Information Technology—Telecommunications and information exchange between systems—Local and metropolitan area networks—Specific requirements—Part 11: Wireless LAN Medium Access Control (MAC) and Physical Layer (PHY) Specifications: Amendment 6: Enhancements for high efficiency in frequency bands between 1 GHz and 6 GHz, Mar. 17, 2016, pp. 1-221, IEEE, New York, NY.
IEEE Standard for Information Technology—Telecommunications and information exchange between systems—Local and metropolitan area networks—Specific requirements—Part 11: Wireless LAN Medium Access Control (MAC) and Physical Layer (PHY) Specifications: Amendment 6: Enhancements for high efficiency in frequency bands between 1 GHz and 6 GHz, Jun. 6, 2016, pp. 1-227, IEEE, New York, NY.
Evgeny Khorov, et al., "Beacon Collision Avoidance," Jan. 17, 2016, 11-16/0017r0, Institute of Electrical and Electronics Engineers.
Evgeny Khorov, et al., "TDMA for Eliminating Hidden Station Effect in Dense Networks," 1 Jan. 7, 2016, 11-16/0018r0, Institute of Electrical and Electronics Engineers.
Xiaofei Wang, et al., "Follow Up for Multi-STA BA for SU Transmissions," Jan. 18, 2016, 11-16/0028r0, Institute of Electrical and Electronics Engineers.
Xiaofei Wang, et al., "TXOP Truncation Enhancement," Jan. 18, 2016, 11-16/0029r0, Institute of Electrical and Electronics Engineers.
Geonjung Ko, et al., "BSS Color Settings for a Multiple BSSID Set," Jan. 18, 2016, 11-16/0042r0, Institute of Electrical and Electronics Engineers.
Alfred Asterjadhi, et al., "Fragmentation for MU frames—Follow up on acks," Jan. 18, 2016, 11-16/0050r0, Institute of Electrical and Electronics Engineers.
David Xun Yang, et al., "Response Give Trigger Type," Jan. 17, 2016, 11-16/0051r0, Institute of Electrical and Electronics Engineers.
Liwen Chu, et al., "BSS Color and Multiple BSSID," Jan. 18, 2016, 11-16/0068r0, Institute of Electrical and Electronics Engineers.
Liwen Chu, et al., "Multi-TID A-MPCU in MU Transmission," Jan. 18, 2016, 11-16/0069r0, Institute of Electrical and Electronics Engineers.
Jinsoo Ahn, et al., "NAV cancellation issues on MU protection," Jan. 18, 2016, 11-16/0087r0, Institute of Electrical and Electronics Engineers.
Sean Coffey, et al., "High Efficiency Medium Access via Rosters," Jan. 18, 2016, 11-16/0102r0, Institute of Electrical and Electronics Engineers.
Lei Wang; et al., "Proposed UL MU CS Rules," Jan. 18, 2016, 11-16/0031r0, Institute of Electrical and Electronics Engineers.
Young Hoon Kwon, et al., "Protection using MU RTS/CTS," Jan. 17, 2016, 11-16/0048r0, Institute of Electrical and Electronics Engineers.

(56) References Cited

OTHER PUBLICATIONS

Kaiying IV, et al., "UL MU CCA Response," Jan. 18, 2016, 11-16/0054r0, Institute of Electrical and Electronics Engineers.
Kiseon Ryu, et al., "Indication for UL MU Carrier Sensing," Jan. 18, 2016, 11-16/0057r0, Institute of Electrical and Electronics Engineers.
Tomoko Adachi, et al., "Duration/ID field in UL-MU," Jan. 18, 2016, 11-16/0065r0, Institute of Electrical and Electronics Engineers.
Joonsuk Kim, et al., "Views on UL-MU Features," Jan. 18, 2016, 11-16/0066r0, Institute of Electrical and Electronics Engineers.
Liwen Chu, et al., "MAC Padding in Trigger Frame," Jan. 18, 2016, 11-16/0067r0, Institute of Electrical and Electronics Engineers.
Woojin Ahn, et al., "Congestion control for UL MU random access," Jan. 18, 2016, 11-16/0085r0, Institute of Electrical and Electronics Engineers.
Narendar Madhavan, et al., "Regarding HE NDPA frame for DL Sounding Sequence ," Jan. 18, 2016, 11-16/0091r0, Institute of Electrical and Electronics Engineers.
Reza Hedayat; et al., "Recipient-aware Spatial Reuse," Jan. 18, 2016; 11-16/0060r0, Institute of Electrical and Electronics Engineers.
Jinsoo Ahn, et al., "Simultaneous NAK for MU GCR-BA," Mar. 14, 2016, 11-16/0345r0, Institute of Electrical and Electronics Engineers.
Alfred Asterjadhi, et al., "Fragmentation for MU frames—Follow up on parameters," Mar. 13, 2016, 11-16/0347r0, Institute of Electrical and Electronics Engineers.
Woojin Ahn, et al., "Considerations on MU initial link setup," Mar. 14, 2016, 11-16/0352r0, Institute of Electrical and Electronics Engineers.
Hanseul Hong, et al., "MU-RTS/CTS for TWT Protection," Mar. 14, 2016, 11-16/0353r0, Institute of Electrical and Electronics Engineers.
Jeongki Kim, et al., "Ack Policy of UL MU frame," Mar. 13, 2016. 11-16/0361r0, Institute of Electrical and Electronics Engineers.
Liwen Chu, et al., "Management Ack," Mar. 14, 2016, 11-16/0359r0, Institute of Electrical and Electronics Engineers.
Simone Merlin, et al., "Sounding Sequences Clarifications," Mar. 13, 2016, 11-16/0377r0, Institute of Electrical and Electronics Engineers.
Evgeny Khorov, et al., "Results for beacon collisions," Mar. 2, 2016, 11-16/0297r0, Institute of Electrical and Electronics Engineers.
John Son, et al., "Issues on BSS Color Bits Collision," Mar. 14, 2016, 11-16/0396r0, Institute of Electrical and Electronics Engineers.
Hansuel Hong, et al., "MU-RTS/CTS for TWT Protection," Mar. 14, 2016, 11-16/0353r0, Institute of Electrical and Electronics Engineers.
Liwen Chu, et al., "maximal A-MPDU size," Mar. 14, 2016, 11-16/0358r0, Institute of Electrical and Electronics Engineers.
Chittabrata Ghosh, et al., "Multi-TID Aggregation Limit," Mar. 13, 2016, 11-16/0362r0, Institute of Electrical and Electronics Engineers.
Xiaofei Wang, et al., "Multi-STA BA Design," Mar. 13, 2016, 11-16/0365r0, Institute of Electrical and Electronics Engineers.
Zhou Lan, et al., "MAC padding options for legacy trigger frame," Mar. 14, 2016, 11-16/0368r0, Institute of Electrical and Electronics Engineers.
Zhou Lan, et al., "M-BA aggregated trigger frame," Mar. 14, 2016, 11-16/0369r0, Institute of Electrical and Electronics Engineers.
Simone Merlin, et al., "Extended BA Bitmap," Mar. 14, 2016, 11-16/0378r0, Institute of Electrical and Electronics Engineers.
Yunbo Li, et al., "RU Signaling in Trigger Frame," Mar. 14, 2016, 11-1610383r0, Institute of Electrical and Electronics Engineers.
Dengyu Qiao, et al., "BlockAck-Bitmap," Mar. 13, 2016, 11-16/0404r0, Institute of Electrical and Electronics Engineers.
Evgeny Khorov, et al., "Considerations on Trigger Frame for Random Access Procedure," Mar. 13, 2016, 11-16/0399r0, Institute of Electrical and Electronics Engineers.
Graham Smith, "Enterprise Scenario DSC and Color," Jan. 29, 2016, 11-16/0212r0, Institute of Electrical and Electronics Engineers.
Graham Smith, "DSC Proposed Text," Mar. 8, 2016, 11-16/0310r0, Institute of Electrical and Electronics Engineers.
Young Hoon Kwon, et al., "Protection for MU transmission," Jul. 13, 2015, 11/15/0806r0, Institute of Electrical and Electronics Engineers.
Kome Oteri, et al., "Further Analysis of Feedback and Frequency Selective Scheduling (FSS) for TGax OFDMA," Jul. 13, 2015, 11-15/0818r0, Institute of Electrical and Electronics Engineers.
Reza Hedayat, et al., "Uplink ACK and BA Multiplexing," Jul. 13, 2015, 11-15/0829r0, Institute of Electrical and Electronics Engineers.
Yonggang Fang, et al., "UL MU OFDMA analysis," Jul. 12, 2015, 11-15/0843r0, Institute of Electrical and Electronics Engineers.
Leonardo Lanante, et al., "Transmission interval of Trigger Frames," Jul. 13, 2015, 11-15/0852r0, Institute of Electrical and Electronics Engineers.
Tomoko Adachi, et al., "DL OFDMA Signalling," Jul. 13, 2015, 11-15/0854r0, Institute of Electrical and Electronics Engineers.
Tomoko Adachi, "How to collect Sta▲)f Tx demands for UL MU,") Jul. 13, 2015, 11-15/0855r0, Institute of Electrical and Electronics Engineers.
Sigurd Schelstraete, "MU BFee Interference channel feedback," Jul. 13, 2015, 11-15/0858r0, Institute of Electrical and Electronics Engineers.
Sigurd Schelstraete, "A mechanism for incremental updates to MU precoding," Jul. 13, 2015, 11-15/0859r0, Institute of Electrical and Electronics Engineers.
Po Kai Huang, et al.,"MU-RTS/CTS for DL MU," Jul. 13, 2015, 11-15/0867r0, Institute of Electrical and Electronics Engineers.
Chittabrata Ghosh, et al.,"Random Access with Trigger Frames using OFDMA," Jul. 13, 2015, 11-15/0875r0, Institute of Electrical and Electronics Engineers.
Woojin Ahn, et al., "Regarding buffer status of UL-STAs in UL-OFDMA," Jul. 13, 2015, 11-15/0881r0, Institute of Electrical and Electronics Engineers.
Yongho Seok, et al., "NAV Operation for Spatial Reuse," Jul. 11, 2015, 11-15/0797r0, Institute of Electrical and Electronics Engineers.
Masahito Mori, et al., "DCCA/DSC Reference Simulation Results," Jul. 13, 2015, 11-15/0801r0, Institute of Electrical and Electronics Engineers.
Graham Smith, "Outdoor Enterprise Scenario and DSC," Jul. 10, 2015, 11-15/0804r0, Institute of Electrical and Electronics Engineers.
Graham Smith, "DSC Summary," Jul. 10, 2015, 11-15/0807r0, Institute of Electrical and Electronics Engineers.
Xiaofei Wang, et al., "Topics for Consideration for Spatial Reuse," Jul. 13, 2015, 11-15/0811r0, Institute of Electrical and Electronics Engineers.
M. Shahwaiz Afaqui, et al., "DSC leveraging uplink RTS/CTS control," Jul. 13, 2015, 11-15/0882r0, Institute of Electrical and Electronics Engineers.
Yasuhiko Inoue, et al., "follow up discussion on the receiver behavior," Jul. 13, 2015, 11-15/0883r0, Institute of Electrical and Electronics Engineers.
Chinghwa Yu, et al., "DSC Caliberation Results," Jul. 13, 2015, 11-15/0886r0, Institute of Electrical and Electronics Engineers.
Guido R. Hiertz, et al., "802.11ae & 802.11ax," Aug. 25, 2015, 11-15/1013r0, Institute of Electrical and Electronics Engineers.
Guido R, Hiertz, et al., "Multiple BSSID Element," Aug. 25, 2015, 11-15/1014r0, Institute of Electrical and Electronics Engineers.
Guido R. Hiertz, et al., "Proxy ARB in 802.11 ax," Sep. 1, 2015, 11-15/1015r0, Institute of Electrical and Electronics Engineers.
Yongho Seok, et al., "Data field in HE PPDU," Sep. 13, 2015, 11-15/1033r0, Institute of Electrical and Electronics Engineers.

(56) References Cited

OTHER PUBLICATIONS

Yongho Seok, et al., "Notification of Operating Mode Changes," Sep. 13, 2015, 11-15/1034r0, Institute of Electrical and Electronics Engineers.
Kazuyuki Sakoda, et al., "Further Study of 11 ax Multicast," Sep. 13, 2015, 11-15/1044r0, Institute of Electrical and Electronics Engineers.
Young Hoon Kwon, et al., "Bandwidth for UL MU transmission," Sep. 13, 2015, 11-15/1052r0, Institute of Electrical and Electronics Engineers.
Eric Wong, et al., "Receive Operating Mode Indication for Power Save," Sep. 13, 2015, 11-15/1060r0, Institute of Electrical and Electronics Engineers.
Chao-Chun Wang, et al., "11 ax Channel access procedure," Sep. 13, 2015, 11-15/1063r0, Institute of Electrical and Electronics Engineers.
Jeongki Kim, et al., "MU TXOP truncation," Sep. 13, 2015, 11-15/1067r0, Institute of Electrical and Electronics Engineers.
John Son, et al., "Recovery Procedures in Cascading Sequences," Sep. 13, 2015, 11-15/1096r0, Institute of Electrical and Electronics Engineers.
Narendar Madhavan, et al., "ACK/BA frame for UL MU under cascading structure," Sep. 13, 2015, 11-15/1098r0, Institute of Electrical and Electronics Engineers.
Sean Coffey, et al., "Airtime Analysis of EDCA," Sep. 13, 2015, 11-15/1114r0, Institute of Electrical and Electronics Engineers.
Sean Coffey, et al., "High Efficiency in Accessing the Medium," Sep. 13, 2015, 11-15/1115r0, Institute of Electrical and Electronics Engineers.
Jinsoo Ahn, et al., "Trigger Frame Channel Access," Sep. 13, 2015, 11-15/1116r0, Institute of Electrical and Electronics Engineers.
Alfred Asterjadhi, et al., "Buffer Status Report," Sep. 13, 2015, 11-15/1120r0, Institute of Electrical and Electronics Engineers.
Alfred Asterjadhi, et al., "HE A-Control field," Sep. 13, 2015, 11-15/1121r0, Institute of Electrical and Electronics Engineers.
Russell Huang, et al., "Triggered OFDMA Random Access Observations," Sep. 13, 2015, 11-15/1137r0, Institute of Electrical and Electronics Engineers.
Kazuyuki Sakoda, et al., "Overall Protocol of UL MU BA for Multicast Transmission," Sep. 13, 2015, 11-15/1043r0, Institute of Electrical and Electronics Engineers.
Stephane Baron, et al., "RU selection process upon TF-R reception," Sep. 13, 2015, 11-15/1047r0, Institute of Electrical and Electronics Engineers.
Guoqing Li, et al,, "Multiuser Block ACK Request (MU-BAR)," Sep. 13, 2015, 11-15/1053r0, Institute of Electrical and Electronics Engineers.
Kome Oteri, et al., "Multiple Resource Unit Allocation for TGax OFDMA," Sep. 13, 2015, 11-15/1057r0, Institute of Electrical and Electronics Engineers.
Po-Kai Huang et al., "NAV Consideration for UL MU Response to Trigger frame," Sep. 13, 2015, 11-15/1062r0, Institute of Electrical and Electronics Engineers.
Chao-Chun Wang, et al., "11ax uplink Multi-TID aggregation," Sep. 13, 2015, 11-15/1065r0, Institute of Electrical and Electronics Engineers.
Jing Ma, et al., "Consideration on multi-STA BA frame indication," Sep. 13, 2015, 11-15/1086r0, Institute of Electrical and Electronics Engineers.
Narendar Madhavan, et al., "Reducing Channel Sounding Protocol Overhead for 11ax," Sep. 13, 2015, 11-15/1097r0, Institute of Electrical and Electronics Engineers.
Chittabrata Ghosh, et al., "Fragmentation with MU Operation," Sep. 13, 2015, 11-15/1102r0, Institute of Electrical and Electronics Engineers.
Chittabrata Ghosh, et al., "DL Sounding Sequence with UL MU Feedback," Sep. 13, 2015, 11-15/1103r0, Institute of Electrical and Electronics Engineers.
Chittabrata Ghosh, et al., "UL OFDMA-based Random Access Procedure," Sep. 13, 2015, 11-15/1105r0, Institute of Electrical and Electronics Engineers.
Chittabrata Ghosh, et al., "Power Save with Random Access," Sep. 13, 2015, 11-15/1107r0, Institute of Electrical and Electronics Engineers.
Robert Stacey, et al., "Spec Framework Proposal," Nov. 3, 2014, 11-14/1453r1, Institute of Electrical and Electronics Engineers.
John Son, et al., "Proposed Spec Framework Document for 11ax considering potential tech features," Nov. 5, 2014, 11-14/1447r1, Institute of Electrical and Electronics Engineers.
Robert Stacey, et al., "Spec Framework Proposal," Nov. 5, 2014, 11-14/1453r2, Institute of Electrical and Electronics Engineers.
Robert Stacey, "Spec Framework," Jan. 14, 2015, 11-15/0132r0, Institute of Electrical and Electronics Engineers.
Robert Stacey, "Spec Framework," Jan. 13, 2015, 11-15/0132r1, Institute of Electrical and Electronics Engineers.
Robert Stacey, "Spec Framework," Jan. 15, 2015, 11-15/0132r2, institute of Electrical and Electronics Engineers.
Robert Stacey, "Spec Framework," Mar. 27, 2015, 11-15/0132r3, Institute of Electrical and Electronics Engineers.
Robert Stacey, "Spec Framework," Mar. 27, 2015, 11-15/0132r4, Institute of Electrical and Electronics Engineers.
Robert Stacey, "Spec Framework," May 14, 2015, 11-15/0132r5, Institute of Electrical and Electronics Engineers.
Robert Stacey, "Spec Framework," Jul. 9, 2015, 11-15/0132r6, Institute of Electrical and Electronics Engineers.
Robert Stacey, "Spec Framework," Jul. 20, 2015, 11-15/0132r7, Institute of Electrical and Electronics Engineers.
Robert Stacey, "Spec Framework," Sep. 18, 2015, 11-15/0132r8, Institute of Electrical and Electronics Engineers.
Robert Stacey, "Spec Framework," Sep. 22, 2015, 11-15/0132r9, Institute of Electrical and Electronics Engineers.
Robert Stacey, "Spec Framework," Nov. 25, 2015, 11-15/0132r10, Institute of Electrical and Electronics Engineers.
Robert Stacey, "Spec Framework," Nov. 28, 2015, 11-15/0132r11, Institute of Electrical and Electronics Engineers.
Robert Stacey, "Spec Framework," Dec. 1, 2015, 11-15/0132r12, Institute of Electrical and Electronics Engineers.
Robert Stacey, "Spec Framework," Dec. 7, 2015, 11-15/0132r13, Institute of Electrical and Electronics Engineers.
Robert Stacey, "Spec Framework," Jan. 21, 2016, 11-15/0132r14, Institute of Electrical arid Electronics Engineers.
Robert Stacey, "Spec Framework," Jan. 28, 2016, 11-15/0132r15, Institute of Electrical and Electronics Engineers.
Robert Stacey, "Spec Framework," Mar. 18, 2016, 11-15/0132r16, Institute of Electrical and Electronics Engineers.
Robert Stacey, "Spec Framework," May 25, 2016, 11-15/0132r17, Institute of Electrical and Electronics Engineers.
Osama Aboul-Magd, "TGax May 2014 Closing Report," May 15, 2014, 11-14/0702r0, Institute of Electrical and Electronics Engineers.
Osama Aboul-Magd, "TGax Jul. 2014 Closing Report," Jul. 17, 2014, 11-14/0984r0, Institute of Electrical and Electronics Engineers.
Osama Aboul-Magd, "TGax Sep. 2014 Closing Report," Sep. 18, 2014, 11-15/1304r0, Institute of Electrical and Electronics Engineers.
Osama Aboul-Magd, "TGax Nov. 2014 Closing Report," Nov. 6, 2014, 11-14/1536r0, Institute of Electrical and Electronics Engineers.
Osama Aboul-Magd, "TGax Jan. 2015 Closing Report," Jan. 15, 2015, 11-15/0186r0, Institute of Electrical and Electronics Engineers.
Osama Aboul-Magd, "TGax May 2015 Closing Report," Mar. 12, 2015, 11-15/0465r0, Institute of Electrical and Electronics Engineers.
Osama Aboul-Magd, "TGax May 2015 Closing Report," May. 14, 2015, 11-15/0692r0, Institute of Electrical arid Electronics Engineers.
Osama Aboul-Magd, "TGax Jul. 2015 Closing Report," Jul. 16, 2015, 11-15/0963r0, Institute of Electrical and Electronics Engineers.

(56) References Cited

OTHER PUBLICATIONS

Osama Aboul-Magd, "TGax Sep. 2015 Closing Report," Sep. 17, 2015, 11-15/1190r0, Institute of Electrical and Electronics Engineers.

Osama Aboul-Magd, "TGax Nov. 2015 Closing Report," Nov. 12, 2015, 11-15/1457r0, Institute of Electrical and Electronics Engineers.

Osama Aboul-Magd, "TGax Jan. 2016 Closing Report" Jan. 21, 2016, 11-16/0187r0, Institute of Electrical and Electronics Engineers.

Osama Aboul-Magd, "TGax Mar. 2016 Closing Report," Mar. 17, 2016, 11-16/0475r0, Institute of Electrical and Electronics Engineers.

Osama Aboul-Magd, "TGax May 2016 Closing Report," May 19, 2016, 11-16/0739r0, Institute of Electrical and tlectronics Engineers.

Tatsumi Uwai, et al., "UL-MU MAC Throughput Under Non-Full Buffer Traffic," Mar. 9, 2015, 11-15/0376r0, Institute of Electrical and Electronics Engineers.

Gustav Wikstrom, et al., "Potential of Modified Signal Detection Thresholds," Mar. 9, 2015, 11-15/0300r0, Institute of Electrical and Electronics Engineers.

Amin Jafarian, et al., "CCA Regime Evaluation Revisited," Mar. 9, 2015, 11-15/0318r0, Institute of Electrical and Electronics Engineers.

Masahito Mori, et al., "Impact of TPC coupled to DSC for legacy unfairness issue," Mar. 8, 2015, 11-15/0319r0, Institute of Electrical and Electronics Engineers.

Akira Kishida, et al., "Discussions on the Definition of CCA Threshold," Mar. 7, 2015, 11-15/0338r0, Institute of Electrical and Electronics Engineers.

Eduard Garcia-Villegas, et al., "Proposal and simulatin based evaluation of DSC-AP Algorithm," Mar. 8, 2015, 11-15/0371r0, Institute of Electrical and Electronics Engineers.

John Son, et al., "Further Considerations on Legacy Fairness with Enhanced CCA," Mar. 9, 2015, 11-15/0374r0, Institute of Electrical and Electronics Engineers.

Gwen Barriac, et al., "OBSS preamble detection," Mar. 8, 2015, 11-150367r0, Institute of Electrical and Electronics Engineers.

Yongho Seok, et al., "Uplink Multi-User MIMO Protocol Design," Mar. 8, 2015, 11-15/0331r0, Institute of Electrical and Electronics Engineers.

Kome Oteri, et al., "Throughput Comparison of Some Multi-user Schemes in 802.11ax," Mar. 7, 2015, 11-15/0333r0, Institute of Electrical and Electronics Engineers.

Leonardo Lanante, et al.,"Considerations on UL MU Resource Scheduling," Mar. 9, 2015, 11-15/0377r0, Institute of Electrical and Electronics Engineers.

Yonggang Fang, et al.,"UL MU Synchronization Requirements," Mar. 9, 2015, 11-15/0363r0, Institute of Electrical and Electronics Engineers.

Jinsoo Ahn, et al., "OFDMA Non-contiguous Channel Utilization," Mar. 8, 2015, 11-15/0353r0, Institute of Electrical and Electronics Engineers.

Woojin Ahn, et al., "Bandwidth granularity on UL-OFDMA data allocation," Mar. 9, 2015, 11-15/0354r0, Institute of Electrical and Electronics Engineers.

Yu Cai, et al., "Discussion on DL-OFDMA Sub-channel Indication Method," Mar. 9, 2015, 11-15/0384r0, Institute of Electrical and Electronics Engineers.

Reza Hedayat, et al., "DL OFDMA Performance and ACK Aggregation," Mar. 9, 2015, 11-15/0379r0, Institute of Electrical and Electronics Engineers.

Xiaofei Wang, et al., "Multi-STA BA for SU Transmissions," May 9, 2015, 11-15/0567r0, Institute of Electrical and Electronics Engineers.

Chittabrata Ghosh, et al., "Random Access with Trigger Frames using OFDMA," May 11, 2015, 11-15/0604r0, Institute of Electrical and Electronics Engineers.

Jinsoo Ahn, et al., "Multi-STA Block ACK Protection," May 11, 2015, 11-15/0611r0, Institute of Electrical and Electronics Engineers.

Liwen Chu, et al., "UL OFDMA Bandwidth," May 11, 2015, 11-15/0615r0, Institute of Electrical and Electronics Engineers.

Gang Ding, et al., "Duration and MAC Padding for UL MU PPDUs," May 11, 2015, 11-15/0617r0, Institute of Electrical and Electronics Engineers.

Jeongki Kim, et al., "Further consideration for Multi-STA Block ACK frame," May 11, 2015, 11-15/0626r0, Institute of Electrical and Electronics Engineers.

Graham Smith, "Simulation Scenario changes for Frequency Re-use" May 4, 2015, 11-15/0543r0, Institute of Electrical and Electronics Engineers.

Graham Smith, "Proposed text addityions to 14/980 for frequency re-use," May 4, 2015, 11-15/0544r0, Institute of Electrical and Electronics Engineers.

Graham Smith, "Enterprise Scenario and DSC," May 5, 2015, 11-15/0548r0, Institute of Electrical and Electronics Engineers.

Amin Jafarian, et al., "CCA revisit II," May 11, 2015, 11-15/0588r0, Institute of Electrical and Electronics Engineers.

Yasuhiko Inoue, et al., "Discussion on the Receiver Behavior for CCAC DSC with BSS Color," May 10, 2015, 11-15/0595r0, Institute of Electrical and Electronics Engineers.

Kome Oteri, et al., "Frequency Selective Scheduling (FSS) for TGax OFDMA," May 9, 2015, 11-15/0568r0, Institute of Electrical and Electronics Engineers.

Reza Hedayat, et al., "Frequency Diversity Options in OFDMA," May 11, 2015, 11-15/0586r0, Institute of Electrical and Electronics Engineers.

Reza Hedayat, et al., "Uplink ACK and BA Multiplexing," May 11, 2015, 11-15/0587r0, Institute of Electrical and Electronics Engineers.

Tomoko Adachi, et al., "Regarding trigger frame in UL MU," May 11, 2015, 11-15/0608r0, Institute of Electrical and Electronics Engineers.

Reza Hedayat, et al.,"Channel Sensing in UL OFDMA," Mar. 9, 2015, 11-15/0378r0, Institute of Electrical and Electronics Engineers.

Woojin Ahn, et al., "Multi channel availability for UL-OFDMA," May 11, 2015, 11-15/0612r0, Institute of Electrical and Electronics Engineers.

Yongho Seok, et al., "Beamformed HE PPDU," May 10, 2015, 11-15/0597r0, Institute of Electrical and Electronics Engineers.

Peng Shao, et al.,"Frame Collision Information Management," Jul. 10, 2015, 11-15/0803r0, Institute of Electrical and Electronics Engineers.

Liwen Chu, et al., "Broadcast and Unicast in DL MU," Jul. 13, 2015, 11-15/0831r0, Institute of Electrical and Electronics Engineers.

David Xun Yang, et al.,"Cascading Structure," Jul. 13, 2015, 11-15/0841r0, Institute of Electrical and Electronics Engineers.

John Son, et al., "HE Trigger Frame Format," Jul. 13, 2015, 11-15/0851r0, Institute of Electrical and Electronics Engineers.

Vida Ferdowsi, et al.,"Compressed Trigger Frame," Jul. 13, 2015, 11-15/0656r0, Institute of Electrical and Electronics Engineers.

Guido R. Hiertz, et al., "Efficiency enhancement for 802.11ax," Jul. 13, 2015, 11-15/0871r0, Institute of Electrical and Electronics Engineers.

Guido R. Hiertz, et al., "802.11ai & 802.11ax," Jul. 13, 2015, 11-15/0872r0, Institute of Electrical and Electronics Engineers.

Guido R. Hiertz, et al., "Minimal data rates management frame transmissions in 2.4 GHz," Jul. 13, 2015, 11-15/0874r0, Institute of Electrical and Electronics Engineers.

Simone Merlin, et al., "Duration and MAC Padding for MU PPDUs," Jul. 13, 2015, 11-15/0876r0, Institute of Electrical and Electronics Engineers.

Simone Merlin, et al., "Trigger Frame Format," Jul. 13, 2015, 11-15/0877r0, Institute of Electrical and Electronics Engineers.

Jinsoo Ahn, et al., "Issues on Trigger Frame Retransmission," Jul. 13, 2015, 11-15/0878r0, Institute of Electrical and Electronics Engineers.

(56) References Cited

OTHER PUBLICATIONS

Alfred Asterjadhi, et al., "Scheduled Trigger frames," Jul. 13, 2015, 11-15/0880r0, Institute of Electrical and Electronics Engineers.
Guido R. Hiertz, et al., "Enlarged minimal contention window size," Jul. 14, 2015, 11-15/0914r0, Institute of Electrical and Electronics Engineers.
Yusuke Tanaka, et al., "Multiplexing of Acknowledgements for Multicast Transmission," Jul. 13, 2015, 11-15/0800r0, Institute of Electrical and Electronics Engineers.
Woojin Ahn, et al., "Regarding UL MU protection," Sep. 13, 2015, 11-15/1117r0, Institute of Electrical and Electronics Engineers.
Liwen Chu, et al., "Acknowledgement to DL MU," Sep. 13, 2015, 11-15/1123r0, Institute of Electrical and Electronics Engineers.
Filippo Tosato, et al., "Feedback overhead in DL-MU-MIMO," Sep. 13, 2015, 11-15/1129r0, Institute of Electrical and Electronics Engineers.
Kiseon Ryu, et al.,"CCA consideration for UL MU transmission," Sep. 13, 2015. 11-15/1058r0, Institute of Electrical and Electronics Engineers.
Takeshi Itagaki, et al., "Dynamic CCA control and TPC Simulation Result with SS1-SS3," Sep. 11, 2015, 11-15/1045r0, Institute of Electrical and Electronics Engineers.
James Wang, et al., "Adaptive CCA and TPC," Sep. 13, 2015, 11-15/1069r0, Institute of Electrical and Electronics Engineers.
Jing Ma, et al., "Further consideration on receive behaviour based on the cascading structure and the color scheme," Sep. 13, 2015, 11-15/1081r0, Institute of Electrical and Electronics Engineers.
Chuck Lukaszewski, "Analysis of BSS and ESS Structure During Concurrent SR Transmissions," Sep. 13, 2015, 11-15/1082r0, Institute of Electrical and Electronics Engineers.
Chuck Lukaszewski, et al., "Cost/Benefit Analysis of SR Techniques," Sep. 13, 2015, 11-15/1083r0, Institute of Electrical and Electronics Engineers.
Masahito Mori, et al.,"DSC/DCCA Calibration with TGax Agreed Scenarios," Sep. 13, 2015, 11-15/1101r0, Institute of Electrical and Electronics Engineers.
Reza Hedayat, et al., "TXOP Considerations for Spatial Reuse," Sep. 13, 2015, 11-15/1104r0, Institute of Electrical and Electronics Engineers.
Rossi Jun Luo, et al., "OBSS NAV and PD Threshold Rule for Spatial Reuse," Sep. 13, 2015, 11-15/1109r0, Institute of Electrical and Electronics Engineers.
Amin Jafarian, et al., "BSS TXOP," Sep. 13, 2015, 11-15/1110r0, Institute of Electrical and Electronics Engineers.
Geonjung Ko, et al., "Discussions on Spatial Reuse. Enhancement," Sep. 13, 2015, 11-15/1118r0, Institute of Electrical and Electronics Engineers.
Filip Mestanov, "To DSC or not to DSC," Sep. 13, 2015, 11-13/1138r0, Institute of Electrical and Electronics Engineers.
Der-Jiunn Deng, et al., "Discussion on AP Coordinated Concurrent STA-to-STA Transmissions in 11ax," Sep. 13, 2015, 11-13/1136r0, Institute of Electrical and Electronics Engineers.
Jiseon Lee, et al., "RTSCTS for UL DL OFDMA Control," Oct. 27, 2015, 1-15/1265r0, Institute of Electrical and Electronics Engineers.
Yongho Seok, et al., "HE MU Acknowledgment Procedure," Nov. 5, 2015, 11-15/1276r0, Institute of Electrical and Electronics Engineers.
Young Hoon Kwon, et al., "DL MU transmission sequence," Nov. 8, 2015, 11-15/1300r0, Institute of Electrical and Electronics Engineers.
Alfred Asterjadhi, et al., "Fragmentation for MU frames—Follow up," Nov. 8, 2015, 11-15/1318r0, Institute of Electrical and Electronics Engineers.
Alfred Asterjadhi, et al., "Scheduled Trigger frames—Follow up," Nov. 8, 2015, 11-15/1319r0, Institute of Electrical and Electronics Engineers.
Jeongki Kim, et al., "A method of transmitting Multi-STA Block frame," Nov. 9, 2015, 11-15/1330r0, Institute of Electrical and Electronics Engineers.

Tomoko Adachi, et al., "Reception Status of Frames Transmitted in Random Access Rus," Nov. 8, 2015, 11-15/1341r0, Institute of Electrical and Electronics Engineers.
Simone Merlin, et al., "Trigger Frame Format," Nov. 9, 2015, 11-15/1344r0, Institute of Electrical and Electronics Engineers.
Kiseon Ryu, et al., "Trigger type specific information," Nov. 8, 2015, 11-15/1345r0, Institute of Electrical and Electronics Engineers.
Kiseon Ryu, et al., "Ack Policy for UL MU Ack transmission," Nov. 8, 2015. 11-15/1346r0, Institute of Electrical and Electronics Engineers.
Liwen Chu, et al., "Rate MCS Selection Rules for M-BA and DL OFDMA BA," Nov. 8, 2015, 11-15/1351r0, Institute of Electrical and Electronics Engineers.
Liwen Chu, et al., "broadcast STAID in HE SIG B," Nov. 8, 2015, 11-15/1352r0, Institute of Electrical and Electronics Engineers.
Yingpei Lin, et al., "Considerations for TDLS transmission in 11ax," Nov. 8, 2015, 11-15/1355r0, Institute of Electrical and Electronics Engineers.
Yu Wang, et al., "System Performance Evaluation of 802.11ae," Nov. 9, 2015, 11-15/1359r0, Institute of Electrical and Electronics Engineers.
Stephane Baron, et al.,"Traffic priority for random Multi User Uplink OFDMA," Nov. 8, 2015, 11-15/1280r0, Institute of Electrical and Electronics Engineers.
Yingpei Lin, et al., "NAV Rule for UL MU Response," Nov. 8, 2015, 11-15/1301r0, Institute of Electrical and Electronics Engineers.
Reza Hedayat, et al., "MU BAR Frame Format," Nov. 9, 2015, 11-15/1312r0, Institute of Electrical and Electronics Engineers.
Rui Yang, et al., "I/O Imbalance Impact to TGax OFDMA Uplink Reception," Nov. 7, 2015, 11-15/1314r0, Institute of Electrical and Electronics Engineers.
Po-Kai Huang, et al., "MU-RTS/CTS Follow Up," Nov. 9, 2015, 11-15/1325r0, Institute of Electrical and Electronics Engineers.
Po-Kai Huang, et al., "NAV Consideration for UL MU Response Follow Up," Nov. 9, 2015, 11-15/1326r0, Institute of Electrical and Electronics Engineers.
Yujiin Noh, et al., "Scheduling information for UL OFDMA Acknowledgement," Nov. 9, 2015, 11-15/1328r0, Institute of Electrical and Electronics Engineers.
Narendar Madhavan, et al., "NDP Announcement for HE Sequence," Nov. 8, 2015, 11-15/1340r0, Institute of Electrical and Electronics Engineers.
Chittabrata Ghosh, et al., "Signaling Trigger Information for STAs in 11ax," Nov. 9, 2015, 11-15/1364r0, Institute of Electrical and Electronics Engineers.
Woojin Ahn, et al., "Random access based buffer status report," Nov. 9, 2015, 11-15/1369r0, Institute of Electrical and Electronics Engineers.
Jinsoo Ahn, et al., "UL OFDMA Random Access Control," Nov. 9, 2015, 11-15/1370r0, Institute of Electrical and Electronics Engineers.
Jing Ma, et al., "Consideration for protecting cascading MU DL/UL transmission with MU RTS/CTS," Nov. 9, 2015, 11-15/1374r0, Institute of Electrical and Electronics Engineers.
Jinmin Kim, et al., "Simulation results for spatial reuse in 11ax," Nov. 9, 2015, 11-15/1284r0, Institute of Electrical and Electronics Engineers.
Reza Hedayat, et al., "Considerations for Spatial Reuse," Nov. 9, 2015, 11-15/1313r0, Institute of Electrical and Electronics Engineers.
M. Shahwaiz Afaqui, et al., "DSC calibration results with NS-3," Nov. 9, 2015, 11-15/1316 r0, Institute of Electrical and Electronics Engineers.
Chuck Lukaszewski, et al., "BSS Color Field Size Measurements," Nov. 9, 2015, 11-15/1336r0, Institute of Electrical and Electronics Engineers.
John Son, et al., "Secondary Channel CCA of HE STA," Nov. 9, 2015, 11-15/1337r0, Institute of Electrical and Electronics Engineers.
Geonjung Ko. et al., "Improving Spatial Reuse During OBSS UL MU Procedure," Nov. 9, 2015, 11-18/1338r0, Institute of Electrical and Electronics Engineers.

(56) References Cited

OTHER PUBLICATIONS

Sigurd Schelstraete, et al., "Multiple NAVs for Spatial Reuse," Nov. 8, 2015, 11-15/1348r0, Institute of Electrical and Electronics Engineers.
Yongho Seok, et al., "Explicit Block Ack Request in DL MU PPDU," Jan. 14, 2016, 11-16/0015r0, Institute of Electrical and Electronics Engineers.

* cited by examiner

APPARATUSES, METHODS, AND COMPUTER-READABLE MEDIUM FOR COMMUNICATION IN A WIRELESS LOCAL AREA NETWORK

CROSS-REFERENCE TO RELATED APPLICATION(S)

The present application claims the benefit of and right of priority to U.S. patent application Ser. No. 15/322,118, titled "APPARATUSES, METHODS, AND COMPUTER-READABLE MEDIUM FOR COMMUNICATION IN A WIRELESS LOCAL AREA NETWORK," filed Dec. 25, 2016, which claims the benefit of and right of priority to International Patent Cooperation Treaty (PCT) Patent Application No. PCT/US2016/042487, titled "APPARATUSES, METHODS, AND COMPUTER-READABLE MEDIUM FOR COMMUNICATION IN A WIRELESS LOCAL AREA NETWORK," filed Jul. 15, 2016, which claims the benefit of and right of priority to U.S. Provisional Patent Application No. 62/193,497, titled "APPARATUSES, METHODS, AND COMPUTER-READABLE MEDIUM FOR COMMUNICATION," filed Jul. 16, 2015, U.S. Provisional Patent Application No. 62/219,639, titled "APPARATUSES, METHODS, AND COMPUTER-READABLE MEDIUM FOR COMMUNICATION," filed Sep. 16, 2015, U.S. Provisional Patent Application No. 62/254,153, titled "APPARATUSES, METHODS, AND COMPUTER-READABLE MEDIUM FOR COMMUNICATION," filed Nov. 11, 2015, U.S. Provisional Patent Application No. 62/281,167, titled "APPARATUSES, METHODS, AND COMPUTER-READABLE MEDIUM FOR COMMUNICATION," filed Jan. 20, 2016, and U.S. Provisional Patent Application No. 62/309,109, titled "APPARATUSES, METHODS, AND COMPUTER-READABLE MEDIUM FOR COMMUNICATION," filed Mar. 16, 2016, the entirety of all of which is hereby expressly incorporated by reference herein.

TECHNICAL AREA

The present disclosure, generally, pertains to communication and, more specifically, to apparatuses, methods, and computer-readable medium for communication in a wireless local area network.

BACKGROUND

A wireless local area network (WLAN) may refer to a network that wirelessly connects two or more devices in a coverage area. A WLAN can be deployed in many types of environments, such as residential, commercial, and/or public. Devices can be moved around in the coverage area of the WLAN while maintaining a wireless connection. A WLAN may be utilized to access a local intranet and/or the Internet. Devices in a WLAN can communicate with each other using various procedures. Improvements to such procedures may enable relatively faster download and/or upload of information, relatively less latency, and/or relatively less power consumption, which may improve the overall user experience.

Figure 1:
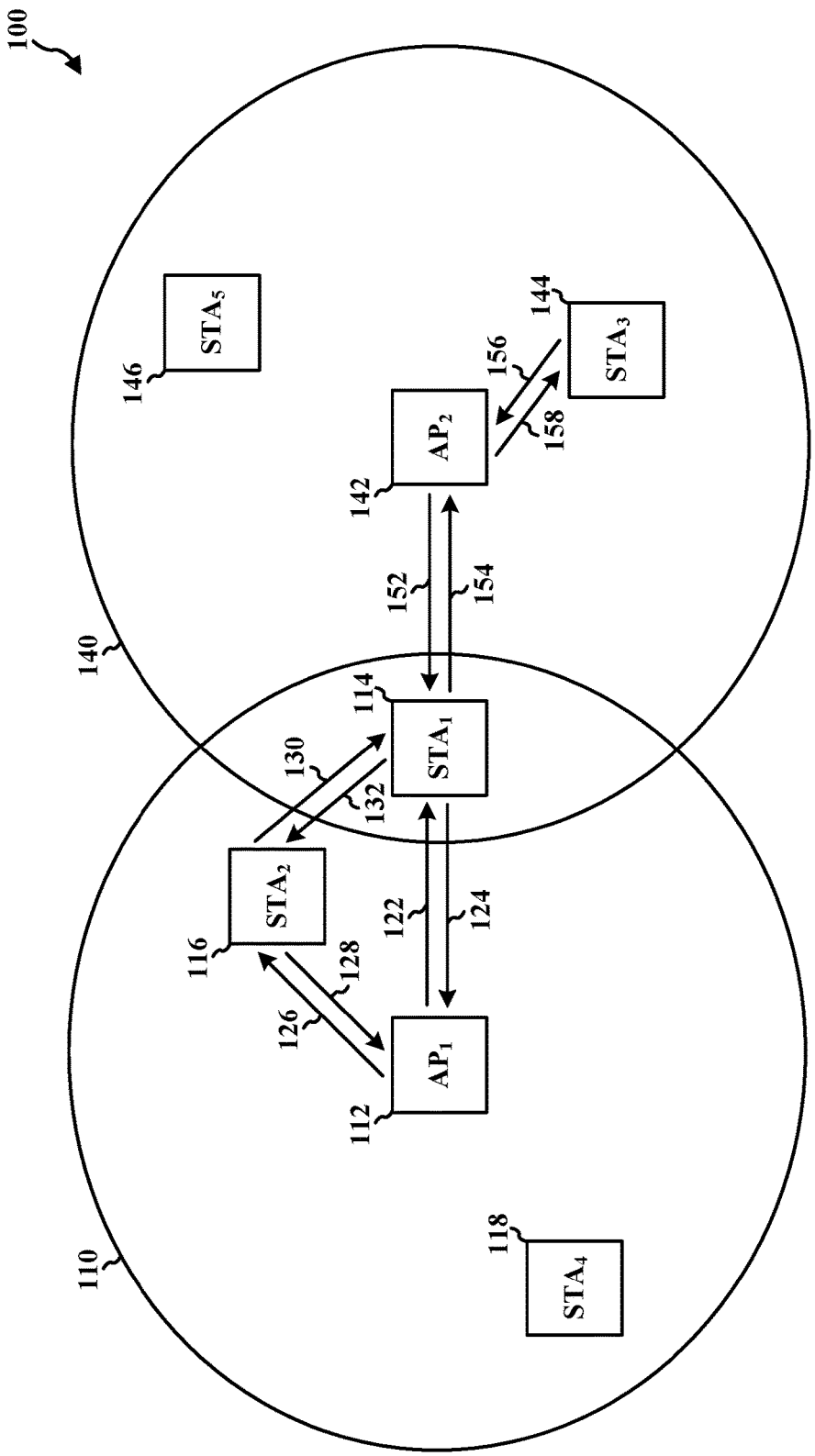
FIG. 1 is a conceptual diagram illustrating a non-limiting example of at least one wireless local area network according to some aspects of the present disclosure.

The drawings are not intended to limit the scope of the present disclosure nor any aspect of the claims. The drawings are provided solely to illustrate a few aspects that may be described in greater detail throughout the present disclosure. Accordingly, some aspects described throughout the present disclosure may not be illustrated in the drawings.

DETAILED DESCRIPTION

A wireless local area network (WLAN) may have one or more access points (APs) and/or one or more stations (STAs). In some aspects, the term(s) 'AP,' 'apparatus' (e.g., an apparatus of an AP), and/or 'computer-readable medium' (e.g., a computer-readable medium of an AP) may be, may reside within, and/or may refer to a router, a base station, a transmitter, a base transceiver station, a node, a radio base station, a radio transceiver, a network, a basic service set (BSS), an extended service set, a computing device, a user equipment (UE), a phone, a mesh node, a relay, a peer, a device, one or more software modules, one or more computer-executable code/instructions, one or more computer-readable medium, one or more memory, one or more processor, one or more hardware components, one or more circuits or modules, any combination of any one or more of the foregoing items, and/or any other suitable term(s), any one or more of which may be suitable for performing any one or more of the methods, operations, steps, functions, features, and/or other aspects described herein.

In some aspects, the term(s) 'STA,' 'apparatus' (e.g., an apparatus of an STA), and/or 'computer-readable medium' (e.g., a computer-readable medium of an STA) may be, may reside within, and/or may refer to a laptop computer, a mobile phone, a cellular phone, a mobile station, a UE, a phone, a handset device, a subscriber station, a mobile unit, a wireless device, a smartphone, a remote device, a tablet device, a desktop computer, a terminal, a mobile client, a mesh node, a relay, a peer, a netbook, a notebook, a computer display, a satellite radio, a projector, a payment device, a display device, a global positioning system device, a multimedia device, a game console, a camera, a video-recorder, an entertainment device, a wearable computing device, glasses, a watch, a health/fitness tracker, an appliance, a transport vehicle, a car, a sensor, a fax/facsimile machine, a printer, a scanner, one or more software modules, one or more computer-executable code/instructions, one or more computer-readable medium, one or more memory, one or more processor, one or more hardware components, one or more circuits or modules, any combination of any one or more of the foregoing items, and/or any other suitable term(s), any one or more of which may be suitable for performing any one or more of the methods, operations, steps, functions, features, and/or other aspects described herein.

An AP may be configured to communicate downlink (DL) signals to one or more other apparatuses, such as one or more STAs. An STA may be configured to communicate uplink (UL) signals to one or more other apparatuses, such as one or more APs and/or one or more other STAs. Generally, a transmission from an AP to one or more STAs may be characterized as DL, and a transmission from an STA to one or more APs may be characterized as UL. DL may refer to any communication initiated by, originated at, communicated from, generated by, and/or transmitted by an AP and destined for, intended for, and/or received by an STA. UL may refer to any communication initiated by, originate at, communicated from, generated by, and/or transmitted by an STA and destined for, intended for, and/or received by an AP.

FIG. 1 is a conceptual diagram 100 illustrating a non-limiting example of at least one WLAN according to some aspects of the present disclosure. In the example illustrated in FIG. 1, $AP_1$ 112 has a coverage area 110 that at least partially overlaps with a coverage area 140 of $AP_2$ 142. The coverage area 110 of $AP_1$ 112 includes $STA_1$ 114, $STA_2$ 116, and $STA_4$ 118. The coverage area of $AP_2$ 142 includes $STA_1$ 114, $STA_3$ 144, and $STA_5$ 146. FIG. 1 illustrates many DL transmissions 122, 126, 152, 158 and many UL transmissions 124, 128, 154, 156. Additionally or alternatively, STAs may communicate with each other via peer-to-peer transmissions 130, 132. Additional details related to the aforementioned transmissions are provided throughout the present disclosure.

Figure 2:
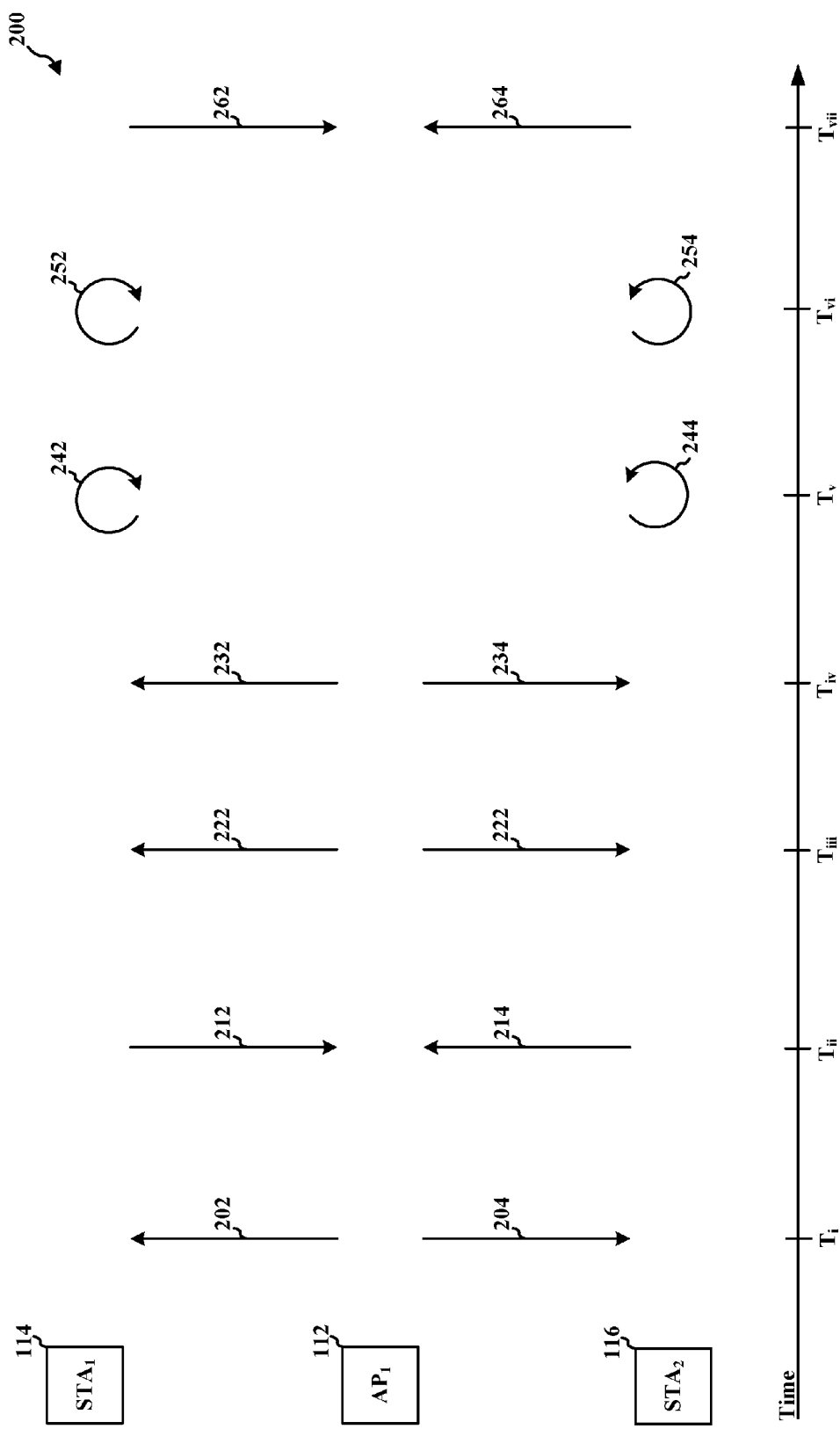
FIG. 2 is a timing diagram illustrating non-limiting examples of various communications between an access point (AP) and various stations (STAs) according to some aspects of the present disclosure.

FIG. 2 is a timing diagram 200 illustrating non-limiting examples of various communications between an AP and various STAs according to some aspects of the present disclosure. In some aspects, at time $T_i$, $AP_1$ 112 may transmit one or more DL transmission(s) 202, 204 to $STA_1$ 114, $STA_2$ 116, respectively. Such DL transmission(s) 202, 204 may be configured to cause $STA_1$ 114, $STA_2$ 116 to transmit an UL transmission (e.g., UL transmission(s) 212, 214, respectively) that may be configured to protect a DL multiuser transmission (e.g., DL multiuser transmission 222). In some aspects, at time $T_{ii}$, $STA_1$ 114, $STA_2$ 116 may respectively communicate UL transmission(s) 212, 214 to $AP_1$ 112. Such UL transmission(s) 212, 214 may be configured to protect a DL multiuser transmission (e.g., DL multiuser transmission 222). Various aspects pertaining to such DL transmission(s) 202, 204 and/or UL transmission(s) 212, 214 are provided in greater detail herein (e.g., with reference to FIG. 4).

In some aspects, at time $T_{iii}$, $AP_1$ 112 may transmit a DL multiuser transmission 222 to $STA_1$ 114 and $STA_2$ 116. The DL multiuser transmission 222 may include data and/or information destined/intended for a plurality STAs (e.g., $STA_1$ 114, $STA_2$ 116). In some aspects, the term 'multiuser' may be described herein with reference to a transmission (or other similar terms, such as communication, signal, packet, and/or data unit). A DL multiuser transmission may refer to a transmission that originates at a single transmitter (e.g., apparatus, AP, BSS, node, network, etc.) and includes data and/or information destined/intended for a plurality of receivers (e.g., apparatuses, STAs, users, receivers, destinations, etc.). Various aspects pertaining to such DL multiuser transmission(s) 222 are provided in greater detail herein (e.g., with reference to FIG. 4).

In some aspects, at time $T_{iv}$, $AP_1$ may transmit DL transmission(s) 232, 234 to $STA_1$ 114, $STA_2$ 116, respectively. In some aspects, the DL transmission(s) 232, 234 may be different transmissions (e.g., one DL transmission 232 destined/intended for $STA_1$ 114, and another DL transmission 234 destined/intended for $STA_2$ 116). In some aspects, the DL transmission(s) 222 may refer to a single DL transmission (e.g., a single DL transmission destined/intended for $STA_1$ 114 and $STA_2$ 116). In some aspects, the DL transmission(s) 232, 234 may be included as a part of another DL transmission(s) (e.g., DL multiuser transmission(s) 222).

In some aspect, the DL transmission(s) 232, 234 may be configured to trigger simultaneous/concurrent UL transmission(s) 262, 264 by a plurality of STAs (e.g., $STA_1$ 114, $STA_2$ 116). In some aspects, such DL transmission(s) 232, 234 may be referred to as an UL transmission request (ULTR). The term 'ULTR' may refer to a signal configured to trigger an UL transmission by at least one STA. In some aspects, the ULTR may be a signal configured to trigger simultaneous/concurrent UL transmissions by a plurality of STAs within a period of time after receiving the signal. The ULTR may be referred to by various other terms/phrases (e.g., UL transmission trigger, UL trigger frame, and/or various other suitable terms/phrases) without deviating from the scope of the present disclosure. An ULTR may be characterized as 'cascading' when another ULTR is planned, scheduled, and/or destined to follow that ULTR. Various aspects pertaining to such DL transmission(s) 232, 234 are provided in greater detail herein (e.g., with reference to FIG. 4).

In some aspects, at time $T_{vii}$, the simultaneous/concurrent UL transmissions 262, 264 may include an UL transmission 262 from $STA_1$ 114 to $AP_1$ 112 simultaneously/concurrently with an UL transmission 264 from $STA_2$ 116 to $AP_1$ 112. In some aspects, the UL transmission(s) 262, 264 may be referred to as UL multiuser transmission(s). UL multiuser transmission(s) may refer to one or more transmissions that originate at different transmitters (e.g., apparatuses, STAs, users, etc.) and each include data and/or information destined/intended for a common/shared receiver (e.g., apparatus, AP, node, network, etc.), and such transmissions may at least in part occur during a common, concurrent, and/or simultaneous period of time. Various aspects pertaining to such simultaneous/concurrent UL transmission(s) 262, 264 are provided in greater detail herein (e.g., with reference to FIG. 4).

Figure 4:
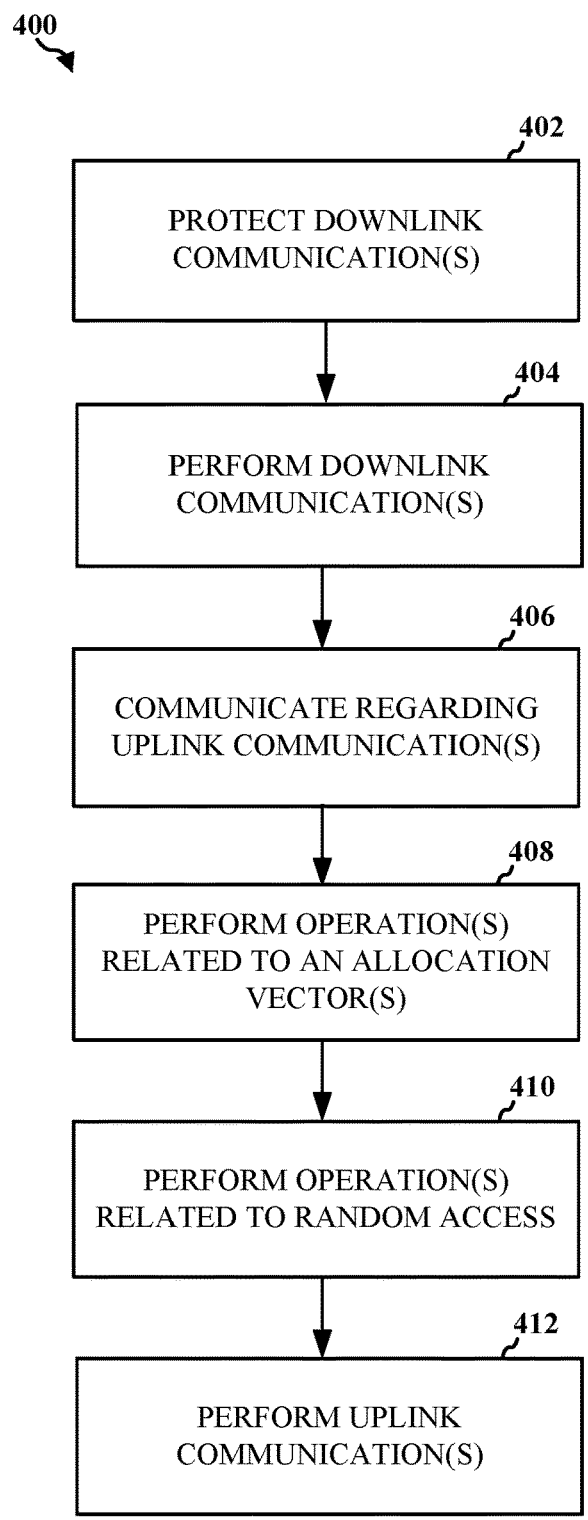
FIG. 4 is a flow diagram illustrating non-limiting examples of some aspects of the present disclosure.

In some aspects, prior to such simultaneous/concurrent UL transmissions 262, 264 at time $T_{vii}$, an STA (e.g., $STA_1$ 114, $STA_2$ 116), at time $T_v$, may enable various features, operations, functions, and/or aspects 242, 244 related to an allocation vector, such as a network/navigation allocation vector (NAV), as described in greater detail herein (e.g., with reference to FIG. 4). In some aspects, prior to such simultaneous/concurrent UL transmissions 262, 264 at time $T_{vii}$, an STA (e.g., $STA_1$ 114, $STA_2$ 116), at time $T_{vi}$, may enable various features, operations, functions, and/or aspects 252, 254 related to random access, as also described in greater detail herein (e.g., with reference to FIG. 4).

Figure 3:
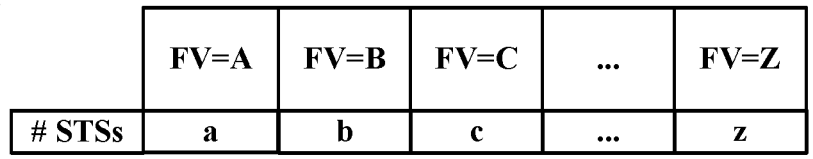
FIG. 3 illustrates non-limiting examples of diagrams associated with some aspects of the present disclosure.
Figure 3:
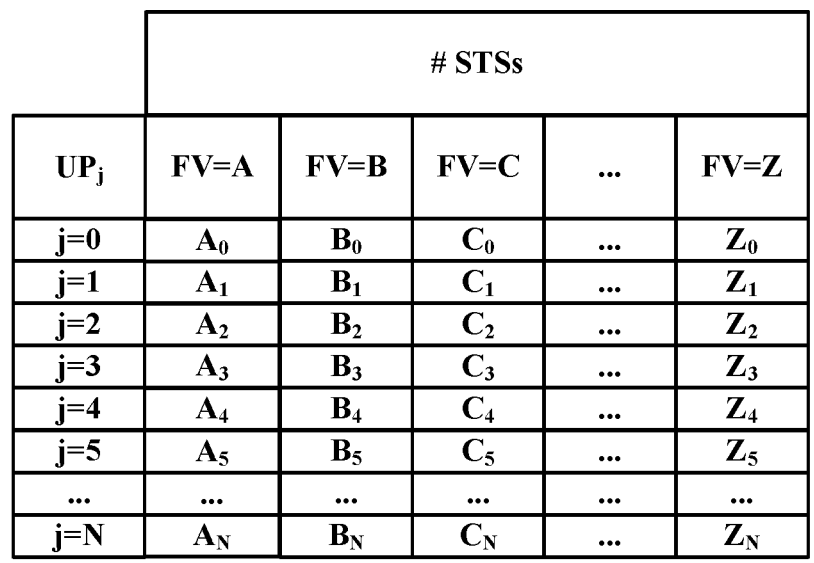

FIG. 3 illustrates non-limiting examples of diagrams 300, 350 associated with various aspects of the present disclosure. In some aspects, a first diagram 300 illustrates non-limiting examples of possible relationships between a total number of space-time streams (STSs) (included in a frame, packet, and/or data unit) and various possible values in one or more fields (e.g., field values (FVs)) (that may be included in a frame, packet, and/or data unit). In some aspects, a second diagram 350 illustrates non-limiting examples of possible relationships between the number (e.g., quantity, numerical quantification, count, amount, size, extent, etc.) of STSs destined/intended for one or more STAs assigned/allocated various possible user position (UP) values in view of various possible FVs (that may be included in a frame, packet, and/or data unit). Many aspects pertaining to these diagrams 300, 350 are provided in greater detail herein (e.g., with reference to FIG. 4).

FIG. 4 is a conceptual flow diagram 400 illustrating non-limiting examples of various features, operations, steps, methods, processes, and/or functions according to some aspects of the present disclosure. Such features, operations, steps, methods, processes, and/or functions may be enabled, performed by, reside in, executed by, configured for, and/or otherwise associated with any apparatus described herein, such an AP (e.g., $AP_1$ 112) and/or an STA (e.g., $STA_1$ 114).

At block 402, an apparatus may enable aspects related to protecting DL communication(s). In some aspects, an AP may transmit and/or an STA may receive a transmission configured to cause a plurality of STAs to simultaneously transmit a signal/transmission that is configured to protect a DL multiuser transmission to the plurality of STAs. For example, referring to FIG. 2, $AP_1$ 112 may transmit a DL transmission 202 to $STA_1$ 114 and/or a DL transmission 204 to $STA_2$ 116. Such DL transmission(s) 202, 204 may be configured to request that $STA_1$ 114, $STA_2$ 116 refrain from transmitting signals during a particular period of time (e.g., at least at time(s) $T_{iii}$, $T_{iv}$) using a certain channel or resource. In some aspects, in response to such a signal/transmission (e.g., DL transmission(s) 202, 204) and simultaneously/concurrently with another STA of the plurality of STAs, an STA may transmit and/or an AP may receive a signal/transmission (e.g., UL transmission(s) 212, 214) configured to protect a DL multiuser transmission (e.g., DL multiuser transmission(s) 222) to the plurality of STAs. For example, referring to FIG. 2, $STA_1$ 114 may transmit an UL transmission 212 at least in part simultaneously/concurrently with $STA_2$ 116 transmitting an UL transmission 214. Such UL transmission(s) 212, 214 may inform $AP_1$ 112 that $STA_1$ 114, $STA_2$ 116 will not transmit during that particular period of time (e.g., at least at time(s) $T_{iii}$, $T_{iv}$) using that channel or resource, thereby protecting any DL multiuser transmission(s) (e.g., DL multiuser transmission(s) 222 from $AP_1$ 112 to $STA_1$ 114, $STA_2$ 116) during that particular period of time (e.g., at least at time(s) $T_{iii}$, $T_{iv}$). In some aspects, a time synchronization of the simultaneous transmission by the plurality of STAs is based on an end time of the received signal/transmission. For example, referring to FIG. 2, the UL transmission(s) 212, 214 may begin after a particular inter-frame spacing (e.g., in FIG. 2, time $T_{ii}$ minus time $T_i$) after the communication of the DL transmission(s) 202, 204. In some aspects, a scrambling seed associated with the transmitted signal/transmission (e.g., UL transmission(s) 212, 214) configured to protect the DL multiuser transmission (e.g., DL multiuser transmission(s) 222) is similar to or the same as a scrambling seed of the received signal/transmission (e.g., DL transmission(s) 202, 204) that caused the plurality of STAs to simultaneously transmit the signal/transmission (e.g., UL transmission(s) 212, 214) configured to protect the DL multiuser transmission (e.g., DL multiuser transmission(s) 222). The term 'scrambler seed' may refer to an initial value or state used for scrambling, randomization, and/or encoding an input value. For example, referring to FIG. 2, an initial scrambler state of the DL transmission(s) 202, 204 may be similar to or the same as an initial scrambler state of the UL transmission(s) 212, 214.

In some configurations, the TX may generate and/or transmit a request-to-send (RTS) message/signal that solicits simultaneous clear-to-send (CTS) messages/signals from a plurality of RXs. In some configurations, the TX may generate and/or transmit a RTS message/signal simultaneously to a plurality of RXs, and the RTS message/signal may be configured to solicit, induce, trigger, and/or otherwise cause the simultaneous transmission of CTS messages/signals from that same plurality of RXs. In such configurations, the RX may receive and/or decode the RTS message/signal and transmit a CTS message/signal at a time indicated in the RTS message/signal. That indicated time may be at the same time as the time of transmission of CTS message(s)/signal(s) by other RXs (that were intended recipients of the RTS message/signal from the TX). In some configurations, the scramble seed associated with the simultaneous CTS responses may be similar to (or the same as) the scramble seed associated with the RTS message/signal. In some configurations, the transmission rate associated with the simultaneously-transmitted CTS messages/signals may be similar to (or the same as) the transmission rate associated with the RTS message/signal. In some configurations, the transmission rate associated with the simultaneously-transmitted CTS messages/signals may be based on the rate or MCS of the RTS message/signal. In some configurations, the time synchronization among the RXs is based on the end time of the RTS message/signal. In some configurations, the RTS includes an indication/signal that indicates/identifies each of the plurality of RXs. In some configurations, the CTS message/signal is the same for each of the plurality of RXs. In some configurations, the CTS message/signal is transmitted at the same start time and/or the same end time by each of the plurality of RXs as indicated in the RTS message/signal. In some configurations, the CTS message/signal is configured to protect multi-user transmissions from/to the plurality of RXs. In some configurations, the RTS message/signal includes an indication/signal indicating that the RTS message/signal is destined for/intended for that plurality of RXs. In some configurations, the RTS message includes an implicit and/or explicit indicator/signal identifying at least one of the MCS, the scrambling seed, transmission rate, or bandwidth (BW) of the RTS signal/message. In some configurations, each of the plurality of RXs generates/transmits the CTS message based on such an indicator/signal. In some configurations, the CTS message/signal comprises a BW corresponding to the BW of the RTS message/signal.

In some configurations, a communication may sometimes be protected using a CTS/RTS signaling scheme. In a multi-user communication environment, channel utilization may be improved by implementing various enhancements under certain circumstances. In some configurations, an apparatus (e.g., STA) may set/reset/configure its NAV settings/parameters/configurations based on information/parameter/setting included in a received RTS message. In circumstances where a CTS and/or an ULTR does not subsequently follow the RTS message, even though the NAV settings/parameters/configurations have already been set/reset/configured, there may exist an opportunity for certain enhancement in some circumstances. In some circumstances, the NAV may be unnecessarily protecting the channel from communication, even though nothing is being transmitted. In some circumstances, it may be beneficial to implement a relatively early/earlier termination/end/reset/reconfiguration of the NAV so that the communication channel may become accessible sooner than it might be otherwise. In some circumstances, this may lead to more channel efficiency, higher channel utilization, and/or other enhancements. In some configurations, the AP may transmit and/or the STA may receive a RTS signal/message. In some configurations, the STA may set a parameter/setting/configuration of the NAV based on information included in and/or associated with the received RTS signal/message. In some configurations, the STA may set a NAV expiration timer upon receiving the RTS and/or upon setting the parameter/setting/configuration of the NAV. In some configurations, the NAV expiration timer may have a duration that is shorter than a duration of time for which the NAV is set (e.g., based on the set parameter/setting/configuration of the NAV). In some configurations, the STA may determine whether and/or detect whether a/any signal/message (e.g., CTS, ULTR, UL transmission/communication, etc.) from the AP and/or other STAs is/are received prior to expiration of the NAV expiration timer. In some configurations, the STA may, if/when no signal (e.g., CTS, ULTR, UL transmission/communication, etc.) from the AP and/or other STAs is/are received prior to expiration of the NAV expiration timer, terminate/end/reset the NAV. In some configurations, the STA may terminate/end/reset the NAV at a time that is before a time at which the NAV is scheduled to terminate/end/reset based on the set parameter/setting/configuration of the NAV. In some configurations, if/when no signal (e.g., CTS, ULTR, UL transmission/communication, etc.) from the AP and/or other STAs is/are received prior to expiration of the NAV expiration timer, the AP may transmit and the STA may receive a frame/packet/message/signal configured to/for or comprising information for/to reset the NAV. In some configurations, the AP transmits and the STA receives this frame/packet/message/signal (configured to/for or comprising information for/to reset the NAV) at a time that is before a time at which the NAV is scheduled to terminate/end/reset based on the (set/preset/configured) parameter/setting/configuration of the NAV. The ULTR and/or the data packet/communication/transmission (e.g., in UL direction) following reception of the ULTR may include various fields, parameters, formats, structures, etc. without deviating from the scope of the present disclosure. In some configurations, the ULTR includes information indicating/corresponding to/associated with a probability of transmission. In some configurations, the STA may utilize the probability of transmission to determine whether to and, if so, how, in what format, structure, configuration, parameter, capabilities, and/or settings to perform a transmission/communication (e.g., in the UL direction) (in response to/corresponding to the ULTR). In some configurations, data packet/communication/transmission (e.g., in UL direction) may include a field indicating an identity/identifier/group-identifier associated with the STA and/or a number of STAs, such as, for example, a number of STAs with which the AP and/or the STA is associated/grouped.

At block 404, an apparatus may enable aspects related to performing DL communication(s). In some aspects, at time $T_{iii}$, an AP may transmit and/or an STA may receive a DL transmission (e.g., DL multiuser transmission(s) 222) comprising a frame, packet, and/or data unit destined/intended for a plurality of STAs. In some aspects, the DL transmission (e.g., DL multiuser transmission(s) 222) comprising a frame, packet, and/or data unit destined/intended for a plurality of STAs may include a plurality of STSs. For example, one (or more) STS(s) may be destined/intended for $STA_1$ 114 and another one (or more) STS(s) may be destined/intended for $STA_2$ 116.

The frame, packet, and/or data unit may include one or more fields. The term 'field(s)' may refer to any subset, portion, fraction, component, and/or bit of the frame, packet, and/or data unit. In some aspects, an STA may use a field included in the packet, frame, and/or data unit to determine a total number of STSs included in the packet, frame, and/or data unit. For example, as illustrated in a first diagram 300 of FIG. 3, an STA may determine a total number of STSs (e.g., a, b, c, . . . z, which each may represent a non-negative integer value) (included in the packet, frame, and/or data unit) based on the FV (e.g., A, B, C, . . . Z, which may each represent one or more integer values, one or more complex numbers, one or more alphanumeric values, one or more bits, a bit string, one or more binary values, one or more hexadecimal values, and/or any other suitable set of one or more values). For instance, if FV=B, then the total number of STSs included in the frame, packet, and/or data unit is equal to b.

In some aspects, an STA may use the field to select a subset of values from a set of values indicating a number of STSs destined to each of at least some of the plurality of STAs. For example, as illustrated in a second diagram 350 of FIG. 3, the number of STSs associated with each UP may vary based on the FV. An STA for/to which a packet, frame, and/or data unit, or at least a portion thereof, is intended/destined may be assigned a UP. A UP may be assigned to one or more STAs. For example, if FV=B, then the STA may select a subset of values (e.g., $B_0$, $B_1$, $B_2$, $B_3$, $B_4$, $B_5$, . . . , $B_N$) from a set of values (e.g., $A_0$, $A_1$, $A_2$, $A_3$, $A_4$, $A_5$, . . . , $A_N$, $B_0$, $B_1$, $B_2$, $B_3$, $B_4$, $B_5$, . . . , $B_N$, $C_0$, $C_1$, $C_2$, $C_3$, $C_4$, $C_5$, . . . , $C_N$, . . . $Z_0$, $Z_1$, $Z_2$, $Z_3$, $Z_4$, $Z_5$, . . . , $Z_N$, wherein each of these value may have any non-negative integer value) indicating the number of STSs destined/intended for each of at least some of the plurality of STAs (e.g., STA(s) assigned $UP_0$, $UP_1$, $UP_2$, $UP_3$, $UP_4$, $UP_5$, . . . , $UP_N$). N may correspond to a last value in a series of values. Although the example described herein mentions five or more values (e.g., N being greater than 5) in each of the set of values, this is not a limitation of the present disclosure nor any aspect of the claims, because any of the set of values may have any plurality of values (e.g., two or more values, wherein N is simply greater than 0) without deviating from the scope of the present disclosure.

In some aspects, an STA may determine a value of a UP assigned to the STA. For example, $STA_1$ 114 may determine that it is assigned/allocated a particular UP value, such as $UP_3$ (e.g., $UP_j$, where j=3). Because the frame, packet, and/or data unit may contain a plurality of STSs, not all of which may be destined/intended for a single STA, each of the STAs for which that frame, packet, and/or data unit is destined/intended may wish to determine which of the plurality of STSs in the frame, packet, and/or data unit are destined/intended for that particular STA. In some aspects, an STA may select which of the plurality of STSs in the frame, packet, and/or data unit are destined to the STA by considering a number of STSs allocated to one or more other STAs each assigned a UP value that is different from the UP value assigned to the STA. If assigned/allocated $UP_3$, $STA_1$ 114 may determine that the number of STSs destined/intended for that particular STA is $B_3$ (e.g., $B_3$-number of STSs are destined/intended for $STA_1$ 114). However, because the frame, packet, and/or data unit may have more than $B_3$-number of STSs, $STA_1$ 114 may wish to determine exactly which of those more-than-$B_3$-number of STSs is/are the specific $B_3$-number of STSs destined/intended for $STA_1$ 114.

To do so, $STA_1$ 114 may consider the number of STSs assigned/allocated to one or more other STAs assigned a UP value different from (e.g., higher/greater than and/or lower/lesser than) $UP_3$ (e.g., STA(s) assigned/allocated any one or more of $UP_0$, $UP_1$, $UP_2$, $UP_4$, $UP_5$, . . . , and/or $UP_N$). For example, by considering (i) that $B_0$-number of STSs are assigned/allocated to STA(s) assigned/allocated $UP_0$, (ii) that $B_1$-number of STSs are assigned/allocated to STA(s) assigned/allocated $UP_1$, and/or (iii) that $B_2$-number of STSs are assigned/allocated to STA(s) assigned/allocated $UP_2$, $STA_1$ 114 (if assigned/allocated $UP_3$) may determine that the starting stream index of the STS(s) destined/intended for it begin(s) after the sum of $B_0$-, $B_1$-, and $B_2$-number of STSs (which are destined/intended for other STA(s) assigned/allocated to UP values different from the UP value assigned/allocated to $STA_1$ 114).

One of ordinary skill in the art will understand that any one or more of $A_0$-$A_N$ through $Z_0$-$Z_N$ shown in FIG. 3 may have various values, characteristics, relationships, features, requirements, conditions, and/or other suitable attributes without necessarily deviating from the scope of the present disclosure. In some aspects, the number of STSs intended for every STA assigned a higher UP value may never exceed the number of STSs intended for the STA. For example, if $STA_1$ 114 is assigned/allocated $UP_3$, none of the individual values of $B_4$, $B_5$, . . . , nor $B_N$ may exceed the value of $B_3$. In some aspects, a number of STSs intended for the STA may be greater than or equal to a number of STSs intended for every STA assigned a higher UP value than the UP assigned to the STA. For example, if $STA_1$ 114 is assigned/allocated $UP_3$, the value of $B_3$ is greater than or equal to the individual values of $B_4$, $B_5$, . . . , and $B_N$.

In some aspects, at least one of $A_0$-$A_N$ through $Z_0$-$Z_N$ (shown in FIG. 3) may be variable (e.g., varying, adjustable, non-fixed, comprising a range of two or more possible values, etc.). In some aspects, at least one of the values in the selected subset is variable, and a determination of an exact value for the variable includes considering the determined total number of STSs included in the data frame, packet, and/or data unit. In some aspects, at least one of the values in the selected subset is variable, and a determination of an exact value for the variable includes subtracting at least some of the other values in the selected subset of values from the determined total number of STSs included in the data frame, packet, and/or data unit. For example, referring to FIG. 3, if FV=B, the selected subset includes $B_0$, $B_1$, $B_2$, $B_3$, $B_4$, $B_5$, . . . , $B_N$, and at least one of these values is variable. For the purpose of illustration but not limitation, it can be assumed that $B_3$ is variable. As described above, if FV=B, the number of STSs included in the frame, packet, and/or data unit is equal to b (e.g., a non-negative integer value). To determine the exact value for $B_3$ (e.g., a variable, in this example), the value of b is subtracted by the value of $B_0$, $B_1$, $B_2$, $B_4$, and $B_5$ . . . $B_N$. For instance, if b=5, $B_0$=3, $B_1$=1, $B_2$=0, $B_4$=0, and $B_5$ . . . $B_N$=0, then $B_3$=5−3−1=1. In some aspects, at least one of the values in the selected subset is variable, and a determination of an exact value for the variable comprises eliminating a possible value if addition of that possible value to the other subset of values generates a sum that exceeds the total number of STSs included in the data frame, packet, and/or data unit. For example, referring to FIG. 3, if FV=B, $B_0$=3, $B_1$=1, $B_2$=0, $B_4$=0, and $B_5$ . . . $B_N$=0, and $B_3$ is variable, then the exact value of $B_3$ may be determined by eliminating possible values that cause the sum of the subset of values (e.g., sum of $B_0$-$B_N$) to exceed b=5. For instance, the value of $B_3$=2 can be eliminated because $B_3$=2 would result in the sum of the subset of values (e.g., sum of $B_0$-$B_N$) to equal to 6, which exceeds b=5.

In some configurations, the TX may determine to operate on, search for, and/or probe exclusively a limited number or subset of possible channels. For instance, the TX may determine to operate on, search for, and/or probe (e.g., a primary channel) exclusively on non-overlapping channels. Non-limiting examples of non-overlapping channels may include channels 1, 6, 11, and/or 14. In some configurations, the TX may do so when operating in a particular band (e.g., 2.4 GHz). Non-limiting examples of (potentially) overlapping channels include one or more of the remaining channels. When at least a portion of its frequency spectrum/range, bandwidth, and/or spectral mask of a first channel overlaps (or has the potential to overlap) with at least a portion of the frequency spectrum/range, bandwidth, and/or spectral mask of at least a second channel, then the first channel may be characterized as an overlapping channel. In some configurations, the TX may determine to operate on, search for, and/or probe non-overlapping channels prior to operating on, searching for, and/or probing on overlapping channels. In some configurations, the TX may select which channel to operate on, search for, and/or probe based on a likelihood and/or probability of the channel being a non-overlapping channel. In some configurations, the TX may determine whether to operate on, search for, and/or probe a particular channel based on the likelihood and/or probability of the channel being a non-overlapping channel.

In some configurations, the data packet may include various portions having relatively different characteristics. For instance, a first portion of the data packet may include a field that is common, shared, and/or otherwise available/provided to every user, receiver, intended/destined recipient, and/or destination of the data packet. In some configurations, the field that is common, shared, and/or otherwise available/provided to every user, receiver, intended/destined recipient, and/or destination of the data packet may contain an allocation of resources (e.g., resource units) for each of the user, receiver, intended/destined recipient, and/or destination of the data packet. A second portion of the data packet may include a plurality of user-specific information that do not belong to the field that is common, shared, and/or otherwise available/provided to every user, receiver, intended/destined recipient, and/or destination of the data packet. There may exist a bit-level separation between the first portion and the second portion. In some configurations, the first and second portions may be located in a single one of the fields described above (e.g., fields). In some configurations, the first and second portions may be located in a plurality of the fields described above (e.g., fields). In some configurations, the TX may generate and/or transmit a data packet including a header or preamble including a field common to a plurality of users and also including a plurality of fields each containing user-, receiver-, recipient-, and/or destination-specific information. In such configurations, the RX may receive and/or decode a data packet including a header or preamble including a field common to a plurality of users and also including a plurality of fields each containing user-, receiver-, recipient-, and/or destination-specific information. In some configurations, the RX may utilize the field common to all users, receivers, recipients, and/or destinations to determine which of the resources (e.g., resource units) are allocated to it. In some configurations, the RX may utilize the user-, receiver-, recipient-, and/or destination-specific information to determine at least one of user-, receiver-, recipient-, and/or destination-specific identifier, modulation and coding scheme (MCS), number of space-time streams corresponding to that specific user, receiver, recipient, and/or destination. In some configurations, the resource unit and/or resource allocation may include a portion or subset of the full bandwidth that is allocated to that specific user, receiver, recipient, and/or destination.

In some configurations, the RX(s) may need to determine whether the data packet is one of various possible types of data packets. For example, the data packet may be a non-legacy data packet. If the data packet is not a non-legacy data packet, the data packet may be a legacy data packet. In some configurations, an auto-detection algorithm for determining whether a received data packet is a legacy or non-legacy data packet may provide certain enhancements to the overall system. An auto-detection algorithm for determining whether a received data packet is a legacy or non-legacy data packet may involve performing a comparison or evaluation between/among various portions, bits, segments, or other subparts of the overall data packet. For instance, the RX may receive a data packet that includes a header/preamble, determine whether any portion of the header/preamble of the data packet is repeated at least once, and determine whether the data packet is a legacy or non-legacy data packet based on the determination that that particular portion of the header/preamble portion of the data packet is repeated at least once. For example, if that particular portion is not repeated at least once, then the RX may determine that the data packet is a legacy data packet. As another example, if that particular portion is repeated at least once, then the RX may determine that the data packet is not a legacy data packet. This particular portion may be any portion or an entirety of any one or more of the fields described in greater detail above without deviating from the scope of the present disclosure.

In some configurations, the repetition of a particular portion of the data packet may trigger the RX to change its mode of operation from one mode to another mode. For example, the RX may be in an outdoor area and thus may benefit from changing its settings in order to operate in an outdoor or extended mode of operation. Accordingly, the TX may generate and/or transmit the data packet such that a particular portion is repeated at least once. The RX may receive and/or decode the data packet (including that particular portion) and, in response to detecting the (at least once) repetition of that particular portion, determine to change its mode of operation from its current mode of operation to another mode of operation. A non-limiting example involves changing the mode of operations to an outdoor or extended mode of operation, but the mode of operation can be changed to any other mode of operation (other than the current mode of operation) without deviating from the scope of the present disclosure. This particular portion may be any portion or an entirety of any one or more of the fields described in greater detail above without deviating from the scope of the present disclosure.

In some circumstances, one of the apparatuses (e.g., RXs/STAs) may transmit a message to another apparatus (e.g., TX/AP) to indicate whether a particular signal previously transmitted by that apparatus (e.g., TX/AP) was successfully received and/or decoded (e.g., at the RX). As an example, when that particular signal was successfully received and/or decoded, the RX/STA may transmit an acknowledgement message (ACK). As another example, when that particular signal was not successfully received and/or decoded, the RX/STA may transmit a negative acknowledgement message (NACK). A message may refer to a frame, packet, data packet, any sequence of bits/bytes/octets, and/or other suitable terms. In some configurations, such a message may be a block acknowledgement message (BA). While an ACK/NACK may indicate whether a single frame/packet was successfully received and/or decoded, a BA may be a message that indicates whether a plurality of frames/packets (e.g., MPDUs) were successfully received and/or decoded. In systems, such a message (e.g., ACK/NACK/BA) may be transmitted by one apparatus (e.g., RX/STA) at a time. In other words, $RX_1$ may transmit such a message (e.g., ACK/NACK/BA) at $Time_1$, and $RX_2$ may transmit another such message (e.g., ACK/NACK/BA) at $Time_2$.

However, when a relatively high number of such apparatuses (e.g., RXs/STAs) exist in a BSS or communication range associated with or corresponding to the other apparatus (e.g., TX/AP) to which that message (e.g., ACK/NACK/BA) is being sent, the amount of time consumed/utilized for communicating such messages (e.g., ACK/NACK/BA) by all of those apparatuses (e.g., RXs/STAs) may be considerable. In some configurations, multiple apparatuses (e.g., RXs/STAs) may transmit such a message (e.g., ACK/NACK/BA) at the same (or similar or substantially similar/same) time. For example, in some configurations, $RX_1$ may transmit such a message (e.g., ACK/NACK/BA) at $Time_1$, and $RX_2$ may transmit such a message also at (or approximately at) $Time_1$. Such aspects may sometimes be referred to as a multi-user (MU) transmission. Such aspects may sometimes be referred to an UL MU transmission. In some configurations, such messages may be multiplexed. Multiplexing may refer to a method, process, and/or algorithm of combining multiple (e.g., a plurality of) signals/messages/packets/frames (e.g., ACK/NACK/BA) into a single signal/message/packet/frame. Multiplexing may refer to or include space-division multiplexing, frequency-division multiplexing, time-division multiplexing, polarization-division multiplexing, code-division multiplexing, orbital angular momentum multiplexing, and/or various other suitable types/forms of multiplexing.

As an example, the message (e.g., ACK/NACK/BA) from $RX_1$ may be multiplexed with the message (e.g., ACK/NACK/BA) from $RX_2$. In other words, the ACK/NACK/BA can be a multiplexed UL MU transmission. Prior to such multiplexing, in some configurations, one apparatus (e.g., TX/AP) may transmit to one or more other apparatuses (e.g., $RX_1/STA_1$, $RX_2/STA_2$, etc.) a request message to solicit an acknowledgement message (e.g., ACK/NACK/BA) from multiple (e.g., a plurality of) other apparatuses (e.g., $RX_1/STA_1$, $RX_2/STA_2$, etc.). Such a request message may sometimes be referred to as an ACK request, a NACK request, a BA request, and/or any other suitable term. Such a request message may also be referred to as a multi-user message (e.g., a multi-user ACK request, a multi-user NACK request, a multi-user BA request). Such a request message may be sent to multiple (e.g., a plurality of) such apparatuses (e.g., $RX_1/STA_1$, $RX_2/STA_2$, etc.). In some circumstances, such a request message may be sent to multiple (e.g., a plurality of) such apparatuses (e.g., $RX_1/STA_1$, $RX_2/STA_2$, etc.) at the same (or substantially similar) time. As an example, an apparatus (e.g., TX/AP) may transmit a request message (e.g., a MU ACK request, a MU NACK request, a MU BA request) to solicit a request message (e.g., ACK/NACK/BA) from multiple (e.g., a plurality of) other apparatuses (e.g., $RX_1/STA_1$, $RX_2/STA_2$, etc.) in an UL MU transmission.

In some configurations, an apparatus (e.g., TX/AP) may transmit a multi-user BA request configured to solicit an ACK/NACK/BA to be transmitted from a plurality of receivers (e.g., $RX_1/STA_1$, $RX_2/STA_2$, etc.) of the multi-user BA request at the same time. In some configurations, an apparatus (e.g., RX/STA) may receive a multi-user BA request configured to request an ACK/NACK/BA (e.g., from a plurality of recipients). In some configurations, the multi-user BA request may be included in an ULTR. In some configurations, the multi-user BA request may be included in the data packet (PPDU). The multi-user BA request may be configured to solicit an ACK/NACK/BA to be transmitted by a plurality of receivers (e.g., $RX_1/STA_1$, $RX_2/STA_2$, etc.)

of the multi-user BA request at the same time. In some configurations, the BA request may include certain data/information (e.g., a receiver identifier, a station identifier, an associated identifier, a station/receiver associated identifier, BA request control, BA request information) associated with and/or corresponding to each apparatus (e.g., RX/STA). The apparatus (e.g., STA) may also transmit an ACK/NACK/BA when certain data/information (e.g., a receiver identifier, a station identifier, an associated identifier, a station/receiver associated identifier, BA request control, BA request information) included in the multi-user BA request corresponds to data assigned/associated/stored in the apparatus (e.g. STA).

Information included in frames/packets communicated from one apparatus to another apparatus may be associated with one or more access categories, stream identifiers (IDs), traffic categories, and/or traffic IDs. Some systems may only be able to communicate packets/frames associated with a single access category, stream identifier (ID), traffic category, and/or traffic ID at a single point in time. In other words, such systems may transmit a first frame/packet associated with a first access category, first stream identifier (ID), first traffic category, and/or first traffic ID at $Time_1$, and may have to wait until a next transmission time (e.g., TXOP) to transmit second frame/packet associated with a second access category, second stream identifier (ID), second traffic category, and/or second traffic ID (which is different from the first stream identifier (ID), the first traffic category, and/or the first traffic ID, respectively, as transmitted at $Time_1$).

However, enabling transmission of data associated with multiple (e.g., a plurality of different) access categories, stream identifiers (IDs), traffic categories, and/or traffic IDs in a single transmission/frame/packet may contribute to increased efficiency and/or throughput. In some configurations, a frame/packet may be a MAC service data unit (MSDU), a physical layer service data unit (PSDU), physical layer convergence protocol (PLCP) protocol data unit (PPDU), and/or various other types of frames/packets. In some configurations, data/frames/packets associated with and/or corresponding to multiple (e.g., two or more different) (e.g., a plurality of) access categories, stream identifiers (IDs), traffic categories, and/or traffic IDs may be included in a single MSDU/PSDU/PPDU and/or a single ACK/NACK/BA communicated between the TX/AP and one or more RXs/STAs during DL and/or UL communication. The frame/packet may be an aggregated frame/packet. For instance, the frame/packet may be an aggregated MSDU, an aggregated PSDU, an aggregated PPDU, and/or an aggregated other type of frame/packet.

As an example, a TX/AP may transmit a frame/packet comprising a first (data) portion associated with and/or corresponding to a first access category, first stream identifier (ID), first traffic category, and/or first traffic ID and further comprising a second (data) portion associated with and/or corresponding to a second access category, second stream identifier (ID), second traffic category, and/or second traffic ID (which is different from the first stream identifier (ID), the first traffic category, and/or the first traffic ID, respectively). In other words, the TX/AP may transmit a first frame/packet associated with a first access category, first stream identifier (ID), first traffic category, and/or first traffic ID at $Time_1$ and (concurrently, in the same transmission, in the same transmission time interval, in the same TXOP, and/or in the same frame/packet) also transmit a second frame/packet associated with a second access category, second stream identifier (ID), second traffic category, and/or second traffic ID (which is different from the first stream identifier (ID), the first traffic category, and/or the first traffic ID).

As mentioned above, a frame/packet may sometimes be referred to as a PPDU. Each PPDU may include an allocation and/or a portion for a payload of the frame/packet/PPDU. Such an allocation and/or portion (e.g., payload) may include data sometimes referred to as the MSDU/MPDU. However, the size/duration of the MSDU/MPDU can vary based on many factors (e.g., MCS, bandwidth, etc.). In some circumstances, the MSDU/MPDU may be too large/long/big to even fit in and/or be accommodated by the aforementioned allocation/portion/payload of the PPDU. In some circumstances, the allocation/portion/payload may accommodate at least one MSDU/MPDU, but the allocation/portion/payload may not accommodate a non-integer number of MSDUs/MPDUs. In such circumstances, padding may be added/included to fill the unused portion of the allocation/portion/payload of the PPDU. However, in the aforementioned circumstances, a fragment of the MSDU/MPDU may fit and/or be accommodated in the allocation/portion/payload of the PPDU, thereby possibly improving the efficiency and throughput of the overall system.

In some configurations, the network/system/device/apparatus/apparatuses may enable/allow/support/provide/accommodate fragments/fragmentation of an MSDU/MPDU. For example, an apparatus (e.g., TX/AP) may determine a length/duration/size of a single MSDU/MPDU for transmission in a PPDU. Based on the determined length/duration/size of the single MSDU/MPDU, the apparatus (e.g., TX/AP) may determine how many MSDUs/MPDUs can be included in the PPDU. The apparatus (e.g., TX/AP) may determine to include a fragment of an MSDU/MPDU when a number of MSDUs/MPDUs that can be included in the PPDU is a non-integer number. In some configurations, the apparatus (e.g., TX/AP) may determine that a length/duration/size of a single MSDU/MPDU for transmission in a PPDU is greater than an allocated portion/duration/size in the PPDU when the length/duration/size of the single MSDU/MPDU for transmission in a PPDU is greater than an allocated portion/duration/size in the PPDU. In some configurations, the apparatus (e.g., TX/AP) may determine a length/duration/size of a portion of a PPDU allocated for an MSDU/MPDU, and the apparatus (e.g., TX/AP) may determine to include a fragment of the MSDU/MPDU in the PPDU for transmission when the determined length/duration/size of the portion of the PPDU allocated for the MSDU/MPDU is less a length/duration/size of at least one entire MSDU/MPDU. In one or more of the aforementioned configurations, the apparatus (e.g., TX/AP) may transmit the PPDU including the fragment of the MSDU/MPDU.

In some configurations, an apparatus (e.g., RX/STA) may receive a PPDU that includes a fragment of an MSDU/MPDU, and the fragment of the MSDU/MPDU includes less than an entirety of a complete MSDU/MPDU. In some configurations, the determining the length/duration/size of the single MSDU/MPDU for transmission in the PPDU is based on at least one of a bandwidth, MCS, and/or various other factors. The MSDU/MPDU can be fragmented dynamically based on various factors, such as a remaining portion of the PPDU allocated for one or more MSDUs/MPDUs, a size/length/duration of padding for the remaining portion of the PPDU allocated for one or more MSDUs/MPDUs, and/or various other suitable factors.

Sounding protocols may sometimes involve an RX/STA transmitting feedback frames (e.g., a beamforming frame) one RX/STA at a time. However, in an environment with many RXs/STAs, this may cause relatively lengthy delays for the TX/AP to receive all of the feedback frames (e.g., beamforming frames) it needs/wants prior to performing a DL transmission to those RXs/STAs.

In some configurations, an apparatus (e.g., TX/AP) may transmit an ULTR and, in response to transmitting the ULTR, receive a feedback frame (e.g., a feedback report, a beamforming frame, etc.) from a plurality of other apparatuses (e.g., RXs/STAs) at a same time. In some configurations, an apparatus (e.g., RX/STA) may receive an ULTR and, in response to receiving the ULTR, transmit a feedback frame (e.g., a feedback report, a beamforming frame, etc.) at a same time as a transmission of a feedback frame (e.g., a feedback report, a beamforming frame, etc.) by another apparatus (e.g., RX/STA). In some configurations, an apparatus (e.g., TX/AP) may, prior to transmitting an ULTR, transmit a null data packet announcement frame and transmit a null data packet after transmitting the null data packet announcement frame. In some configurations, an apparatus (e.g., RX/STA) may, prior to receiving an ULTR, receive a null data packet announcement frame and receive a null data packet after receiving the null data packet announcement frame.

In some configurations, an apparatus (e.g., STA) may determine/read/ascertain a total number of space-time streams (STSs) included in the data packet/frame/etc. using/based on a value/field/information included in a portion (header) of the data packet/frame/etc. In some configurations, the apparatus (e.g., STA) may determine/read/ascertain a total number of a plurality of users/destinations/STAs to which a data packet/frame/etc. is destined/intended using/based on information included in the data packet/frame/etc. In some configurations, the apparatus (e.g., STA) may utilize an identifier/value/field/information included in the frame/data packet/etc. to select a subset of values from a set of values that indicate/identify a number of space-time streams destined to at least one of the plurality of users/destinations/STAs to which the data packet/frame/etc. is destined/intended. In some configurations, at least one of the values in the selected subset of values (indicating the number of space-time streams destined to at least one of the users/destinations/STAs) varies/ranges/depends upon various factors. In some configurations, the apparatus (e.g., STA) may determine/calculate/compute an (exact) value for the at least one of the values in the selected subset of values that varies/ranges by considering a total number of STSs included in the data packet/frame/etc. In some configurations, the apparatus (e.g., STA) may determine/calculate/compute an (exact) value for the at least one of the values in the selected subset of values that varies/ranges by deducting/subtracting some or all other values in the selected subset of values from the total number of STSs included in the data packet/frame/etc.

In some configurations, the apparatus (e.g., STA) may determine/calculate/compute an (exact) value for the at least one of the values in the selected subset of values that varies/ranges by eliminating one or more possible values if an addition of those one or more possible values to the other subset of values generates a sums that exceeds the total number of STSs included in the data packet/frame/etc. In some configurations, the apparatus (e.g., STA) may determine a value of a user position assigned/allocated to the STA. In some configurations, the apparatus (e.g., STA) may select which of (e.g., which may be different from just how many) of the streams of the plurality of STSs included in the data packet/frame/etc. is/are destined to/intended for the apparatus (e.g., STA) by considering a number of STSs allocated/assigned to other apparatuses (e.g., STAs) that are assigned/allocated user position values different from (e.g., lower in value than) the value of the user position assigned/allocated to the apparatus (e.g., STA). In some configurations, a number of STSs intended/destined for/to a first user/destination/STA may be greater than or equal to (e.g., never exceed) a number of STSs intended/destined for/to a second user/destination/STA. Any number of spatially-multiplexed users in a DL or UL MU-MIMO transmission may be implemented. Any number of STS values for each user in a MU-MIMO RU may be implemented. In many other configurations, another apparatus (e.g., AP, another STA) may perform transmitter-side processes that relate to/pertain to the receiver-side processes described above with reference to a STA. In some configurations, an apparatus (e.g., STA) having/with a pending UL data, after receiving a MU DL transmission, may set a bit in its UL MU response frame (e.g., an acknowledgement of some sort). That bit may be configured to inform the receiving apparatus (e.g., AP, another STA) that the transmitting apparatus (e.g., STA) has a pending UL data ready for near future transmission.

In some configurations, an AP (e.g., physical AP) may function, operate, be, and/or be associated with one or more virtual APs (VAPs). In some configurations, a virtual AP is a logical entity that may reside within a physical AP. In some configurations, to a STA, the virtual AP appears as an independent AP with its own unique SSID. In some configurations, each virtual AP may advertise a unique BSSID. In some configurations, a physical AP may advertise a separate beacon for each virtual AP that it supports. In some configurations, each BSSID corresponds to a particular virtual AP of the physical AP. In some configurations, from a STA's perspective, these virtual APs appear as separate APs. In some circumstances, without some information about other virtual APs associated with that physical AP, there is a likelihood of collision among communications between the virtual APs and their respective STAs. In some circumstances, if one virtual AP or its client has some information about the other virtual AP or its client, the likelihood of collisions may be less than it might be otherwise. In some configurations, an AP may establish two or more virtual APs for a single physical AP. In some configurations, each virtual AP is associated with a different BSSID (e.g., VAP1 is associated with BSSID1 and VAP2 is associated with BSSID2). In some configurations, the BSSIDs may have at least one common (e.g., shared, same, etc.) element (e.g., information element, e.g., BSS group designation, BSS color designation, etc.). In some configurations, the AP may advertise/transmit/communicate (and one or more STAs may therefore receive) a separate beacon for each of the virtual APs (e.g., a first beacon for VAP1 and, subsequently, a separate second beacon for VAP2). In some configurations, each beacon may include a BSSID associated with its virtual AP (e.g., to the STAs within the coverage area of the physical AP). In some configurations, two or more beacons may have at least one common (e.g., shared, same, etc.) element (e.g., information element, e.g., BSS group designation, BSS color designation, etc.). In some configurations, the AP may use a first BSSID and/or first beacon to establish/initiate/configure/identify communication (of a first virtual AP) with a first STA. In some configurations, the AP may use a second BSSID (different from the first BSSID) and/or second beacon (different from the first beacon) to establish/initiate/configure/identify communication (of a second virtual AP) with a second STA. In some configurations, an element of information (e.g., identifying information, e.g., BSS group designation, BSS color designation, etc.) of the communication (of the first virtual AP) with the first STA is common relative to (e.g., shared with, same as, etc.) an element of information (e.g., identifying information, e.g., BSS group designation, BSS color designation, etc.) of the communication (of the second virtual AP) with the second STA. In some configurations, an apparatus may receive/transmit/communicate packets/frames with one or more other apparatuses (e.g., STAs) (e.g., each associated with a different virtual AP) (e.g., STA1 associated with VAP1, STAs associated with VAP2) in a single/common/same/shared multi-user transmission. In some configurations, a particular field (e.g., one or more signal (SIG) fields), or some information contained therein, for those communications may be the same/shared/common/etc.

In some configurations, an apparatus (e.g., STA) may transmit and another apparatus (e.g., AP) may receive a data packet that may include a plurality of components, portions, parts, fragments, partitions, etc. Such a data packet may sometimes be referred to as an aggregated data packet. By including such a plurality of components, portions, parts, fragments, partitions, etc., there is a likelihood that fewer data packets may need to be communicated (e.g., transmitted) separately, thereby potentially increasing communication efficiency and overall throughput. In some configuration, when a data packet with a plurality of such components, portions, parts, fragments, partitions, etc. is received, the apparatus (e.g., AP) may wish to communicate acknowledgement information to the apparatus (e.g., STA) that transmitted that aggregated data packet. In some configurations, the apparatus (e.g., STA) may transmit and another apparatus (e.g., AP) may receive an aggregated data packet (e.g., aggregated protocol data unit (PDU)) comprising at least one data packet (e.g., service data unit (SDU)) that includes a plurality of (e.g., multiple) fragments (e.g., incomplete data packets) (e.g., fragments of one or more SDUs). In some configurations, each data packet included in the aggregated data packet is associated with a series/chronology/order/arrangement/sequence/array/success number. In some configurations, that apparatus (e.g., AP) may transmit a block acknowledgement corresponding to or in response to receiving the aggregated data packet transmitted by the other apparatus (e.g., STA). In some configurations, the block acknowledgement comprises an indication of a number (e.g., a singular number, a plural number, a minimum number, an average number, a maximum number, a counting number, a whole number, a positive integer, etc.) of fragments included in the data packet. In some configurations, the block acknowledgement comprises an indication of a beginning one of the series/chronology/order/arrangement/sequence/array/success number. In some configurations, the block acknowledgement comprises a bitmap that includes acknowledgement information. In some configurations, the block acknowledgement comprises acknowledgement information for each packet. In some configurations, the acknowledgement information for each packet is included in a number of bits that correspond to the indicated number of fragments. In some configurations, acknowledgment information for a sequentially first packet (e.g., a packet including a plural number (e.g., three) of fragments) in the aggregated data packet is included in a first set or plural number of (e.g., three) bits of the bitmap. In some configurations, acknowledgement for a sequentially second packet (e.g., another packet including a plural number (e.g., three) of fragments) in the aggregated data packet is included in a second set or plural number (e.g., three) bits of the bitmap. In some configurations, the indicated number of fragments corresponds to a grouping of acknowledgement information included in the bitmap. In some configurations, the apparatus (e.g., STA) uses the indicated number of fragments to determine how acknowledgement information is assigned/allocated/grouped in the bitmap. In some configurations, the apparatus (e.g., STA) uses the indicated number of fragments to determine which of the bits in the bitmap correspond to each of the data packets and/or fragments thereof. In some configurations, each bit in the bitmap includes acknowledgement information corresponding to at least one of the plurality of (e.g., multiple) fragments of a data packet included in each data packet. In some configurations, a first set of bits in the bitmap correspond to the indicated beginning one of the series/chronology/order/arrangement/sequence/array/success number. In some configurations, each bit in the bitmap indicates acknowledgement information for at least one fragment.

At block 406, an apparatus may enable aspects related to performing communications regarding UL communication(s). In some aspects, at time $T_{iv}$, an AP may transmit and/or an STA may receive a signal/transmission (e.g., DL transmission(s) 232, 234) configured to trigger simultaneous/concurrent UL transmission(s) (e.g., UL transmission(s) 262, 264) by a plurality of STAs within a period of time after receiving that signal/transmission (e.g., DL transmission(s) 232, 234). As indicated above, such a signal/transmission (e.g., DL transmission(s) 232, 234) is sometimes referred to as an ULTR and/or various other suitable terms (as described in greater detail herein) without deviating from the scope of the present disclosure. The time duration between time $T_{iv}$ and time $T_{vii}$ may be represent the period of time between reception, by the STA(s), of the aforementioned DL transmission(s) 232, 234 (e.g., ULTR(s)) and transmission, by the STA(s), of the simultaneous/concurrent UL transmission(s) 262, 264. In some aspects, the ULTR (e.g., DL transmission(s) 232, 234) may be destined/intended for a plurality of STAs. In some aspects, the ULTR (e.g., DL transmission(s) 232, 234) may include information for identifying the plurality of STAs for the simultaneous/concurrent UL transmissions (e.g., UL transmission(s) 262, 264). For example, the ULTR (e.g., DL transmission(s) 232, 234) may identify which of the STAs within the coverage area of the AP are intended to receive the ULTR and/or intended to perform the simultaneous/concurrent UL transmission(s) 262, 264. In some aspects, the ULTR (e.g., DL transmission(s) 232, 234) may include an indication indicating whether to perform carrier sensing prior to initiating an UL transmission (e.g., UL transmission(s) 262, 264).

In some aspects, the ULTR (e.g., DL transmission(s) 232, 234) includes a first portion including a field common to the plurality of STAs and indicating a duration of at least a portion of the simultaneous/concurrent UL transmission(s) (e.g., UL transmission(s) 262, 264). In some aspects, the ULTR (e.g., DL transmission(s) 232, 234) includes a second portion including a plurality of user-specific fields indicating a description of resource allocation for the simultaneous/concurrent UL transmission(s) (e.g., UL transmission(s) 262, 264) by the plurality of STAs. For example, the ULTR (e.g., DL transmission(s) 232, 234) may identify, allocate, assign, and/or otherwise specific resource units (RUs) to be used by each the plurality of STAs that will be performing the simultaneous/concurrent UL transmission(s) (e.g., UL transmission(s) 262, 264). In some aspects, the ULTR further comprises an indication indicating whether a subsequent ULTR is a cascading ULTR. For example, the ULTR (e.g., DL transmission(s) 232, 234) may include a field, parameter, value, bit, portion and/or other suitable aspect indicating whether the ULTR will be followed by another, possibly unscheduled, ULTR.

In some aspects, the ULTR (e.g., DL transmission(s) 232, 234) may include information corresponding to a target received signal strength, which may refer to the desired/ targeted power of the signal(s) to be received by one or more of the antennas of the AP(s) (e.g., the desired/targeted power of the UL transmission(s) 262, 264). In some aspects, the ULTR (e.g., DL transmission(s) 232, 234) may include information corresponding to a power measurement of the transmitted ULTR, wherein the power measurement of the transmitted ULTR may refer to the power utilized to transmit the ULTR (e.g., DL transmission(s) 232, 234) using one or more antennas of the AP(s). In some aspects, based on the information corresponding to the power measurement of the transmitted ULTR (as included in the ULTR), an STA (e.g., $STA_1$ 114, $STA_2$ 116) may determine an amount of power loss during the DL transmission of the ULTR (e.g., DL transmission(s) 232, 234) from an apparatus (e.g., $AP_1$ 112) to the STA (e.g., $STA_1$ 114, $STA_2$ 116). For example, the STA (e.g., $STA_1$ 114, $STA_2$ 116) may consider the received information corresponding to the power measurement of the transmitted ULTR (e.g., DL transmission(s) 232, 234) in relation to the measured signal strength of the received ULTR in order to determine the amount of power loss during the DL transmission of the ULTR.

In some aspects, prior to receiving the ULTR (e.g., DL transmission(s) 232, 234), an AP may transmit and an STA may receive a signal/transmission indicating a start time associated with communication of an ULTR from the AP. Subsequently, the STA may enter a low-power mode until a time corresponding to the start time indicated in the received signal/transmission. By entering into the low-power mode, the STA can conserve power that might otherwise be expended prior to the approximate start time of the ULTR communication. In some aspects, the ULTR is further configured to assign at least one RU for random access. For example, DL transmission(s) 232, 234 may be configured to assign at least one RU for random access for UL multiuser transmission(s) (e.g., UL transmission(s) 262, 264).

In some configurations, the transmission of a data packet (e.g., data packet) may be from a TX to a plurality of RXs. Such a transmission may sometimes be referred to as a downlink (DL) transmission. In some configurations, the transmission of a data packet (e.g., data packet) may be from a plurality of RXs to the TX. Such a transmission may be referred to as an uplink (UL) transmission (or, alternatively, a multi-user UL transmission). In some configurations, the TX may coordinate the timing of the UL transmission from the plurality of RXs to the TX. Such a coordination procedure may at least in part include transmission of an UL transmission request (ULTR) from the TX to one or more of the plurality of RXs. The ULTR may be referred to by any other suitable name (e.g., UL request, UL response, trigger/ triggering data/portion/packet/frame, etc.) without deviating from the scope of the present disclosure. In some configurations, the ULTR may be a control frame (or part of a control frame). In some configurations, the ULTR may be a management frame (or part of a control frame). In some configurations, the ULTR may be a data frame (or part of a data frame). In some configurations, the ULTR may be a unicast frame. In some configurations, the ULTR is a multicast frame. In some configurations, the ULTR is transmitted at random times. In some configurations, the ULTR is transmitted at a target transmission time. The target transmission time may be determined based on various factors without deviating from the scope of the present disclosure.

For instance, in some configurations, the target transmission time for transmitting the ULTR may be associated with and/or corresponding to a target wake time. Generally, the target wake time is a function that permits the TX to define a specific time or set of times for individual RXs to access a transmission medium. The RX and the TX may exchange information that includes an expected activity duration to allow the TX to control the amount of contention and overlap among other/competing RXs. The TX may protect the expected duration of activity with various protection mechanisms. The target wake time may be determined implicitly and/or explicitly without deviating from the scope of the present disclosure. For example, the target wake time may be broadcasted in a beacon signal. As another example, the target wake time may be negotiated. Even the use of the target wake time may sometimes be negotiated between the TX and one or more RXs. In some configurations, the ULTR is part of a data packet (e.g., data packet), such as a PPDU. In some configurations, the ULTR is separate from the data packet (e.g., data packet), such as a PPDU; rather, the ULTR is either a standalone frame or data packet, or included with another data packet. In some configurations, the ULTR is a control format that carries information sufficient to identify the RX(s) transmitting the UL data packet (e.g., a multi-user UL PPDU) and/or allocating resources for the UL data packet (e.g., a multi-user UL PPDU). In some configurations, the ULTR is configured to trigger an UL transmission by each of the RXs, receivers, users, destinations, and intended recipients that receive the ULTR and/or the data packet (which may sometimes include the ULTR) within a certain period of time (e.g., inter-frame spacing (IFS)). In some configurations, the UL transmission that follows the ULTR may begin at a time that is indicated in the ULTR. In some configurations, the UL transmission that follows the ULTR may end/terminate at a time that is indicated in the ULTR. In some configurations, the ULTR may indicate the duration of the UL transmission that follows the ULTR. In some configurations, the ULTR may include various field configured to include various types of information, data, and content without deviating from the scope of the present disclosure. For instance, the ULTR may include a first portion including a field common to, shared with, and/or otherwise available/provided to a plurality of RXs. The field common to, shared with, and/or otherwise available/provided to the plurality of RXs may include various subfields characterizing or defining the format of the information included in the ULTR. The field common to, shared with, and/or otherwise available/provided to the plurality of RXs may additionally or alternatively include the duration of the UL data packet (e.g., a multi-user UL data packet). The field common to, shared with, and/or otherwise available/provided to the plurality of RXs may additionally or alternatively include the goal/objective/reason/purpose/intent of the UL data packet (e.g., a multi-user UL data packet). The ULTR may also include a second portion including a plurality of user-specific fields containing information that do not belong to the field that is common, shared, and/or otherwise available/provided to all of the plurality of RXs. In some configurations, the plurality of user-specific fields may include an identifier or identification of the RX(s). In some configurations, the plurality of user-specific fields may include a description of the resource allocation (e.g., resource units) for the UL data packet and/or its corresponding UL transmission. In some configurations, the plurality of user-specific fields may include information associated with the power level for the UL transmission of the UL data packet, or any other suitable/revenant aspect.

As described above, the ULTR may be included as a part of any data packet. In some configurations, the ULTR may be included as a part of the DL data packet (e.g., a multi-user DL data packet). In some configurations, the ULTR may be appended to an end portion of one or more data portions (e.g., Aggregated MAC Protocol Data Unit(s) [A-MPDU(s)]) of one or more portions (e.g., space-time stream(s)) of the DL data packet. In some configurations, the ULTR may be multiplexed across/over/throughout/onto one or more data portions (e.g., A-MPDU(s)) of the DL data packet (e.g., multi-user DL data packet). Such multiplexing may occur in the frequency domain and/or the spatial domain. By including the ULTR as a part of the DL data packet, the ULTR may not need to be transmitted as a separate frame/packet, thereby possibly reducing the need for certain IFS prior to and/or following the ULTR. Also, the ULTR may be able to piggy-back onto the DL data packet (e.g., multi-user DL data packet), thereby possibly reducing the need for some overhead (e.g., headers, preambles, etc.) that might otherwise be needed for a separately-transmitted ULTR. Accordingly, the TX may generate and/or transmit a DL data packet (e.g., a multi-user DL data packet) including a data portion (e.g., A-MPDU) and also including at least one ULTR, and the RX may receive and/or decode the DL data packet (e.g., a multi-user DL data packet) including the data portion (e.g., A-MPDU) and also including the at least one ULTR. Subsequently, without transmitting another (or a separate) ULTR, the RX may generate and/or transmit the UL data packet (e.g., a multi-user UL data packet), and the TX may receive and/or decode the UL data packet (e.g., a multi-user UL data packet). In some configurations, the DL data transmission and the UL data transmission may occur during a single transmission opportunity (TXOP). In other words, the DL data packet is generated and/or transmitted during a TXOP that is the same as the TXOP during which the UL data packet is generated and/or transmitted. In other words, the TX may generate/transmit a data packet (e.g., PPDU) including one or more data portions (e.g., A-MPDUs) to a plurality of RXs. In some configurations, the data packet includes the ULTR. In some configurations, the ULTR may be configured to trigger a simultaneous UL transmission by the plurality of STAs within a period of time (e.g., IFS) after receiving the data packet and/or the ULTR in the data packet. As described above, the ULTR may sometimes be a unicast frame. In some configurations, the ULTR may be included for each of the one or more data portions (e.g., A-MPDUs). In some configurations, each of the one or more data portions (e.g., A-MPDUs) is destined to a different RX (and thus may have a different ULTR). As described above, the ULTR(s) may precede a simultaneous, multi-user UL transmission by the plurality of RXs.

In some configurations, an apparatus (e.g., TX/AP) may transmit information/data/bit(s) indicating whether the receive signal (e.g., beacon) is associated with two or more ULTRs. In some configurations, an apparatus (e.g., TX/AP) may transmit information/data/bit(s) indicating that the two or more ULTRs are cascaded (e.g., transmitted in a cascaded sequence/number). In some configurations, an apparatus (e.g., RX/STA) may disregard/refrain from processing/considering any/every ULTR received during a time period beginning from receipt of the message/signal (e.g., beacon) and ending at the time corresponding to the scheduling information, the start time, and/or the time interval included in the received signal/message (e.g., beacon).

In some configurations, the ULTR may include information that may be used by the STA to determine how to subsequently communicate with the AP. For example, the ULTR may include information that the STA may utilize to determine a setting/parameter/configuration of an UL transmission/communication that follows receipt of the ULTR. The ULTR may include various types and configurations of such information. In some configurations, the ULTR includes an indication of a duration/size/length/modulation/coding/scheduling/encryption of the UL communication. In some configuration, the ULTR may include an indication of the packet/frame structure/type/format. In some configurations, the ULTR may include an indication of the category/type/capabilities of the STA. In some configurations, the STA may generate one or more frames/packets for an UL transmission/communication (that corresponds to/in response to the ULTR). In some configurations, the generated one or more frames/packets includes at least one frame/packet that is based on/is according to/is associated with/matches/is the same as/the indication (described above). In some configurations, the STA may have a default setting/parameter of communicating/transmitting a specific/predetermined/preset configuration/type/format of frame/packet (e.g., a null/empty signal/packet/frame/message) if/when the generated one or more packets are not based on/is according to/is associated with/matches/is the same as the indication (described above).

In some configurations, an acknowledgement message/signal may take the form of a block acknowledgement message/signal, a multi-user block acknowledgement, and/or various other suitable types of messages/signals. In some configurations, the AP may determine whether/that a DL acknowledgement message is expected to be/scheduled to be transmitted by the AP (e.g., immediately) preceding a DL transmission of the ULTR. In some configurations, the AP may determine whether/that the ULTR is expected to be/scheduled to be transmitted by the AP (e.g., immediately) preceding a transmission of an acknowledgement message. In some configurations, the AP may combine/join/aggregate/include the acknowledgement message and the ULTR into a single/unitary/contiguous/continuous/unbroken/uninterrupted DL transmission. In some configurations, the STA may receive a single/unitary/contiguous/continuous/unbroken/uninterrupted DL transmission that has at included/combined/joined/aggregated an acknowledgement message and the ULTR. In some configurations, the single/unitary/contiguous/continuous/unbroken/uninterrupted DL transmission may be without some attribute/feature/aspect that would otherwise be included. For example, the single/unitary/contiguous/continuous/unbroken/uninterrupted DL transmission may be without an inter-frame spacing that might otherwise exist between the acknowledgement message and the ULTR. As another example, the single/unitary/contiguous/continuous/unbroken/uninterrupted DL transmission may be without a data frame/portion/packet that might otherwise exist.

As used herein, the term resources may refer to and/or be interchangeable with other terms, such as communication resources/elements/units, resource elements/units, time-frequency resources/elements/units, OFDMA resources/elements/units, MU-MIMO resources/elements/units, and/or any other suitable resources/elements/units utilized in various wireless communication technologies. In some configurations, the STA may receive an ULTR that has many fields (e.g., STA-specific information field, user-specific information field, etc.), and one of the fields may include a plurality of bits. Based on a first subset of the plurality of bits included in the ULTR, in some configurations, the STA may determine whether one or more resources is allocated to the STA. Based on a first subset of the plurality of bits included in the ULTR, in some configurations, the STA may determine whether one or more resources allocated to the STA is included in a preferred/preselected/preconfigured/preset/primary communication channel (or a non-preferred/preselected/preconfigured/preset/primary communication channel, next-preferred/preselected/preconfigured/preset communication channel, etc.). Based on a second subset of the plurality of bits included in the ULTR, in some configurations, the STA may determine how many/which/a number of/a quantity of/a number of units of resource(s) allocated to the STA and/or other STAs.

In some configurations, the STA may determine an index/indices of the resource(s) based on a second subset of the plurality of bits included in the ULTR. In some configurations, the index/indices indicates which of the available resources (e.g., in a/the communication channel) is allocated to the STA and/or other STAs. In some configurations, the index/indices may correspond to/be associated with a chronological/sequential/ordering of the available resources. Based on a second subset of the plurality of bits included in the ULTR, in some configurations, the STA may determine which of the available resources are the one or more resource units allocated to the STA and/or other STAs. In some configurations, a second subset of the plurality of bits may correspond to/be associated with a bandwidth of the resources allocated to the STA and/or other STAs. In some configurations, the available resource(s) may refer to/correspond to the bandwidth available for communication. In some configurations, the resource(s) may refer to/correspond to a subset of the available bandwidth. In some configurations, the subset of the available bandwidth may correspond to the bandwidth allocated/reserved/scheduled for that/a particular STA(s). In some configurations, a first range of values for the second subset of bits of the plurality of bits may correspond to/be associated with a resource size/number of resources/channel size/bandwidth that is different from (e.g., larger, smaller, etc.) relative to another resource size/number of resources/channel size/bandwidth corresponding to/associated with a second range of values for the second subset of bits of the plurality of bits. In some configurations, the first range may be different from the second range.

In some configurations, the ULTR may include information indicating/associated with/corresponding to a threshold/target/ideal/selected/preselected/optimized received signal strength for the one or more STAs. In some configurations, the threshold/target/ideal/selected/preselected/optimized received signal strength for one STA to which the ULTR is addressed or destined is different from the threshold/target/ideal/selected/preselected/optimized received signal strength for another STA to which the ULTR is addressed or destined. In some configurations, the ULTR may include information indicating/associated with/corresponding to an encryption, modulation, encoding, and/or encoding for the one or more STAs (e.g., to which the ULTR is destined or addressed). In some configurations, the encryption, modulation, encoding, and/or encoding for one STA to which the ULTR is addressed or destined is different from the encryption, modulation, encoding, and/or encoding for another STA to which the ULTR is addressed or destined. In some configurations, the ULTR may comprise information indicating/associated with/corresponding to an amount/duration/profile/measurement of power of the transmitted ULTR. In some configurations, the information indicating/associated with/corresponding to the amount/duration/profile/measurement of power of the transmitted ULTR is communicated to all STAs (e.g., a plurality of STAs) to which the ULTR is destined or addressed.

At block 408, an apparatus may enable aspects related to performing operations related to at least one NAV. In some aspects, in response to receiving the ULTR (e.g., DL transmission(s) 232, 234), an STA may consider a NAV unless the NAV was set by a frame originating from the apparatus from which the ULTR was transmitted. In some aspects, in response to receiving the ULTR (e.g., DL transmission(s) 232, 234), if/when the NAV was (previously) set by a frame originating from an AP (e.g., $AP_1$ 112) from which the ULTR is transmitted, an STA (e.g., $STA_1$ 114, $STA_2$ 116) may transmit a frame, packet, and/or data unit (e.g., UL transmission(s) 262, 264) without considering the NAV. In some aspects, an STA (e.g., $STA_1$ 114, $STA_2$ 116) may refrain from considering a NAV when the NAV was most recently set by an apparatus (e.g., $AP_1$ 112) that transmitted the ULTR (e.g., DL transmission(s) 232, 234). For example, referring to FIG. 2, in response to receiving an ULTR (e.g., DL transmission(s) 232, 234) from $AP_1$ 112, $STA_1$ 114 may consider a NAV unless the NAV was most recently set by a frame originating from $AP_1$ 112. In some aspects, an STA (e.g., $STA_1$ 114) may refrain from considering a NAV when an identifier of the apparatus that most recently set the NAV (e.g., of $STA_1$ 114) is the same as an identifier of the apparatus (e.g., $AP_1$ 112, $STA_2$ 116) that transmitted the ULTR (e.g., DL transmission(s) 232, 234). If such an apparatus (e.g., $AP_1$ 112, $STA_2$ 116) had most recently set the NAV of $STA_1$ 114, then the NAV (e.g., of $STA_1$ 114) may already be configured with parameters and settings that are relatively less likely to result in interfering communications. Accordingly, refraining from considering the NAV in such circumstances can conserve time, power, and computational resources.

In some aspects, an STA (e.g., $STA_1$ 114) may receive a frame (e.g., included in a transmission 130) from another STA (e.g., $STA_2$ 116) and use that frame to set a NAV. In some aspects, the STA (e.g., $STA_1$ 114) may refrain from considering the NAV of the STA (e.g., $STA_1$ 114) in response to receiving the ULTR (e.g., DL transmission(s) 232, 234 from $AP_1$ 112) when an identifier (e.g., a BSS identifier (BSSID), a medium/media access control (MAC) address, etc.) of the BSS with which the STA (e.g., $STA_1$ 114) is associated corresponds to the BSSID of the BSS with which the other STA (e.g., $STA_2$ 116) is associated. In some aspects, the STA (e.g., $STA_1$ 114) may refrain from considering a NAV of the STA (e.g., $STA_1$ 114) in response to receiving the ULTR (e.g., DL transmission(s) 232, 234 from $AP_1$ 112) when the STA (e.g., $STA_1$ 114) is in the same BSS as the other STA (e.g., $STA_2$ 116). When the BSSIDs of the STAs are associated and/or when the STAs are in the same BSS, the communications of the STAs ($STA_1$ 114, $STA_2$ 116) may be centrally managed and/or the likelihood of interference may be relatively low. Accordingly, refraining from considering a NAV in such circumstances can conserve time, power, and computational resources.

In some aspects, in response to receiving the ULTR (e.g., DL transmission(s) 232, 234), if/when the UL response (e.g., UL transmission(s) 262, 264) to the ULTR comprises an acknowledgement message having less than a threshold duration, an STA (e.g., $STA_1$ 114, $STA_2$ 116) may transmit a frame (e.g., UL transmission(s) 262, 264) without considering a NAV. For example, referring to FIG. 2, in response to receiving a DL transmission 232 (e.g., ULTR) at time $T_{iv}$, the STA (e.g., $STA_1$ 114), at time $T_v$, may refrain from considering a NAV when the UL transmission 262, at time $T_{vii}$, includes an acknowledgement message having a duration less than a threshold value. For relatively short transmissions that communicate acknowledgement information, the time, power, and computational resources utilized for considering the NAV (e.g., of $STA_1$ 114) may not be warranted.

In some aspects, an STA may determine whether to update a NAV by using varying detection thresholds based on whether a received ULTR, signal, frame and/or data unit is communicated from a same BSS. In some aspects, an STA (e.g., $STA_1$ 114) may refrain from updating one or more parameters of the NAV if (i) a received ULTR, signal, frame, and/or data unit is transmitted from an apparatus (e.g., $AP_2$ 142, $STA_3$ 144, $STA_5$ 146) associated with a BSS different from a BSS with which the STA (e.g., $STA_1$ 114) is associated and/or (ii) a strength of the received ULTR, signal, frame, and/or data unit is less than a first detection threshold value. The first detection threshold value may be greater than a second detection threshold value used if the received ULTR, signal, frame, and/or data unit is not transmitted by the apparatus (e.g., $AP_2$ 142, $STA_3$ 144, $STA_5$ 146) associated with the BSS that is different from the BSS with which the STA (e.g., $STA_1$ 114) is associated (e.g., if the received ULTR, signal, frame, and/or data unit is transmitted by an apparatus (e.g., $AP_1$ 112, $STA_2$ 116, $STA_4$ 118) associated with the same BSS as the STA (e.g., $STA_1$ 114)). In such aspects, a relatively higher detection threshold is used when the received ULTR, signal, frame, and/or data unit is transmitted from an apparatus in a different BSS, and a relatively lower detection threshold is used when the received ULTR, signal, frame, and/or data unit is transmitted from an apparatus in the same BSS. By doing so, communications between apparatuses in the same BSS have a relatively higher likelihood of updating a NAV, and communications between apparatuses in different BSSs have a relatively lower likelihood of updating a NAV.

In some aspects, an STA (e.g., $STA_1$ 114) may receive a frame from an apparatus (e.g., another STA or an AP), and the frame may include information indicating a duration of time used for updating a NAV of that STA (e.g., $STA_1$ 114). Depending on a difference between the received information indicating the duration of time used for updating the NAV and an existing duration of time of the NAV, the STA (e.g., $STA_1$ 114) may override the existing duration of time of the NAV with the received information indicating the duration of time used for updating the NAV. The aforementioned difference may be (i) a positive value when the duration indicated in the received frame is greater than an existing duration, or (ii) a negative value when the duration indicated in the received frame is lesser than the existing duration. When the difference is a positive value, the STA (e.g., $STA_1$ 114) may override the existing duration with the duration indicated in the received frame.

In some aspects, an STA (e.g., $STA_1$ 114) may have more than just one NAV. In some aspects, an STA (e.g., $STA_1$ 114) may maintain a plurality of NAVs, each configured for a particular purpose. In some aspects, an STA ($STA_1$ 114) may maintain a plurality of NAVs configured to regulate whether the STA accesses a wireless medium during a period of time. The plurality of NAVs may include a first NAV adapted for frames originating from an apparatus (e.g., $AP_1$ 112, $STA_2$ 116, $STA_4$ 118) in a BSS with which the STA (e.g., $STA_1$ 114) is associated, and a second NAV adapted for frames originating from an apparatus (e.g., $AP_2$ 142, $STA_5$ 146, $STA_3$ 144) in a BSS with which the STA (e.g., $STA_1$ 114) is not associated. By using a plurality of NAVs, the STA (e.g., $STA_1$ 114) can track the time durations and resources being utilized by not only apparatuses in its current BSS but also time durations and resources being utilized by other apparatuses in one or more overlapping BSSs, thereby enabling the STA (e.g., $STA_1$ 114) to better manage potential interference, contention, and/or channel access.

In some aspects, an STA may update each of at least two of the plurality of NAVs based on various criteria without necessarily deviating from the scope of the present disclosure. In some aspects, an STA (e.g., $STA_1$ 114) may receive a frame from an apparatus (e.g., another STA or an AP), and the frame may be configured to update one of a plurality of NAVs of the STA. If a BSSID of the BSS with which the STA (e.g., $STA_1$ 114) is associated corresponds to a BSSID of a BSS with which the apparatus (e.g., $STA_2$ 116, $AP_1$ 112, $STA_4$ 118) is associated, then an STA (e.g., $STA_1$ 114) may update a first NAV (of a plurality of NAVs), wherein the first NAV is configured for frames communicated within a BSS with which the STA (e.g., $STA_1$ 114) is associated. If the BSSID of the BSS with which the STA (e.g., $STA_1$ 114) is associated does not corresponds to a BSSID of the BSS with which the apparatus (e.g., $AP_2$ 142, $STA_3$ 144, $STA_5$ 146) is associated, then an STA (e.g., $STA_1$ 114) may update a second NAV (of a plurality of NAVs), wherein the second NAV is configured for frames communicated outside of the BSS with which the STA (e.g., $STA_1$ 114) is associated.

In some aspects, an STA (e.g., $STA_1$ 114, $STA_2$ 116) may determine whether to perform carrier sensing prior to initiating an UL transmission (e.g., UL transmission(s) 262, 264) in response to receiving the ULTR (e.g., DL transmission(s) 232, 234). Carrier sensing may include signal detection and/or NAV(s) evaluation. Carrier sensing may occur during a time period that begins at/after receiving the ULTR (e.g., at/after time $T_{iv}$) and ends at/before transmission of the UL transmission(s) (e.g., at/before time $T_{vii}$). In some aspects, determining whether to perform carrier sensing depends on whether the ULTR includes information indicating whether to perform the carrier sensing prior to the initiating the UL transmission in response to receiving the ULTR.

As described above, in some aspects, the ULTR (e.g., DL transmission(s) 232, 234) may include an indication indicating whether an STA (e.g., $STA_1$ 114, $STA_2$ 116) is to perform carrier sensing prior to initiating an UL transmission (e.g., UL transmission(s) 262, 264). When/If the indication in the ULTR indicates no requirement to perform carrier sensing prior to the UL transmission in response to the ULTR, then the STA may refrain from performing carrier sensing (for at least a subchannel allocated to the UL transmission). When/If the indication in the ULTR indicates a requirement to perform carrier sensing prior to the UL transmission in response to the ULTR, then the STA may perform carrier sensing (for at least the subchannel allocated to the UL transmission).

In some systems, the UL transmission from the RX/STA is initiated by the TX/AP (e.g., rather than the RX/STA). As a result, when the TX/AP sends the ULTR, the RX/STA may intend/wish to immediately begin transmission of an UL transmission. That is, in some systems, the RX/STA may not always necessarily consider the duration of other transmissions on a particular channel (e.g., as indicated by the navigation allocation vector) before that immediate UL transmission and, thus, may initiate an UL transmission without considering other protected transmissions on that particular channel, thereby likely disrupting those other transmissions and/or possibly colliding with and thus failing with its own UL transmission. In some configurations, an ULTR may poll the RX/STA for UL multi-user transmissions. An RX/STA that is polled from an ULTR for UL multi-user transmissions considers the navigation allocation vector to determine whether to respond to the ULTR. In some configurations, the RX/STA may refrain from responding to the poll if the navigation allocation vector was set by a frame/packet originating from the TX/AP that sent/transmitted the ULTR. In some configurations, the RX/STA may refrain from responding to the poll if the response to the ULTR includes an ACK/NACK/BA and the duration of the UL multi-user transmission is less than a threshold duration.

In some configurations, an apparatus (e.g., RX/STA) may, in response to receiving an ULTR, consider the navigation allocation vector and/or a duration (of other transmissions) indicated in the navigation allocation vector to determine when/whether to respond to the ULTR. In some configurations, such an apparatus (e.g., RX/STA) may refrain from responding to an ULTR until after considering the navigation allocation vector and/or a duration (of other transmissions) indicated in the navigation allocation vector. In some configurations, such an apparatus (e.g., RX/STA) may, in response to receiving an ULTR, transmit a frame/packet without considering the navigation allocation vector and/or a duration (of other transmissions) indicated in the navigation allocation vector when the navigation allocation vector and/or the duration (of other transmissions) indicated in the navigation allocation vector was/is set by a frame/packet/data originating from an apparatus (e.g., TX/AP) from which the ULTR was sent/transmitted. In some configurations, such an apparatus (e.g., RX/STA) may, in response to receiving an ULTR, transmit a frame without considering the navigation allocation vector and/or a duration (of other transmissions) indicated in the navigation allocation vector when a response to the ULTR comprises an ACK/NACK/BA and/or a duration of the UL multi-user transmission is below a threshold value/duration/time/amount.

In some systems, an apparatus (e.g., TX/AP) may send a message configured to and/or comprising information for early termination of a transmission interval and/or TXOP. This message may sometimes be referred to as a contention free end message/signal and/or any other suitable message/signal. In some circumstances, an apparatus (e.g., RX/STA) may be within the communication range of two (or more) other apparatuses (e.g., TXs/APs). Either (or both) of those apparatuses (e.g., TXs/APs) may send a ULTR. In some configurations, the ULTR may include information for setting a duration of time to protect a communication channel by preventing/inhibiting other communications for that duration of time on that communication channel. For example, the ULTR may include information for and/or may be configured to set one or more parameters/settings of a network allocation vector. Also, either (or both) of those apparatuses (e.g., TXs/APs) may send the aforementioned message (e.g., the contention free message/signal) for early termination of the transmission interval and/or TXOP. For instance, if an RX/STA receives such a message from a TX/AP before the end of the transmission interval and/or TXOP that is protected by the network allocation vector as set by another TX/AP, then that RX/STA would be free to perform transmissions earlier than it should (based on the settings/parameters set for the network allocation vector), thereby increasing the likelihood of collisions with transmissions with other RXs/STAs and/or other TXs/APs.

In some configurations, when an apparatus (e.g., RX/STA) receives a particular message/signal (e.g., contention free end message/signal) an overlapping BSS apparatus (e.g., AP/TX), that apparatus (e.g., RX/STA) will not adjust, change, reset, modify, and/or adjust one or more parameters/settings corresponding to a preceding/most-recent/last network allocation vector update, which may have been caused by an apparatus (e.g., AP/TX) with which it was assigned/associated (e.g., an inter-BSS AP/TX/apparatus). In some configurations, an apparatus (e.g., RX/STA) may receive an ULTR from a first other apparatus (e.g., first TX/AP), wherein the ULTR may be configured to set and/or comprises information for setting one or more parameters/settings of the network allocation vector. In some configurations, an apparatus (e.g., RX/STA) may receive a message (e.g., contention free end message/signal) configured to and/or comprising information for ending a transmission interval and/or transmission opportunity. In some configurations, an apparatus (e.g., RX/STA) may determine whether the message is received from a second other apparatus (e.g., second TX/AP) is different from the first other apparatus (e.g., first TX/AP). In some configurations, an apparatus (e.g., RX/STA) may, if/when the second other apparatus (e.g., other TX/AP) is the same as the first other apparatus (e.g., first TX/AP), modify/adjust/change/update/reset the one or more parameters or settings of the network allocation vector (e.g., based on a time at which the aforementioned message is received) (e.g., based on information included in the message). In some configurations, an apparatus (e.g., RX/STA) may, if/when the second other apparatus (e.g., second TX/AP) is different from the first other apparatus (e.g., first TX/AP), modify/adjust/change/update/reset the one or more parameters or settings of the network allocation vector (e.g., based on a time at which the message is received) (e.g., based on information included in the message).

In some circumstances, when an apparatus (e.g., RX/STA) receives a particular PPDU with/at a power, signal strength, and/or received signal strength indicator (RSSI) below an a particular threshold level, that apparatus (e.g., RX/STA) not update its network allocation vector. In some configurations, an apparatus (e.g., RX/STA) may determine the basic service set to which that apparatus (e.g., RX/STA) is assigned/associated. In some configurations, the apparatus (e.g., RX/STA) may determine whether a received signal (e.g., PPDU) originates from and/or is transmitted by an apparatus (e.g., TX/AP) assigned/associated with another basic service set (e.g., an overlapping basic service set) (e.g., a basic service set that is different from the basic service set to which the apparatus (e.g., RX/STA) is assigned/associated. In some configurations, the apparatus (e.g., RX/STA) may determine a signal strength (e.g., RSSI) of the received signal. In some configurations, the apparatus (e.g., RX/STA) may, if the received signal originates from/is transmitted by an apparatus (e.g., TX/AP) assigned/associated with another basic service set (e.g., overlapping basis service set) and the signal strength is less than a first threshold value/amount (e.g., a first predetermined/dynamically-adjusted/fixed/stored threshold value/amount) (e.g., a first preamble detect threshold level/amount) associated with signals originating from and/or transmitted by apparatuses (e.g., TXs/APs) assigned/associated with the another basic service set, disregard/ignore/refrain from processing the received signal and/or refrain from updating/resetting/adjusting/modifying/changing one or more parameters/settings of the network allocation vector. In some configurations, the apparatus (e.g., RX/STA) may, if the received signal originates from and/or is not transmitted by the apparatus (e.g., TX/AP) assigned/associated with another basic service set (e.g., an overlapping basic service set) and the signal strength is equal to and/or greater than a second threshold value/amount (e.g., a second predetermined/dynamically-adjusted/fixed/stored threshold value/amount) (e.g., a second preamble detect threshold level/amount), then consider/process the received signal and/or update/reset/adjust/modify/change one or more parameters and/or settings of the network allocation vector, wherein the second threshold has a value lower than the first threshold.

In some configurations, an apparatus (e.g., RX/STA) may receive a signal (e.g., PPDU) originating from and/or transmitted by an apparatus (e.g., TX/AP) assigned/associated with a basic service set different from the basic service set to which the that apparatus (e.g., RX/STA) is assigned/associated. In some configurations, the apparatus (e.g., RX/STA) may determine whether to consider/process the received signal and/or update/reset/adjust/modify/change one or more parameters/settings of the network allocation vector based on a signal strength (e.g., RSSI) of the received signal. In some configurations, the apparatus (e.g., RX/STA) may receive a signal (e.g., PPDU) originating from and/or transmitted by an apparatus (e.g., TX/AP) assigned/associated with a basic service set different from the basic service set to which the STA is assigned/associated. In some configurations, the apparatus (e.g., RX/STA) may refrain from considering/processing the received signal and/or updating/resetting/adjusting/modifying/changing one or more parameters/settings of the network allocation vector when a signal strength (e.g., RSSI) of the received signal is less than a first threshold value/amount (e.g., a first predetermined/dynamically-adjusted/fixed/stored threshold value/amount) (e.g., a preamble detect threshold level/amount) that is greater than a second threshold value/amount (e.g., a second predetermined/dynamically-adjusted/fixed/stored threshold value/amount) (e.g., a second preamble detect threshold level/amount) associated with and/or corresponding to signals received from an apparatus (e.g., TX/AP) assigned/associated with the basic service set to which the apparatus (e.g., RX/SAT) is associated/assigned. In some configurations, the apparatus (e.g., RX/STA) may refrain from using the medium for communication for a period of time that is at least as long as a duration or length corresponding to the received signal (e.g., PPDU).

In some configurations, an apparatus (e.g., STA) may consider the NAV prior to initiating/performing any transmission. If the NAV has been set such that no transmission is allowed at a particular time, then that (e.g., STA) may refrain from transmitting any signals at that time. For example, when an apparatus (e.g., STA) receives an ULTR frame, the apparatus (e.g., STA) may consider the NAV to determine whether to transmit an UL signal/transmission. However, in some circumstances, the apparatus (e.g., STA) may not need to always consider the NAV. Considering the NAV settings may cause unnecessary processing time, power consumption, and/or complexity. In some configurations, an apparatus (e.g., STA) that is polled from an ULTR frame for UL MU transmission may consider the NAV in determining whether to respond unless one or more conditions exists and/or are met. An example of such a condition may be that the NAV was set by a frame originating from the AP sending the ULTR frame. Another example of such a condition may be that the response (e.g., to the ULTR) contains an ACK and/or BA and the duration of the UL MU transmission may be below a predetermined threshold. Yet another example of such a condition is that the NAV was set by a frame originating from an intra-BSS STAs.

In some configurations, the apparatus (e.g., STA) may receive a ULTR frame from another apparatus (e.g., AP, another STA). In some configurations, the apparatus (e.g., STA) may determine whether the ULTR frame is destined to/intended for the STA. In some configurations, the apparatus (e.g., STA) may determine an identity/identifier/type of apparatus that transmitted the ULTR frame. In some configurations, the apparatus (e.g., STA) may determine the identify/identifier/type of the apparatus (e.g., AP, another STA) that (most recently) set the NAV of the STA. In some configurations, the apparatus (e.g., STA) may compare the identity/identifier/type of the apparatus (e.g., AP, another STA) that transmitted the ULTR frame with identity/identifier/type of the apparatus (e.g., AP, another STA) that (most recently) set the NAV of the STA. In some configurations, the apparatus (e.g., STA) may determine whether to respond to the ULTR frame by considering whether the NAV of the apparatus (e.g., STA) was (most recently) set/adjusted/updated by the apparatus (e.g., AP, another STA) that transmitted the ULTR frame. In some configurations, the apparatus (e.g., STA) may determine whether to consider the NAV. In some configurations, the apparatus (e.g., STA) may determine whether to consider the NAV based on the aforementioned comparison. In some configurations, the apparatus (e.g., STA) may refrain from considering the NAV (in determining whether to respond to the ULTR frame) when the identity/identifier of the apparatus (e.g., AP, another STA) that (most recently) set/adjusted/updated the NAV is the same as the identity/identifier of the apparatus (e.g., AP, another STA) that transmitted the ULTR frame. In some configurations, the apparatus (e.g., STA) may consider the NAV (in determining whether to respond to the ULTR frame) when the identity/identifier of the apparatus (e.g., AP, another STA) that (most recently) set/adjusted/updated the NAV is different from the identity/identifier of the apparatus (e.g., AP, another STA) that transmitted the ULTR frame. In some configurations, the apparatus (e.g., STA) may refrain from considering the NAV (in determining whether to respond to the ULTR frame) when the NAV (e.g., of the STA) was (most recently) set/adjusted/updated by the apparatus (e.g., AP, another STA) that transmitted the ULTR frame. In some configurations, the apparatus (e.g., STA) may consider the NAV (in determining whether to respond to the ULTR frame) when the NAV (e.g., of the STA) was (most recently) not set/adjusted/updated by the apparatus (e.g., AP, another STA) that transmitted the ULTR frame. The determining whether to consider the NAV may be performed while/prior to/after determining whether to respond to the ULTR frame.

In some configurations, a first STA may receive a frame from a second STA. In some configurations, the frame is an UL transmission. In some configurations, the frame is intended/destined for/to an apparatus (e.g., AP, another STA) other than the first STA. In some configurations, the frame is configured to set/update/adjust settings of the NAV of the first STA. In some configurations, the frame includes information that indicates a duration of a transmission or a TXOP of the (current) frame. In some configurations, the first STA may use the frame and/or information included in the frame to set/adjust/update the NAV of the first STA. In some configurations, the first STA may determine whether the second STA is in a same BSS as the first STA. In some configurations, the first STA may determine whether the BSSID of the BSS with which the first STA is associated is the same as/matches/corresponds to the BSSID of the BSS with which the second STA is associated. In some configurations, the first STA may compare the BSSID of the BSS with which the first STA is associated with the BSSID with which the second STA is associated to determine whether the first STA is in a same BSS as the second STA. In some configurations, the first STA may receive a ULTR from another apparatus (e.g., AP, another STA) that is different from the first and second STAs. In some configurations, the first STA may determine whether to respond to the ULTR received from the other apparatus (e.g., AP, another STA) by considering whether the NAV of the first STA was (most recently) set/adjusted/updated by the second STA. In some configurations, the first STA may refrain from considering the NAV (in determining whether to respond to the ULTR frame) when the second STA is in a same BSS as the first STA. In some configurations, the first STA may consider the NAV (in determining whether to respond to the ULTR frame) when the second STA is in a different BSS as the first STA. In some configurations, the first STA may refrain from considering the NAV (in determining whether to respond to the ULTR frame) when the BSSID of the BSS with which the first STA is associated is the same as/matches/corresponds to the BSSID of the BSS with which the second STA is associated. In some configurations, the first STA may consider the NAV (in determining whether to respond to the ULTR frame) when the BSSID of the BSS with which the first STA is associated is different from/unmatched with/uncorrelated with/does not correspond to the BSSID of the BSS with which the second STA is associated. In some configurations, the first STA may refrain from considering the NAV (in determining whether to transmit a signal) when the signal/frame/packet is an ACK or BA. In some configurations, the first STA may consider the NAV (in determining whether to transmit a signal/frame/packet) when the signal is not an ACK or BA.

In some configurations, an apparatus (e.g., STA) may utilize/implement a NAV to regulate whether it accesses a wireless medium during various times. In some circumstances, that apparatus (e.g., STA) may receive information for setting/adjusting/resetting the NAV in frames originating from within its BSS (e.g., intra-BSS) (e.g., a BSS with which it is not associated) and information for setting/adjusting/resetting the NAV in frames originating from outside of its BSS (e.g., inter-BSS) (e.g., a BSS with which it is not associated). In some circumstances, it may not be ideal to have a single NAV because at least some of the aforementioned information may be/become ignored/disregarded/unused. In some configurations, an apparatus (e.g., STA) maintains a plurality (e.g., two or more) NAVs. One NAV may be adapted for intra-BSS frames and another NAV may be adapted for inter-BSS frames. Frames that cannot be conclusively classified/characterized as intra-BSS frames nor inter-BSS frames may be paired with either of these NAVs.

In some configurations, an apparatus (e.g., STA) may receive a frame (e.g., ULTR frame, MU UL frame, etc.) that is configured to set/updated/adjust a NAV of the apparatus (e.g., STA), and/or includes information indicating a setting, duration of time or TXOP that is associated with/can be used to set/update/adjust a NAV of the apparatus (e.g., STA). In some configurations, the apparatus (e.g., STA) may determine whether the received frame originates from another apparatus (e.g., AP, another STA) that is associated with a basic service set (BSS) with which the apparatus (e.g., STA) is associated. In some configurations, the apparatus (e.g., STA) may determine whether that other apparatus (e.g., AP, another STA) is in a same BSS as the apparatus (e.g., STA). In some configurations, the apparatus (e.g., STA) may determine whether an identifier (e.g., BSSID, BSS type, BSS category, BSS color) of a BSS with which the apparatus (e.g., STA) is associated is the same as/matches/corresponds to an identifier (e.g., BSSID, BSS type, BSS category, BSS color) of a BSS with which the other apparatus (e.g., AP, another STA) is associated. In some configurations, the apparatus (e.g., STA) may compare an identifier (e.g., BSSID, BSS type, BSS category, BSS color) of a BSS with which the apparatus (e.g., STA) is associated with an identifier (e.g., BSSID, BSS type, BSS category, BSS color) of a BSS that the other apparatus (e.g., AP, another STA) is associated to determine whether the apparatus (e.g., STA) is in a same BSS as that of the other apparatus (e.g., AP, another STA). In some configurations, the apparatus (e.g., STA) may, based on such a comparison and/or determination, select one of a plurality of NAVs of the apparatus (e.g., STA) to set/adjust/update (e.g., according to the included information described above). In some configurations, the apparatus (e.g., STA) may determine that the BSS with which the other apparatus (e.g., AP, another STA) is associated is not the same as/does not match/does not correspond/is uncorrelated with the BSS with which the apparatus (e.g., STA) is associated when the identifier (e.g., BSSID, BSS type, BSS category, BSS color) of the BSS with which the apparatus (e.g., STA) is associated is not the same as/does not match/does not correspond/is uncorrelated with an identifier (e.g., BSSID, BSS type, BSS category, BSS color) of a BSS with which the that other apparatus (e.g., AP, another STA) is associated.

In some configurations, an apparatus (e.g., STA) may determine that the BSS with which the other apparatus (e.g., AP, another STA) is associated is the same as/matches/does correspond/is correlated with the BSS with which the apparatus (e.g., STA) is associated when the identifier (e.g., BSSID, BSS type, BSS category, BSS color) of the BSS with which the apparatus (e.g., STA) is associated is the same as/does match/does correspond/is correlated with an identifier (e.g., BSSID, BSS type, BSS category, BSS color) of a BSS with which the that other apparatus (e.g., AP, another STA) is associated. In some configurations, the apparatus (e.g., STA) may designate/characterize/associate the frame as an intra-BSS frame (or a non-intra-BSS frame (e.g., any frame that is not determined to be an intra-BSS frame) based on the aforementioned comparison and/or determination. In some configurations, the apparatus (e.g., STA) may set/update/adjust a first NAV allocated/dedicated for/configured for frames communicated inside/within/intra- the BSS with which the apparatus (e.g., STA) is associated when the identifier (e.g., BSSID, BSS type, BSS category, BSS color) of the BSS with which the apparatus (e.g., STA) is associated is the same as/does match/does correspond/is correlated with an identifier (e.g., BSSID, BSS type, BSS category, BSS color) of a BSS with which the that other apparatus (e.g., AP, another STA) is associated. In some configurations, the apparatus (e.g., STA) may set/update/adjust a second NAV (different from the first NAV) allocated/dedicated for/configured for all other frames (e.g., frames communicated outside-of/not-within/inter- the BSS with which the apparatus (e.g., STA) is associated) when the identifier (e.g., BSSID, BSS type, BSS category, BSS color) of the BSS with which the apparatus (e.g., STA) is associated is not the same as/does not match/does not correspond to/is uncorrelated with an identifier (e.g., BSSID, BSS type, BSS category, BSS color) of a BSS with which the that other apparatus (e.g., AP, another STA) is associated.

In some configurations, an apparatus (e.g., STA) may determine a difference between a setting, duration of time or TXOP set for the first NAV and determined a setting, duration of time or TXOP set for the second NAV. In some configurations, the apparatus (e.g., STA) may determine a difference between a setting, duration of time or TXOP set for the first NAV and a setting, duration of time or TXOP set for the second NAV. In some configurations, the apparatus (e.g., STA) may determine whether a difference exists between a setting, duration of time or TXOP set for the first NAV and a setting, duration of time or TXOP set for the second NAV. In some configurations, the apparatus (e.g., STA) may adjust (e.g., increase/decrease) a setting, duration of time or TXOP of either the first NAV or the second NAV based on various factors. In some configurations, the apparatus (e.g., STA) may override a setting, duration of time or TXOP set for or associated with the first NAV with a setting, duration of time or TXOP set for or associated with the second NAV. In some configurations, the apparatus (e.g., STA) may adjust (e.g., increase) a setting, duration of time or TXOP associated with or set for the first NAV by/based on a difference between a setting, duration of time, or TXOP associated with or set for the first NAV and a setting, duration of time, or TXOP associated with or set for the second NAV. In some configurations, the apparatus (e.g., STA) may override a setting, duration of time or TXOP set for or associated with the second NAV with a setting, duration of time or TXOP set for or associated with the first NAV. In some configurations, the apparatus (e.g., STA) may adjust (e.g., increase) a setting, duration of time or TXOP associated with or set for the second NAV by/based on a difference between a setting, duration of time, or TXOP associated with or set for the first NAV and a setting, duration of time, or TXOP associated with or set for the second NAV.

In some configurations, an apparatus (e.g., STA) may receive a frame (e.g., ULTR frame, MU UL frame, etc.) that is configured to set/updated/adjust a NAV of the apparatus (e.g., STA) and/or includes information indicating a setting, duration of time or TXOP that is associated with or used for setting/updating the NAV. In some configurations, the apparatus (e.g., STA) may compare a setting, duration of time, TXOP that is associated with or used for setting/updating the NAV of the apparatus (e.g., STA) with an existing/current/stored/previously-set setting, duration of time, TXOP of the NAV of the apparatus (e.g., STA). In some configurations, the apparatus (e.g., STA) may compute/calculate a difference between a setting, duration of time, TXOP that is associated with or used for setting/updating the NAV and an existing/current/stored/previously-set setting, duration of time, TXOP of the NAV of the apparatus (e.g., STA). If the computed/calculated difference is a positive value, in some configurations, the apparatus (e.g., STA) may consider both the received setting, duration of time, TXOP that is associated with or used for setting/updating the NAV of the apparatus (e.g., STA) and the existing/current/stored/previously-set setting, duration of time, TXOP of the NAV of the apparatus (e.g., STA). In other words, if the computed/calculated difference is a positive value, in some configurations, the apparatus (e.g., STA) may override the existing/current/stored/previously-set setting, duration of time, TXOP of the NAV of the apparatus (e.g., STA) with the received setting, duration of time, TXOP that is associated with or used for setting/updating the NAV of the apparatus (e.g., STA). On the other hand, if the computed/calculated difference is not a positive value (e.g., zero or less), in some configurations, the apparatus (e.g., STA) may consider (e.g., only) the existing/current/stored/previously-set setting, duration of time, TXOP of the NAV of the apparatus (e.g., STA). In other words, if the computed/calculated difference is not a positive value (e.g., zero or less), in some configurations, the apparatus (e.g., STA) may disregard/ignore the received setting, duration of time, TXOP that is associated with or used for setting/updating the NAV of the apparatus (e.g., STA).

In some configurations, a first apparatus (e.g., first STA) may consider a procedure based on received signal information (e.g., received signal strength indicator(s) (RSSI(s)) of two or more frames in determining whether to avoid updating the NAV of the apparatus (e.g., STA). In some configurations, the first apparatus (e.g., first STA) may determine whether to reset/set/adjust/update one or more settings, times, durations of the NAV based on/using/by considering RSSI information received for the first signal transmitted from a second apparatus to a third apparatus and RSSI information received for a second signal transmitted from the third apparatus to the second apparatus in response to the first signal. In some configurations, the first apparatus (e.g., first STA) may refrain from resetting/setting/updating/adjusting one or more settings of the NAV of/associated with the first apparatus (e.g., first STA) when the RSSI information for the first signal is equal to or below a first threshold value and/or the RSSI information for the second signal is equal to or below a second threshold value. In some configurations, the first and second threshold values may be equal to, different from, greater than, and/or less than each other. In some configurations, the first apparatus (e.g., first STA) may refrain from resetting/setting/updating/adjusting one or more settings of the NAV of/associated with the first apparatus (e.g., STA) when a difference between the RSSI information for/associated with the first signal is equal to, less than and/or greater than the RSSI information for the second signal by a certain threshold amount, percentage, standard deviation, etc.

In some configurations, a first apparatus (e.g., first STA) may determine to reset/set/update/adjust one or more settings of the NAV of/associated with the first apparatus (e.g., first STA) when the RSSI information for the first signal is equal to or above a first threshold value and/or the RSSI information for the second signal is equal to or above a second threshold value. The first and second threshold value may be equal to, different from, greater than, and/or less than each other. In some configurations, the first apparatus (e.g., first STA) may reset/set/update/adjust one or more settings of the NAV of/associated with the first apparatus (e.g., STA) when a difference between the RSSI information for the first signal is less than or greater than the RSSI information for the second signal by a certain threshold amount, percentage, standard deviation, etc. In some configurations, the first signal may be a ULTR frame, a request to send (RTS), and/or any other suitable (triggering) signal/message and the second signal is a MU UL frame, a clear to send (CTS), and/or any other suitable response signal/message (to the triggering signal/message).

In some configurations, the AP communicates (e.g., transmits) an ULTR to the STA, as described in greater detail above. After the AP sends the ULTR to the STA, the STA may initiate a transmission (e.g., an UL transmission/communication) that corresponds to and/or is in response to the ULTR. In some configurations, the STA may check/sense/detect conditions of a particular channel (on which it intends/wishes/plans/desires to communicate) to determine whether that particular channel is available for the transmission (e.g., UL transmission/communication). Such checking/sensing/detecting may consume system resources and/or time. However, in some circumstances, such checking/sensing/detecting of the communication channel may be obviated/precluded/omitted/avoided/skipped/refrained. In some configurations, the STA may obviate/preclude/omit/avoid/skip/refrain such checking/sensing/detecting prior to initiating an UL transmission (corresponding to/in response to that ULTR). In some configurations, obviating the carrier sensing step may reduce the amount of time consumed between the ULTR receipt and the UL transmission communication, thereby increasing efficiency and/or throughput. In some configurations, the STA may receive the ULTR, and the STA may determine whether to perform carrier sensing prior to initiating an UL transmission/communication (corresponding to/associated with/in response to the ULTR). In some configurations, the determination is based on/associated with/dependent upon/corresponding to/comprising determining/a determination of whether the ULTR includes information (e.g., parameter/setting/indicator/indication/configuration) indicating whether to perform carrier sensing prior to the UL transmission/communication (corresponding to/in response to the ULTR). For example, in some configurations, the STA determines to refrain from performing carrier sensing when the information (e.g., parameter/setting/indicator/indication/configuration) indicates an absence of a necessity/need/requirement (e.g., no necessity/need/requirement) (e.g., an off/false/negative/null value) to perform carrier sensing prior to the UL transmission/communication (corresponding to/in response to the ULTR). In some configurations, the STA determines to perform carrier sensing when the information (e.g., parameter/setting/indicator/indication/configuration) indicates an affirmative need (e.g., requirement, necessity, need) (e.g., an on/true/positive value) to perform carrier sensing prior to the UL transmission/communication (corresponding to/in response to the ULTR). In some configurations, after/upon determining to perform carrier sensing, the STA performs carrier sensing prior to the UL transmission/communication (corresponding to/in response to the ULTR). As used herein, the term 'carrier sensing' may be interchangeable with similar terms, such as communication/physical/virtual/NAV tone/signal/subchannel/channel/carrier detection/sensing/measurement/evaluation/determination. In some configurations, the default setting/parameter may be for the STA to (always) perform carrier sensing unless the above-described information (e.g., parameter/setting/indicator/indication/configuration) indicates otherwise. In some configurations, the default setting/parameter may be for the STA to not/never perform carrier sensing unless the above-described information (e.g., parameter/setting/indicator/indication/configuration) indicates otherwise. In some configurations, the STA determines whether to perform carrier sensing prior to initiating an UL transmission/communication (corresponding to/associated with/in response to the ULTR) based on/associated with/dependent upon/corresponding to a content/size/length/duration of the UL transmission/communication. In some configurations, the STA determines to refrain from performing carrier sensing when the content/size/length/duration of the UL transmission/communication is less than a threshold value. In some configurations, the STA determines to perform carrier sensing when a content/size/length/duration of the UL transmission/communication is greater than a threshold value. In some configurations, the STA determines whether to perform carrier sensing prior to initiating an UL transmission/communication (corresponding to/associated with/in response to the ULTR) based on/associated with/dependent upon/corresponding to/comprises determining whether the UL transmission/communication is protected by a NAV/CTS-RTS. In some configurations, the STA determines to refrain from performing carrier sensing when a CTS and a corresponding RTS for the UL transmission/communication is previously communicated. In some configurations, the STA determines to perform carrier sensing when a CTS and a corresponding RTS is previously communicated. In some configurations, the STA determining whether to perform carrier sensing prior to initiating an UL transmission/communication (corresponding to/associated with/in response to the ULTR) based on/associated with/dependent upon/corresponding to/comprises determining whether carrier sensing is previously performed in a common/shared/same TXOP and/or within a predetermined/variable/threshold/preselected period of time prior to receipt of the ULTR and/or transmission of the UL transmission/communication. In some configurations, the STA determines to refrain from performing carrier sensing when carrier sensing is performed in a TXOP that is same as/common/shared with a TXOP of the ULTR and/or the UL transmission/communication. In some configurations, the STA determines to refrain from performing carrier sensing when carrier sensing is performed within a predetermined/variable/threshold/preselected period of time prior to receipt of the ULTR and/or transmission of the UL transmission/communication. In some configurations, the STA determines to perform carrier sensing when carrier sensing is not performed in a TXOP that is same as/common/shared with a TXOP of the ULTR and/or the UL transmission/communication. In some configurations, the STA determines to perform carrier sensing when carrier sensing is not performed within a predetermined/variable/threshold/preselected period of time prior to receipt of the ULTR and/or transmission of the UL transmission/communication. In some configurations, the inter-frame spacing between the ULTR and the UL transmission/communication (corresponding to/in response to the ULTR) varies based on the determination and/or above-described information (e.g., parameter/setting/indicator/indication/configuration). In some configurations, the STA use a first inter-frame spacing/duration/length/size when carrier sensing is performed, and the STA uses a second inter-frame spacing duration/length/size (less than the first inter-frame spacing duration/length/size) when carrier sensing is not performed (e.g., upon determining to refrain from performing carrier sensing). In some configurations, the inter-frame spacing varies/depends upon/corresponds to/is associated with/depends upon/is correlated to the determining/determination of whether to perform carrier sensing and/or carrier sensing (generally) after receiving the ULTR and prior to the UL transmission/communication that is corresponding to/in response to the ULTR.

In some configurations, the apparatus (e.g., STA) may detect/sense (current) use/utilization of (e.g., presence of a signal on) one or more channels (or subchannels). In some configurations, the STA performs channel/subchannel/carrier/subcarrier/RU detection/sensing at various times and for various durations. In some configurations, the STA performs channel/subchannel/carrier/subcarrier/RU detection/sensing prior to receiving the ULTR. In some configurations, the STA performs channel/subchannel/carrier/subcarrier/RU detection/sensing upon receiving the ULTR. In some configurations, the STA performs channel/subchannel/carrier/subcarrier/RU detection/sensing immediately after reception of the ULTR is complete. In some configurations, the STA performs channel/subchannel/carrier/subcarrier/RU detection/sensing anytime after the initial reception of the ULTR. In some configurations, the STA performs channel/subchannel/carrier/subcarrier/RU detection/sensing at a time that corresponds to reception of the indication (described above) (e.g., upon/after reception of that indication). In some configurations, the STA performs channel/subchannel/carrier/subcarrier/RU detection/sensing during the time period that begins immediately after receiving the ULTR and ends immediately before transmission of the UL transmission/communication. In some configurations, the STA performs channel/subchannel/carrier/subcarrier/RU detection/sensing during the inter-frame spacing between the ULTR and the UL transmission/communication. In some configurations, the STA performs channel/subchannel/carrier/subcarrier/RU detection/sensing with respect to/for/of one or more channel/subchannel/carrier/subcarrier/RU among a plurality of channel/subchannel/carrier/subcarrier/RU available to the STA. In some circumstances, the STA may detect that the one or more channel/subchannel/carrier/subcarrier/RU is being used/occupied/utilized. On the one hand, in some configurations, the STA may initiate a transmission/communication to the AP using/utilizing at least one other channel (or subchannel) of the plurality of channels (or subchannels) for which use (e.g., a signal) was not detected/sensed. On the other hand, in some configurations, the STA may refrain from transmitting to/communicating with the AP using/utilizing any of the other channel/subchannel/carrier/subcarrier/RU of the plurality of channel/subchannel/carrier/subcarrier/RU even if/though use (e.g., a signal) was not detected/sensed (on those other channel/subchannel/carrier/subcarrier/RU). In some configurations, the STA may perform carrier sensing/detecting for/with respect to/at least (or only of) a channel/subchannel/carrier/subcarrier/RU for/allocated to the UL transmission/communication for that STA. In some configurations, the STA may perform carrier sensing/detecting without necessarily sensing the primary channel allocated for the UL transmission/communication when that STA is not allocated/designated to it. In some configurations, the STA may perform carrier sensing/detecting without sensing the primary channel when the primary channel is not allocated/designated to that STA.

At block 410, an apparatus may enable aspects related to random access. As described in greater detail above, the ULTR may be configured to assign/allocate RUs for random access (e.g., for simultaneous/concurrent UL transmissions by a plurality of STAs). In some aspects, after receiving an ULTR (e.g., DL transmission(s) 232, 234), an STA (e.g., $STA_1$ 114) may determine the number (e.g., quantity, amount, extent, size, and/or any other suitable measurement) of the RUs assigned by the ULTR for random access. For example, the STA (e.g., $STA_1$ 114) may determine the number of RUs assigned to it by utilizing the above-described portion of the ULTR that includes a plurality of user-specific fields indicating a description of resource allocation for simultaneous/concurrent UL transmissions by the plurality of STAs. The STA (e.g., $STA_1$ 114) may reduce a back-off counter based on the number of RUs assigned by the ULTR for random access. In some aspects, reducing the back-off counter based on the number of RUs assigned for random access by the ULTR includes reducing a value of the back-off counter by a predetermined amount for each of at least one resource for random access assigned by the ULTR and associated with a particular identifier. For example, if $STA_1$ 114 is assigned three RUs and its back-off counter was initially set to a value of five, then the $STA_1$ 114 may decrement its back-off counter by three units, resulting in its reduced back-off counter having a value of two.

Depending on a value of the reduced back-off counter, the STA (e.g., $STA_1$ 114) may randomly select one or more of the RUs assigned for random access by the ULTR. When the value of the reduced back-off counter reaches or crosses a threshold value, then that STA may randomly select RUs assigned for random access. For example, if such a threshold value is two (or greater), then $STA_1$ 114 may randomly select RUs assigned for random access; otherwise, $STA_1$ 114 may refrain from randomly selecting RUs for random access. Depending on a value of the reduced back-off counter (e.g., if/when the value of the reduced back-off counter reaches or crosses a threshold value), the STA (e.g., $STA_1$ 114) may transmit a frame, packet, and/or data unit (e.g., UL transmission(s) 262, 264) using the randomly selected one or more RUs assigned by the ULTR for random access.

As described above, an ULTR may sometimes indicate various resources and/or resource units (e.g., RUs) that are allocated for random access. In other words, the ULTR may allocate various resources (e.g., RUs) for random access. Some systems may rely on random selection procedures to fairly allocate such resources to a plurality of RXs/STAs seeking/needing such resources. However, this may lead to unnecessary contention, possible collisions, and overall inefficiencies in certain circumstances.

In some configurations, an apparatus (e.g., TX/AP) may transmit an ULTR, wherein the ULTR is configured to assign/allocate at least one resource (e.g., RU) for random access. In some configurations, an apparatus (e.g., RX/STA) may receive an ULTR, wherein the ULTR is configured to assign/allocate at least one resource (e.g., RU) for random access. In such configurations, the apparatus (e.g., RX/STA) may determine a number/amount/duration/size of the at least one resource (e.g., RU) for random access. In such configurations, the apparatus (e.g., RX/STA) may reduce/adjust/decrement a back-off counter/back-off timer based on the determined number/amount/duration/size of the at least one resource (e.g., RU) for random access. In such configurations, the apparatus (e.g., RX/STA) may, if the reduced/adjusted/decremented back-off counter/back-off timer has a value equal to or less than zero, refrain from (randomly) selecting one or more of the at least one resource for random access. In such configurations, the apparatus (e.g., RX/STA) may, if the reduced/adjusted/decremented back-off counter/back-off timer has a value greater than zero, (randomly) select one or more of the at least one resource for random access and transmit a frame/packet/data/information using/utilizing the selected one or more of the at least one resource for random access.

In some configurations, reducing/adjusting/decrementing a back-off counter/back-off timer based on the determined number/amount/duration/size of the at least one resource (e.g., RU) for random access may include reducing/adjusting/decrementing the back-off counter/back-off timer by an amount of time/quantity/duration/count-value equal/correspond/associated to/with the determined number/amount/duration/size of the at least one resource for random access (as assigned/allocated by the ULTR). In some configurations, reducing/adjusting/decrementing a back-off counter/back-off timer based on the determined number/amount/duration/size of the at least one resource (e.g., RU) for random access may include reducing/adjusting/decrementing a value of the back-off counter/back-off timer by a value of fixed/predetermined/variable value/amount for each of the determined number/amount/duration/size of the at least one resource for random access (as assigned/allocated by the ULTR). In some configurations, at least one of (or each of) the at least one resource assigned/allocated by the ULTR for random access is assigned/allocated/having a particular identifier, wherein the apparatus (e.g., RX/STA) uses/utilizes that particular identifier to determine which of the resources assigned/allocated by the ULTR is the at least one resource for random access. In some configurations, at least one resource (e.g., RU) for random access includes/means at least one resource (e.g., RU) that is not assigned/allocated to a specific receiver/RX/STA/destination (by the ULTR). In some configurations, at least one resource (e.g., RU) for random access includes/means at least one resource (e.g., RU) that is assigned/associated with a specific/particular/ predetermined identifier (e.g., AID).

In some circumstances, an apparatus may benefit from remaining in a power-save/low-power mode for a particular period of time. For example, an RX/STA may benefit from remaining in a power-save/low-power mode until an ULTR is received. As described above, the ULTR may allocate/ assign at least one resource (e.g., RU) for random access. In some circumstances, a system may benefit by reducing and/or minimizing overhead in/during wireless communication. For example, scheduling every single ULTR may add substantial overhead to the system, thereby possibly reducing the system efficiency and overall system throughput.

In some configurations, rather than scheduling each and every ULTR, at least some ULTR may be communicated in a cascaded sequence of ULTR for random access. For example, a first set of one or more ULTRs may be scheduled and a second set of one or more ULTR may be cascaded after the first set of the one or more scheduled ULTRs. In some configurations, a signal communicated prior to the communication of the first set of the one or more scheduled ULTRs may indicate that a subsequent/next ULTR is a scheduled ULTR. Such a signal may be included in a beacon, a beacon frame, a header of another frame/packet, or in any other suitable signal. Such a signal may also indicate a beginning of a transmission time, a start of a transmission time interval, a commencement of a TXOP, a target transmission time, and/or a desired transmission period/duration for at least one of the first set of the one or more scheduled ULTRs. In some configurations, a scheduled ULTR may indicate that a subsequent ULTR is a non-scheduled and/or cascaded/cascading ULTR. Such an indication may be a bit, sequence of bits, header field, and/or any other indicator included in the scheduled ULTR.

In some configurations, an apparatus (e.g., TX/AP) may transmit a first signal/message (e.g., beacon) comprising scheduling information, a start time, and/or a time interval associated with at least a first ULTR configured to assign/ allocate at least one resource for random access. In some configurations, an apparatus (e.g., TX/AP) may also transmit the first ULTR according to the scheduling information, start time, and/or time interval, wherein the first ULTR includes an indication of a cascaded sequence (of one or more other ULTRs) when one or more other ULTRs are set/scheduled for (subsequent) transmission. In some configurations, an apparatus (e.g., TX/AP) may also transmit an ACK/NACK/ BA after receiving data on the at least one resource for random access. In some configurations, an apparatus (e.g., TX/AP) may also transmit one or more other ULTRs after transmitting the ACK/NACK/BA when the first ULTR includes the indication of the cascaded sequence (of one or more other ULTRs).

In some configurations, an apparatus (e.g., RX/STA) may receive a signal/message (e.g., beacon) comprising scheduling information, a start time, a time interval associated with at least a first ULTR configured to assign/allocate at least one resource for random access. In some configurations, an apparatus (e.g., RX/STA) may also enter a low-power mode, a power-save mode, an ultra-low-power mode, a doze mode, and/or a doze-off mode until a time corresponding to the scheduling information, the start time, and/or the time interval included in the received signal/ message. In some configurations, an apparatus (e.g., RX/STA) may detect and/or attempt to (randomly) select at least one resource for random access allocated/assigned by the first ULTR. In some configurations, an apparatus (e.g., RX/STA) may, if/when the attempt to (randomly) select at least one resource for random access is unsuccessful, determine/detect whether the first ULTR includes an indication of a cascaded sequence (of one or more other ULTRs). In some configurations, an apparatus (e.g., RX/STA) may receive a second ULTR and/or attempt to (randomly) select at least one resource for random access when the first ULTR includes the indication of a cascaded sequence (of one or more other ULTRs). In some configurations, an apparatus (e.g., RX/STA) may detect and/or attempt to (randomly) select at least one resource for random access allocated/ assigned by the second ULTR if/when the attempt to (randomly) select the at least one resource for random access assigned/allocated in/by the first ULTR is unsuccessful.

At block 412, an apparatus may enable aspects related to performing UL communication(s). In some aspects, in response to receiving the ULTR (e.g., DL transmission(s) 232, 234), an STA may transmit an UL transmission (e.g., UL transmission(s) 262, 264) (at least partially) simultaneously/concurrently with (UL transmission(s) of) one or more STAs of the plurality of STAs. That is, in response to transmitting the ULTR, an AP may receive UL transmission(s) simultaneously/concurrently from a plurality of STAs. For example, referring to FIG. 2, at time $T_{vii}$, in response to receiving an ULTR (e.g., DL transmission 232, 234), $STA_1$ 114, $STA_2$ 116 may simultaneously/concurrently transmit their respective UL transmission (e.g., UL transmission(s) 262, 264, respectively). In some aspects, receiving the DL multiuser transmission (e.g., DL multiuser transmission(s) 222 at time $T_{iii}$) and transmitting the simultaneous/concurrent UL transmissions (e.g., UL transmission(s) at time $T_{vii}$) by the plurality of STAs occur in the same transmission opportunity.

In some aspects, as described above, an STA may determine the amount of power loss during the DL transmission of the ULTR (e.g., DL transmission(s) 232, 234) from an AP to the STA. As also described above, in some aspects, the ULTR (e.g., DL transmission(s) 232, 234) may include information corresponding to the power measurement of the transmitted ULTR (e.g., DL transmission(s) 232, 234). In some aspects, based on the determined amount of power loss during the DL transmission of the ULTR (e.g., DL transmission(s) 232, 234) from the AP to the STA and/or based on the target received signal strength (as included in the ULTR), the STA may determine an amount of power (to be utilized by one or more antennas) for the UL transmission (e.g., UL transmission(s) 262, 264) by the STA to the AP. In accordance with the determined amount of power for the UL transmission, the STA(s) may transmit the UL transmission(s) (e.g., UL transmission(s) 262, 264) to the AP. In some aspects, the UL transmission(s) may include information corresponding to how much transmission power the STA(s) remains capable of using relative to a transmission power currently utilized. For example, an UL transmission 262 may include information indicating how much more power $STA_1$ 114 is able of using relative to how much power $STA_1$ 114 is currently using for that UL transmission 262. In some aspects, how much transmission power the STA remains capable of using relative to the transmission power currently utilized refers to a difference between a maximum transmission power (of the STA(s)) and a currently utilized amount of power (by the STA) for the UL transmission(s) (UL transmission(s) 262, 264).

In some aspects, an AP may transmit and/or an STA may receive a request for simultaneous transmission of an acknowledgement message by the plurality of STAs. For example, referring to FIG. 2, in the DL transmission(s) 222 at time $T_{iii}$, or in the DL transmission(s) 232, 234 at time $T_{iv}$, AP$_1$ 112 may transmit and/or STA$_1$ 114, STA$_2$ 116 may receive a request for simultaneous transmission of an acknowledgement message by the plurality of STAs (e.g., STA$_1$ 114, STA$_2$ 116). In response to the received request, an AP may receive and/or an STA may transmit an UL acknowledgement message simultaneously/concurrently with another STA of the plurality of STAs. For example, referring to FIG. 2, in the UL transmission(s) 262, 264 at time T$_{vii}$, the plurality of STAs (e.g., STA$_1$ 114, STA$_2$ 116) may simultaneously/concurrently transmit an UL acknowledgement message to AP$_1$ 112 (e.g., in UL transmission(s) 262, 264). In some aspects, in response to receiving the ULTR (e.g., DL transmission(s) 232, 234), an STA may transmit and/or an AP may receive a feedback frame at a same time as a transmission of a feedback frame by another STA. For example, referring to FIG. 2, at time T$_{vii}$, in response to receiving a DL transmission 232 (e.g., ULTR) at time T$_{iv}$, STA$_1$ 114 may transmit an UL transmission 262. The UL transmission 262 may include a feedback frame and may be transmitted simultaneously/concurrently with a transmission of a feedback frame in another UL transmission 264 by STA$_2$ 116 to AP$_1$ 112.

In some configurations, the STA may receive and/or begin/initiate/detect/determine receiving at least a first portion of a ULTR. In some configurations, the STA may the STA may begin/initiate preparation of an UL transmission (e.g., an UL PPDU) corresponding to/associated with/in response to/based on information included in the at least first portion of the ULTR. In some configurations, the STA may begin/initiate preparation of the UL transmission prior to and/or before completely/entirely/fully processing/demodulating/decoding/decrypting/receiving the entire/entirety of the ULTR. In some configurations, the STA may begin/initiate preparation of the UL transmission after receiving less than an entirety of the ULTR (e.g., DL transmission). In some configurations, preparation of the UL transmission may begin/initiate when/upon processing/demodulating/decoding/decrypting/receiving a common portion of the ULTR (e.g., a portion processed/demodulated/received/processed by all intended/destined STAs). In some configurations, preparation of the UL transmission may begin/initiate when/upon processing/demodulating/decoding/decrypting/receiving a STA-specific portion (e.g., STA-specific information, per-user information, user-specific information, etc.) of/included in the ULTR (e.g., a STA-specific portion of the ULTR that corresponds to a specific STA). In some configurations, preparation of the UL transmission may occur prior to reception of an end portion of the ULTR. In some configurations, the end portion of the ULTR may include padding, tail bits, etc. In some configurations, the AP may determine/obtain/receive information associated with an amount of time/duration of time that one or more STAs utilize for preparation of an UL transmission (e.g., PPDU). In some configurations, the AP may set/determine/configure/adjust an amount/size/duration/length of padding included in an ULTR based on/in response to/in association with/corresponding to that information. In some configurations, the amount/size/duration/length of padding included in the ULTR may be increased when that information indicates a relatively longer amount/duration of time for one or more STAs to prepare an UL transmission. In some configurations, the amount/size/duration/length of padding included in the ULTR may be decreased when that information indicates a relatively longer amount/duration of time for one or more STAs to prepare an UL transmission.

In some configurations, the STA may determine/estimate/obtain/ascertain/calculate/compute/approximate an amount/duration/profile/measurement of loss/attenuation/dissipation of power (e.g., during the DL transmission from the AP to the STA) in response to/in accordance with/based on (one or more) information received from the AP. In some configurations, the STA may determine/estimate/obtain/ascertain/calculate/compute/approximate an amount/duration/profile/measurement for a transmission by the STA to the AP. In some configurations, the STA may determine/adjust/set/calibrate/estimate/obtain/ascertain/calculate/compute/approximate an amount/duration/profile/measurement for an UL transmission by the STA to the AP based on one or more factors. In some configurations, a factor may include the determined/estimated/obtained/ascertained/calculated/computed/approximated amount/duration/profile/measurement of loss/attenuation/dissipation of power (e.g., during the DL transmission from the AP to the STA). In some configurations, a factor may include the threshold/target/ideal/selected/preselected/optimized received signal strength for the one or more STAs as received in/included in the ULTR from the AP.

In some configurations, the STA may transmit an UL transmission in response to/utilizing/observing/considering/according to/based on/in accordance with the determined/adjusted/set/calibrated/estimated/obtained/ascertained/calculated/computed/approximated amount/duration/profile/measurement for the UL transmission by the STA to the AP (e.g., based on the one or more factors). In some configurations, the AP may receive an UL transmission in response to/utilizing/observing/considering/according to/based on/in accordance with the determined/adjusted/set/calibrated/estimated/obtained/ascertained/calculated/computed/approximated amount/duration/profile/measurement for the UL transmission by the STA to the AP (e.g., based on the one or more factors). In some configurations, the UL transmission may include an indication/indicia/information/field/parameter associated with/corresponding to/affiliated with how much transmission power remains/is left/it remains capable of using relative to a transmission power currently or otherwise utilized (e.g., a difference between a maximum transmission power and a current or otherwise utilized transmission power). In some configuration, the AP may utilize the indication/indicia/information/field/parameter associated with/corresponding to/affiliated with how much transmission power remains/is left/it remains capable of using relative to a transmission power currently or otherwise utilized by the STA for one or more subsequent/future/following transmissions. For example, a subsequent/future/following ULTR from the AP to the STA may include information associated with/based on/corresponding to the indication/indicia/information/field/parameter associated with/corresponding to/affiliated with how much transmission power remains/is left/it remains capable of using relative to a transmission power currently or otherwise utilized by the STA.

It will be understood by one of ordinary skill in the art that the specific order or hierarchy of the processes disclosed herein is provided for illustrative and exemplary purposes. Based upon design preferences, the specific order or hierarchy of steps in the processes may be re-arranged and/or some processes may be combined or omitted without deviating from the scope of the present disclosure. The accompanying claims present elements of the various steps in a sample order, and are not meant to be limited to the specific order or hierarchy presented. The particular order, sequence, chronology, and/or combination of the aspects described herein are not intended to limit the scope of the present disclosure nor any aspect of the claims, unless explicitly required by the claims. Any of the aspects described herein may be configured or implemented in additional or alternative orders, sequences, chronologies, and/or combinations without deviating from the scope of the present disclosure. Each and every aspect described herein is not necessarily required in all configurations and embodiments of the present disclosure. Accordingly, any aspect not recited or otherwise required by the claims shall not be construed as limiting the scope of the claims. That is, the scope of the claims shall not be construed any more narrowly than required by the claims simply because there may exist a possibility of any additional and/or alternative aspects described throughout the present disclosure. The scope of the claims shall not be construed as limited to the examples provided herein, unless a corresponding feature is expressly recited in the claims.

Figure 5:
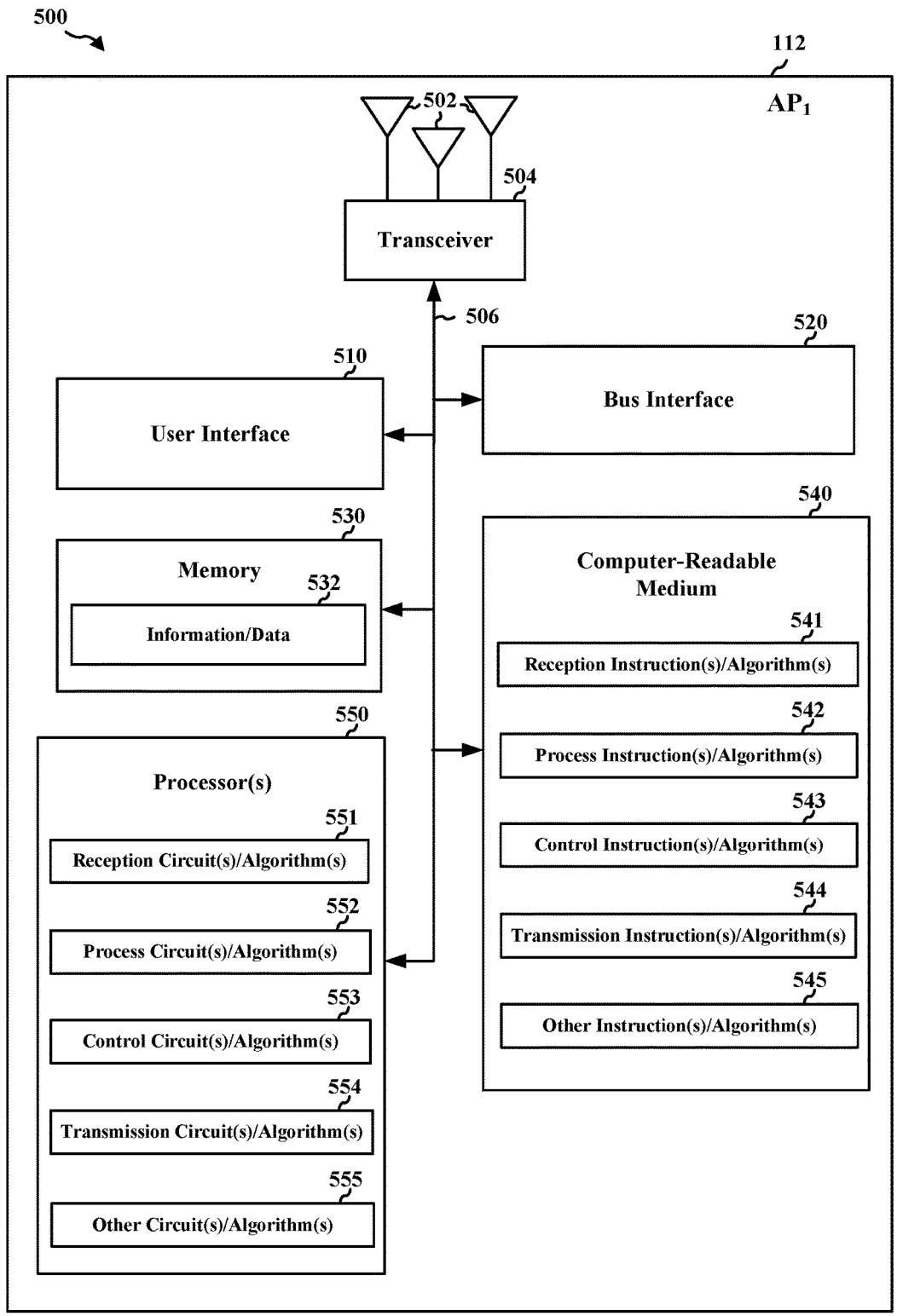
FIG. 5 is a block diagram illustrating a non-limiting example of an AP according to some aspects of the present disclosure.

FIG. 5 is a block diagram 500 illustrating a non-limiting example of an AP (e.g., $AP_1$ 112) according to some aspects of the present disclosure. The AP may have various circuits, algorithms, hardware components, software modules, and/or computer-readable medium storing computer-executable instructions comprising various algorithms, any of the foregoing of which, individually or in some combination, may provide the structure corresponding to the means for performing any one or more of the functions, features, steps, elements, methods, and/or operations described throughout the present disclosure.

The AP may include a bus 506. The bus 506 may include any number of interconnecting buses and/or bridges depending on the particular design of the AP. The bus 506 may provide a connection/link between various aspects of the AP, which may include one or more of the following: processor(s) 550, computer-readable medium 540, memory 530, user interface 510, bus interface 520, transceiver 504, and/or antenna(s) 502. The bus 506 may enable a link between/to various other aspects, such as timing sources, peripherals, voltage regulators, and/or power management circuits. The user interface 510 may exchange data via the bus interface 520. The bus interface 520 may provide an interface between the bus 506 and the transceiver 504. The transceiver 504 may be connected to one or more antennas 502. The transceiver 504 may provide a means for wirelessly communicating (e.g., receiving data and/or transmitting data) with various other apparatus over a wireless transmission medium. In some aspects, the transceiver 504 may receive a signal from the one or more antennas 502, extract information from the received signal, and provide the extracted information to the processor(s) 550. In some aspects, the transceiver 504 may receive information from the processor(s) 550 and, based on the received information, generate a signal to be applied to the one or more antennas 502. The memory 530 may include various information/data 532 related to any one or more of the functions, features, steps, methods, processes, and/or operations described herein.

The processor(s) 550 may include one or more circuits configured to enable, may perform one or more algorithms related to, and/or may provide the structure (e.g., means for) corresponding to any one or more of the functions, features, steps, methods, processes, and/or operations described herein. In some aspects, the reception circuit/algorithm 551 may provide the structure (e.g., means for) corresponding to any one or more of the functions, features, steps, methods, processes, and/or operations described herein with relation to receiving anything. In some aspects, the processing circuit/algorithm 552 may provide the structure (e.g., means for) corresponding to any one or more of the functions, features, steps, methods, processes, and/or operations described herein with relation to using anything, determining anything, considering anything, refraining from considering anything, and/or randomly selecting anything. In some aspects, the control circuit/algorithm 553 may provide the structure (e.g., means for) corresponding to any one or more of the functions, features, steps, methods, processes, and/or operations described herein with relation to updating anything, refraining from updating anything, eliminating anything, overriding anything, maintaining anything, and/or entering into any mode. In some aspects, the transmission circuit/algorithm 554 may provide the structure (e.g., means for) corresponding to any one or more of the functions, features, steps, methods, processes, and/or operations described herein with relation to generating anything and/or transmitting anything. In some aspects, the other circuit(s)/algorithm(s) 555 may provide the structure (e.g., means for) corresponding to any one or more of the other functions, features, steps, methods, processes, and/or operations described throughout the present disclosure. The processor(s) 550 may be responsible for general processing, including the execution of software (e.g., instructions, code, algorithms, etc.) stored in/on the computer-readable medium 540.

The computer-readable medium 540 may be used for storing data that is manipulated by the processor(s) 550. The computer-readable medium 540 may be a non-transitory computer-readable medium. The computer-readable medium 540 may include one or more instructions (e.g., computer-executable code) configured to enable, may perform one or more algorithms related to, and/or may provide the structure (e.g., means for) corresponding to any one or more of the functions, features, steps, methods, processes, and/or operations described herein. In some aspects, the reception instructions/algorithm 541 may provide the structure (e.g., means for) corresponding to any one or more of the functions, features, steps, methods, processes, and/or operations described herein with relation to receiving anything. In some aspects, the process instructions/algorithm 542 may provide the structure (e.g., means for) corresponding to any one or more of the functions, features, steps, methods, processes, and/or operations described herein with relation to using anything, determining anything, considering anything, refraining from considering anything, and/or randomly selecting anything. In some aspects, the control instructions/algorithm 543 may provide the structure (e.g., means for) corresponding to any one or more of the functions, features, steps, methods, processes, and/or operations described herein with relation to updating anything, eliminating anything, overriding anything, maintaining anything, and/or entering into any mode. In some aspects, the transmission instructions/algorithm 544 may provide the structure (e.g., means for) corresponding to any one or more of the functions, features, steps, methods, processes, and/or operations described herein with relation to generating anything and/or transmitting anything. In some aspects, the other circuit(s)/algorithm(s) 545 may provide the structure (e.g., means for) corresponding to any one or more of the other functions, features, steps, methods, processes, and/or operations described throughout the present disclosure. Additional details related to the aspects described in FIG. 5 are provided throughout the present disclosure.

Figure 6:
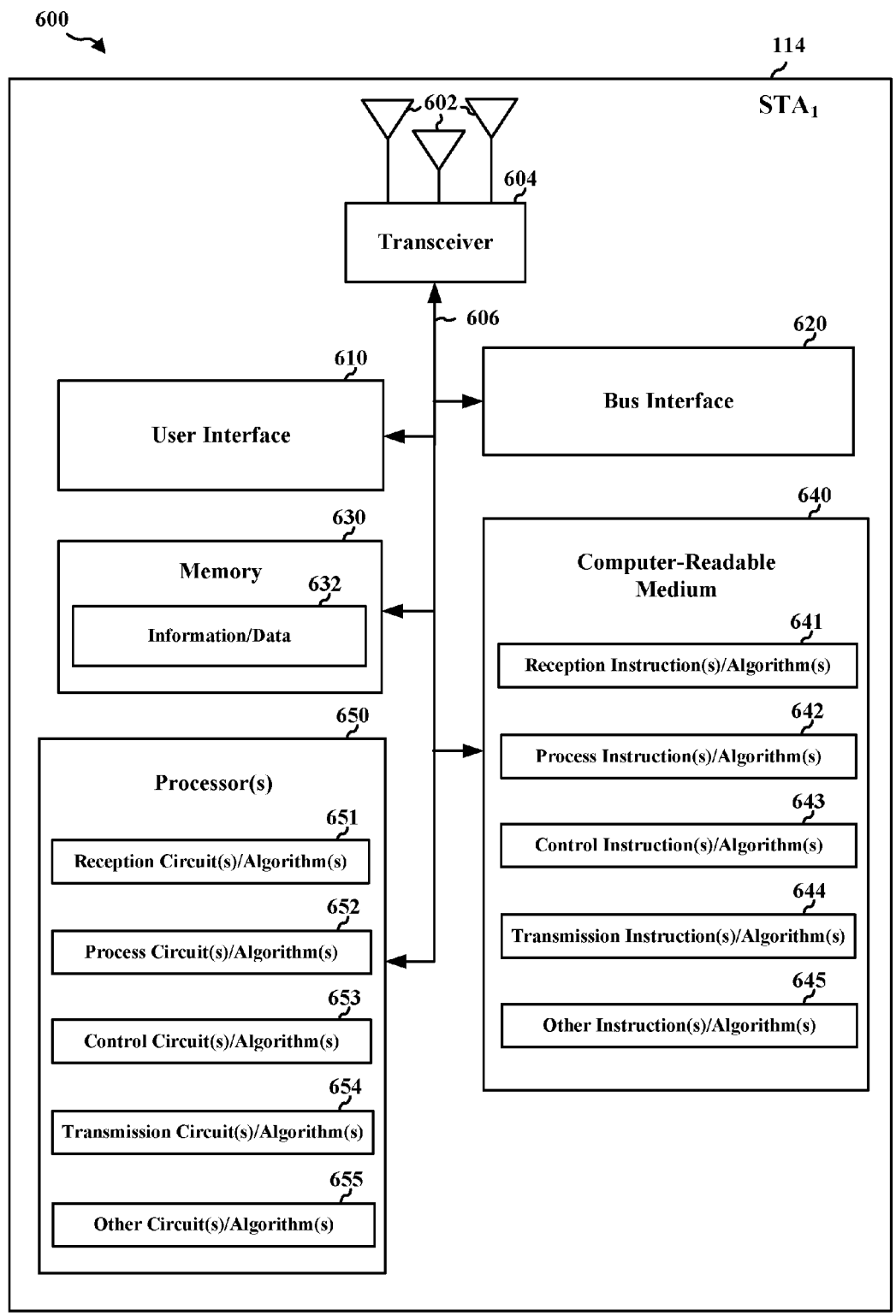
FIG. 6 is a block diagram illustrating a non-limiting example of a STA according to some aspects of the present disclosure.

FIG. 6 is a block diagram 600 illustrating a non-limiting example of an STA (e.g., $STA_1$ 114) according to some aspects of the present disclosure. The STA may have various circuits, algorithms, hardware components, software modules, and/or computer-readable medium storing computer-executable instructions comprising various algorithms, any of the foregoing of which, individually or in some combination, may provide the structure corresponding to the means for performing any one or more of the functions, features, steps, elements, methods, and/or operations described throughout the present disclosure.

The STA may include a bus 606. The bus 606 may include any number of interconnecting buses and/or bridges depending on the particular design of the STA. The bus 606 may provide a connection/link between various aspects of the STA, which may include one or more of the following: processor(s) 650, computer-readable medium 640, memory 630, user interface 610, bus interface 620, transceiver 604, and/or antenna(s) 602. The bus 606 may enable a link between/to various other aspects, such as timing sources, peripherals, voltage regulators, and/or power management circuits. The user interface 610 may exchange data via the bus interface 620. The bus interface 620 may provide an interface between the bus 606 and the transceiver 604. The transceiver 604 may be connected to one or more antennas 602. The transceiver 604 may provide a means for wirelessly communicating (e.g., receiving data and/or transmitting data) with various other apparatus over a wireless transmission medium. In some aspects, the transceiver 604 may receive a signal from the one or more antennas 602, extract information from the received signal, and provide the extracted information to the processor(s) 650. In some aspects, the transceiver 604 may receive information from the processor(s) 650 and, based on the received information, generate a signal to be applied to the one or more antennas 602. The memory 630 may include various information/data 632 related to any one or more of the functions, features, steps, methods, processes, and/or operations described herein.

The processor(s) 650 may include one or more circuits configured to enable, may perform one or more algorithms related to, and/or may provide the structure (e.g., means for) corresponding to any one or more of the functions, features, steps, methods, processes, and/or operations described herein. In some aspects, the reception circuit/algorithm 651 may provide the structure (e.g., means for) corresponding to any one or more of the functions, features, steps, methods, processes, and/or operations described herein with relation to receiving anything. In some aspects, the processing circuit/algorithm 652 may provide the structure (e.g., means for) corresponding to any one or more of the functions, features, steps, methods, processes, and/or operations described herein with relation to using anything, determining anything, considering anything, refraining from considering anything, and/or randomly selecting anything. In some aspects, the control circuit/algorithm 653 may provide the structure (e.g., means for) corresponding to any one or more of the functions, features, steps, methods, processes, and/or operations described herein with relation to updating anything, refraining from updating anything, eliminating anything, overriding anything, maintaining anything, and/or entering into any mode. In some aspects, the transmission circuit/algorithm 654 may provide the structure (e.g., means for) corresponding to any one or more of the functions, features, steps, methods, processes, and/or operations described herein with relation to generating anything and/or transmitting anything. In some aspects, the other circuit(s)/algorithm(s) 655 may provide the structure (e.g., means for) corresponding to any one or more of the other functions, features, steps, methods, processes, and/or operations described throughout the present disclosure. The processor(s) 650 may be responsible for general processing, including the execution of software (e.g., instructions, code, algorithms, etc.) stored in/on the computer-readable medium 640.

The computer-readable medium 640 may be used for storing data that is manipulated by the processor(s) 650. The computer-readable medium 640 may be a non-transitory computer-readable medium. The computer-readable medium 640 may include one or more instructions (e.g., computer-executable code) configured to enable, may perform one or more algorithms related to, and/or may provide the structure (e.g., means for) corresponding to any one or more of the functions, features, steps, methods, processes, and/or operations described herein. In some aspects, the reception instructions/algorithm 641 may provide the structure (e.g., means for) corresponding to any one or more of the functions, features, steps, methods, processes, and/or operations described herein with relation to receiving anything. In some aspects, the process instructions/algorithm 642 may provide the structure (e.g., means for) corresponding to any one or more of the functions, features, steps, methods, processes, and/or operations described herein with relation to using anything, determining anything, considering anything, refraining from considering anything, and/or randomly selecting anything. In some aspects, the control instructions/algorithm 643 may provide the structure (e.g., means for) corresponding to any one or more of the functions, features, steps, methods, processes, and/or operations described herein with relation to updating anything, eliminating anything, overriding anything, maintaining anything, and/or entering into any mode. In some aspects, the transmission instructions/algorithm 644 may provide the structure (e.g., means for) corresponding to any one or more of the functions, features, steps, methods, processes, and/or operations described herein with relation to generating anything and/or transmitting anything. In some aspects, the other circuit(s)/algorithm(s) 645 may provide the structure (e.g., means for) corresponding to any one or more of the other functions, features, steps, methods, processes, and/or operations described throughout the present disclosure. Additional details related to the aspects described in FIG. 6 are provided throughout the present disclosure.

Several aspects of communication systems are presented herein with reference to various apparatuses, methods, and computer-readable medium, which are described herein and possibly illustrated in the accompanying drawings by various blocks, modules, components, circuits, steps, processes, algorithms, etc. (collectively, "elements"). Such elements may be implemented using electronic hardware, computer software, and/or any combination thereof. Whether such elements are implemented as hardware and/or software may depend upon the particular application and/or design constraints imposed on the overall communication system.

Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary configurations, the functions described may be implemented in hardware, software, firmware, or any combination thereof. If implemented in software, the functions may be stored on or encoded as one or more instructions or code on a computer-readable medium. Computer-readable media includes computer storage media. Computer storage media may be any available media that can be accessed by a computer. By way of example, and not limitation, such computer-readable media may comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the foregoing may also be included within the scope of computer-readable media. Also, combinations of the foregoing may also be included within the scope of memory.

The terms and phrases utilized in the present disclosure may have various meanings, definitions, descriptions, characterizations, classifications, and/or other attributes that are understood by one of ordinary skill in the art and which are within the scope of the present disclosure. It would be impractical to explicitly elaborate upon every single term and/or phrase in the present disclosure, and one of ordinary skill in the art will understand the meanings, definitions, descriptions, characterizations, classifications, and/or other attributes of the terms and/or phrases in the present disclosure, even if not explicitly elaborated upon. Nevertheless, for purposes of illustration but not limitation, various non-limiting examples of some meanings, definitions, descriptions, characterizations, classifications, and/or other attributes are provided herein with reference to some of those terms and/or phrases in the present disclosure. None of these examples are intended to limit the scope of such terms and/or phrases; accordingly, such terms and/or phrases may have additional or alternative meanings, definitions, descriptions, characterizations, classifications, and/or other attributes without necessarily deviating from the scope of the present disclosure.

The term(s) 'receive' and/or 'receiving' (and similar terms) may include acquiring, obtaining, collecting, analyzing, reading, processing, decoding, demodulating, deciphering, and/or various other suitable operations, features, and/or functions. The term(s) 'transmit' and/or 'transmitting' (and similar terms) may include generating, modulating, addressing, designating, encoding, processing, sending, broadcasting, conveying, relaying, transferring, transporting, channeling, forwarding, propagating, routing, and/or various other suitable operations, features, and/or functions. The terms(s) 'refrain' and/or 'refraining' (and similar terms) may include abstaining, avoiding, resisting, forgoing, desisting, renouncing, restraining, forbearing, bypassing, withholding, omitting, not performing, and/or various other suitable operations, features, and/or functions. The term(s) 'consider' and/or 'considering' (and similar terms) may include reading, processing, analyzing, inspecting, acknowledging, looking at, reviewing, comparing, processing, checking, viewing, assessing, and/or various other suitable operations, features, and/or functions. The term(s) 'determine' and/or 'determining' (and similar terms) may include processing, calculating, electing, selecting, looking up, reading, computing, using, concluding, deciding, resolving, settling, deducing, inferring, deriving, obtaining, and/or various other suitable operations, features, and/or functions. The term(s) 'use' and/or 'using' (and similar terms) may include utilizing, employing, exploiting, applying, basing upon, leveraging, working with, using to look up, using to determine, using to/for reference, processing, analyzing, looking at, and/or various other suitable operations, features, and/or functions.

The term(s) 'eliminate' and/or 'eliminating' (and similar terms) may include excluding, not considering, refraining from considering, disqualifying, ignoring, and/or various other suitable operations, features, and/or functions. The term(s) 'select' and/or 'selecting' (and similar terms) may include choosing, electing, appointing, allocating, designating, determining, deciding on, picking, using, utilizing, performing an operation (e.g., transmission/reception) using, and/or various other suitable operations, features, and/or functions. The term(s) 'random' and/or 'randomly' (and similar terms) may include arbitrarily, indiscriminately, incidentally, by chance, without allocation/assignment, without designation, haphazardly, and/or various other suitable operations, features, and/or functions. The term(s) 'override' and/or 'overriding' (and similar terms) may include replacing, annulling, overwriting, superseding, canceling, replacing, and/or various other suitable operations, features, and/or functions. The term(s) 'maintain' and/or 'maintaining' (and similar terms) may include using, considering, managing, utilizing, employing, supporting, enabling, accommodating, processing, sustaining, and/or various other suitable operations, features, and/or functions. The term(s) 'trigger' and/or 'cause' may include elicit, activate, start, initiate, bring about, generate, produce, trigger, cause, prompt, provoke, lead to, result in, precipitate, evoke, incite, kickoff, motivate, make, and/or various other suitable operations, features, and/or functions. The term 'in response to' may refer to an indirect or direct causal relationship, an association, a correspondence, a temporal relationship or association, and/or various other suitable attributes. For example, X may be in response to Y if/when X is indirectly or directly caused by Y, if/when the occurrence/existence of X is associated with the occurrence/existence of Y, if/when the occurrence/existence of X corresponds to the occurrence/existence of Y, if/when the occurrence/existence of X is within a particular period of time relative to the occurrence/existence of Y, if/when X has various other suitable attributes in relation to Y.

In some aspects, a 'NAV' refers to a virtual carrier sensing mechanism that may be utilized in various wireless communication protocols. By using virtual carrier sensing, the need for (physical/actual) carrier sensing (e.g., energy detection or sensing on a channel or subchannel) may be minimized, reduced, and/or limited, which can contribute to power conservation. In some aspects, a NAV may be an indicator maintained by each STA, and the indicator may indicate time periods when transmission onto a wireless communication medium is not, will not be, or should not be initiated by the STA, even if the STA's clear channel assessment senses that the channel is may not be busy (e.g., is idle/available). In some aspects, a NAV may be configured to regulate whether the STA accesses a wireless communication medium, channel, and/or subchannel during a period of time. In some aspects, a NAV may be thought of as a counter that counts backwards, wherein the wireless communication medium, channel, and/or subchannel is busy anytime that the counter has a positive value, and wherein the wireless communication medium, channel, and/or subchannel is available (e.g., idle) anytime that the counter does not have a positive value (e.g., has a value of zero). An apparatus (e.g., STA) may receive, read, determine, obtain, recall, utilize, ascertain, and/or otherwise interface with such information. In some aspects, such information may be received in a frame, packet, and/or data unit, as described in greater detail herein. Based on such information, the apparatus (e.g., STA) may determine whether a wireless communication medium, channel, and/or subchannel is available or busy during a particular period/duration of time. The phrase 'updating a NAV,' 'setting a parameter/setting of a NAV,' 'setting a NAV,' and/or various other similar/related phrases may refer to various functions, features, and/or operations related to such information. For example, such phrases may generally refer to updating and/or setting the information related to the duration/period during which a wireless communication medium, channel, and/or subchannel is busy or available. Various additional and alternative aspects related to the NAV are readily understood by one of ordinary skill in the art and are within the scope of the present disclosure.

The term(s) 'detection' and/or 'detecting' may refer to the determination, conclusion, deduction, inference, and/or other suitable operation/function that the characteristics associated with a particular signal satisfy at least one criterion, threshold, requirement, condition, parameter, and/or setting. For example, at least a portion (e.g., a preamble) of a signal may be detected if the strength (e.g., power) of the received signal satisfies a particular criterion, threshold, requirement, condition, parameter, and/or setting. The term 'time synchronization' may refer to the temporal attribute, relationship, and/or correlation of certain occurrences. In some aspects, the time synchronization of simultaneous/concurrent transmissions (e.g., by a plurality of STAs) may refer to the attribute, relationship, and/or correlation that those simultaneous/concurrent transmissions begin at the same/similar time as, occur (at least in part) concurrently with, and/or end at the same/similar time relative to each other. In some aspects, the phrase 'simultaneous UL transmissions' may refer to 'an UL transmission (by an STA) simultaneously/concurrently with another UL transmission (by at least one other STA).' The term(s) 'reduce' and/or 'reducing' may include decreasing, subtracting, lessening, lowering, decrementing, scaling, scaling down, curtailing, adjusting, and/or various other suitable operations, features, and/or functions.

The term 'plurality' refers to 'more than one' (e.g., two or more). Although the term 'plurality' may refer to 'all' in some aspects, the term 'plurality' may refer to 'some but not all' or 'some but fewer than all' in some other aspects. Therefore, recitation of 'plurality of STAs' refers to 'two or more STAs' but such recitation does not necessarily require or necessitate each and every STA in every embodiment. Accordingly, in some aspects, 'plurality' may be interchangeable with 'more than one but fewer than all/every.'

In some aspects, the term(s) 'communication,' 'transmission,' 'signal,' 'frame,' 'packet,' 'data unit,' and/or various other similar terms may be interchangeable with each other without deviating from the scope of the present disclosure. In some aspects, the term(s) 'communication,' 'transmission,' 'signal,' 'frame,' 'packet,' 'data unit,' 'UL signal,' 'DL signal,' 'ULTR,' 'UL trigger,' and/or various other similar terms may refer to any form, grouping, and/or encapsulation of one or more bits, signals, waveforms, and/or data. In some aspects, such terms may be interchangeable relative to each other without deviating from the scope of the present disclosure. Without deviating from the scope of the present disclosure, some of these terms may be referred to by various other terms, such as a protocol data unit (e.g., a physical layer convergence protocol (PLCP) protocol data unit (PPDU), a MAC protocol data unit (MPDU)), a service data unit (e.g., a physical layer service data unit (PSDU), a MAC service data unit (MSDU)), and/or various other suitable form, grouping, and/or encapsulation of one or more bits, signals, waveforms, and/or data.

In some aspects, the term 'apparatus' may refer to the singular form of the word (apparatus). In some aspects, the term 'apparatus' is not limited to the singular form of the word (apparatus) and, thus, 'apparatus' may refer to the singular form and/or the plural form of the word (apparatus) without deviating from the scope of the present disclosure. For example, in some aspects, 'apparatus' may be interchangeable with 'apparatuses,' 'one or more apparatus,' and/or 'one or more apparatuses' without deviating from the scope of the present disclosure. In some aspects, the term 'medium' may refer to the singular form of the word (medium). In some aspects, the term 'medium' is not limited to the singular form of the word (medium) and, thus, 'medium' may refer to the singular form and/or the plural form of the word (medium) without deviating from the scope of the present disclosure. For example, in some aspects, 'medium' may be interchangeable with 'mediums,' 'media,' 'one or more mediums,' and/or 'one or more media' without deviating from the scope of the present disclosure.

In some aspects, the terms 'destined for' and 'intended for' may be interchangeable without deviating from the scope of the present disclosure. In some aspects, the terms 'destined/intended for' and 'destined/intended to' may be interchangeable without deviating from the scope of the present disclosure. The coverage area of a particular transmitter (e.g., AP, STA) may include many receivers (e.g., AP(s), STA(s)); however, in some aspects, not all of those receivers are necessarily the intended receivers or destinations of every transmission from that transmitter. For example, in some aspects, the transmitter may transmit a transmission (e.g., signal, frame, packet, and/or data unit) that is destined/intended for no more than a subset (e.g., less than an entirety) of all receivers that happen to receive that transmission by virtue of being within the coverage area of that particular transmitter. In some aspects, a transmission is 'intended for' or 'destined for' one or more particular receivers when/if that transmitter intended for that transmission to include at least some data and/or information for that/those one or more particular receivers. For example, the transmitter may include some type of identifier in that transmission for that/those particular receivers to use in order to identify that they are the intended recipients or destinations of at least a portion of that transmission. Accordingly, in some aspects, the terms 'destined for' and 'intended for' shall not necessarily mean every receiver that happened to receive that particular transmission, unless every receiver was an intended recipient or destination of that particular transmission.

The term(s) 'field' and/or 'portion' (and similar terms) may refer to a subset (e.g., not an entirety) of all of the data and/or information contained in an encapsulation sometimes referred to as a frame, packet, or data unit. A frame, packet, and/or data unit may include one or more fields and/or one or more portions. Each field and/or each portion may be configured to include various types and forms of data and/or information without deviating from the scope of the present disclosure.

The term 'STS' may refer to spatial streams, bit streams, information streams, data streams, and/or streams of data and/or information that may have a time component and/or a frequency component. In some aspects, an STS may refer to a stream of modulated symbols created by applying a combination of spatial and temporal processing to one or more spatial streams of modulated symbols. In some aspects, an STS may refer to one of several streams of bits and/or modulated symbols that might be transmitted over multiple spatial dimensions that are created by the use of multiple antennas at both ends of a communication link. In some aspects, STS(s) may be generated using spatial multiplexing, which may refer to a transmission technique in which data streams are transmitted on multiple spatial channels that are provided through the use of multiple antennas at the transmitted and the receiver. In some aspects, a frame, packet, and/or data unit may include a plurality of STSs, and each STS may be independently and/or separately encoded. STSs may employ time multiplexing and/or frequency multiplexing.

The term 'number' (e.g., 'number' of STSs) may refer to the quantity, numerical quantification, count, amount, size, extent, and various other suitable measurements of the STSs. Because a frame, packet, and/or data unit may include a plurality of STS, not all of which may be destined/intended for a single STA, an STA that receives such a frame, packet, and/or data unit may select the STS(s) destined/intended for it. In some aspects, the term 'variable' refers to something that may be adjustable, changeable, configurable, flexible, and/or may consist of a range or set of potential, possible, or candidate values. The term(s) 'selection' and/or 'selecting' (e.g., 'selecting' of one or more STSs included in a frame, packet, and/or data unit) may refer to identifying, electing, picking, and/or choosing of the specific STSs destined/intended for a particular STS.

The term(s) 'UP' and/or 'UP value' may refer to an identifier, attribute, assignment, and/or allocation given to a particular user, STA, group of users, group of STAs, and/or other suitable destinations to which a frame, packet, and/or data unit may be destined/intended. A 'user' may be any intended destination or apparatus configured to utilize the information and/or data included in the frame, packet, and/or data unit. The UP of the STA(s)/user(s) may correspond to, may be associated with, and/or may correlate with a UP of the frame, packet, and/or data unit.

In some aspects, the terms 'assign,' 'assignment,' and/or 'assigned' may be interchangeable with 'allocate,' 'allocation,' 'and/or 'allocated' without deviating from the scope of the present disclosure. In some aspects, the terms 'duration,' 'length,' 'size,' 'period,' and similar terms may be interchangeable without deviating from the scope of the present disclosure. In some aspects, the terms 'simultaneous,' 'concurrent,' and similar terms may be interchangeable without deviating from the scope of the present disclosure. In the context of wireless communication (e.g., reception and/or transmission), two signals, frames, packets, and/or data units may be characterized as 'simultaneous' and/or 'concurrent' if they occur (at least in part) at the same or substantially similar (e.g., temporally similar or correlated) times (i.e., even if not at the exact same time) relative to each other.

In some aspects, the terms 'resource(s)' and 'RU' may be interchangeable without deviating from the scope of the present disclosure and may refer to a duration of time and/or a range of frequencies (e.g., bandwidth) assigned, allocated, dedicated, scheduled, and/or otherwise earmarked for use by one or more apparatuses. In some aspects, one or more resources/RUs may be configured for random access. Such resource(s)/RU(s) may refer to resources shared by a plurality of STAs. In some aspects, the STAs may randomly select one or more of such resource(s)/RU(s) for accessing the wireless communication channel or subchannel.

In some aspects, the phrase 'backoff counter' may refer to a timer or counter that counts or keeps track of an amount of time before an apparatus (e.g., STA) is allowed/permitted to perform an operation/function. For example, an STA may have a backoff counter that may count backwards from a particular value (e.g., Time$_X$, X time-units, etc.) until another particular value (e.g., Timey, Y time-units, etc., wherein Y<X in this example), at which time the STA may perform a particular operation/function (e.g., utilize certain resources of a wireless communication channel). The term 'transmission opportunity' may refer to an interval of time during which an STA is permitted/allowed to access the wireless medium and/or communicate using a particular wireless communication channel or subchannel. In some aspects, a transmission opportunity is defined by a starting time and a maximum duration.

In some aspects, the term(s) 'acknowledgement' and/or 'acknowledgement message' may include a positive acknowledgement message/signal and/or a negative acknowledgement message/signal, and/or may be a block acknowledgement message/signal. The phrase 'feedback frame' may refer to any signal, frame, packet, and/or data unit that includes at least some feedback information and/or data, such as a feedback matrix. A feedback matrix may include information about a signal received at a receiver/beamformee (e.g., STA), and such information may be communicated from the receiver/beamformee (e.g., STA) to a transmitter/beamformer (e.g., AP). In some aspects, the term 'difference' may refer to a subtraction between two values, fields, and/or other suitable aspects, but the ordering can be re-arranged without deviating from the scope of the present disclosure. In some aspects, a difference between X and Y can mean X minus Y. In some aspects, a difference between X and Y can mean Y minus X. In some aspects, the phrase 'originating from' may refer to the origin of a transmission (e.g., an AP/STA from which a transmission originated), without regard to any relays that may extend the coverage area, communication range, and/or propagation distance of that transmission from its origin.

The term(s) 'protect' and/or 'protection' may refer to maintaining a wireless communication channel or subchannel, idle, unencumbered, utilized, reserved, available and/or otherwise accessible for a particular communication during a particular duration or period of time. A transmission configured to cause a plurality of STAs to simultaneously transmit a signal/transmission that is configured to protect a DL multiuser transmission to the plurality of STAs may referred to as a request-to-send message/signal. A signal/transmission that is configured to protect a DL multiuser transmission may be referred to as a clear-to-send message/signal. The term(s) 'transmission power' and/or 'transmit power' may refer to the amount of power with which a signal, frame, packet, and/or data unit is transmitted. In some aspects, how much transmission power an apparatus (e.g., STA, AP, etc.) remains capable of using relative to the transmission power currently/recently utilized may be referred to as transmit power margin/headroom. The term 'indication(s)' may refer to a bit, a field, a parameter, a bitstream, a modulation, and/or any other suitable indicia. The terms 'channel(s)' and/or 'subchannel(s)' may include or refer to a carrier, a subcarrier, a bandwidth, a portion of a bandwidth, a frequency range, a set of frequency values, and/or various other characteristics and attributes known to one of ordinary skill in the art. The term 'BSS' may refer to a set of one or more STAs. Such STAs may be synchronized some of their operations with one another, such as the timings of their transmissions, receptions, NAVs, and/or any other suitable aspects.

Without deviating from the scope of the present disclosure, any aspect described herein with respect to an AP may (or may not) apply to an STA and that the features described herein with respect to an STA may (or may not) apply to an AP. Aspects disclosed herein with respect to an AP and/or STA are hereby also disclosed with respect to any apparatus, method, and/or computer-readable medium that is configured in accordance with such aspects.

The word "example" or "exemplary" may be used herein to mean "serving as a non-limiting example, instance, or illustration." Any aspect, embodiment, and/or configuration described herein as "exemplary" or an "example" shall not necessarily be construed as preferred or advantageous over other aspects, configurations, and/or configurations. The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "A, B, and/or C," "at least A, B, or C," "at least one of A, B, or C," "at least one of A, B, and C," and "A, B, C, or any combination thereof" include any combination of A, B, and/or C, which may include any one of the following possibilities: (i) one or more of A; (ii) one or more of B; (iii) one or more of C; (iv) one or more of A and one or more of B; (v) one or more of A and one or more of C; (vi) one or more of B and one or more of C; or (vii) one or more of A, one or more of B, and one or more of C.

The description set forth below in connection with the appended drawings is intended as a description of various configurations and is not intended to represent the only configurations in which the concepts described herein may be practiced. All structural and functional equivalents to the elements of the various aspects described throughout this disclosure that are known or later come to be known to those of ordinary skill in the art are expressly incorporated herein by reference and may be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for." The description herein is provided to enable any person skilled in the art to practice the various aspects described herein. Without deviating from the scope of the present disclosure, various modifications to the foregoing aspects may be readily apparent to those skilled in the art, and the generic principles defined herein may be applied to other aspects. Thus, the claims are not intended to be limited to the aspects described herein and/or shown in the accompanying drawings. In the claims, any reference to an element in the singular form is not intended to mean "one and only one" unless specifically so stated, but rather "one or more."

The invention claimed is:

1. A station (STA) for wireless communication, the STA comprising:
   a transceiver configured to:
      receive a signal comprising an uplink (UL) transmission request (ULTR) configured to cause one or more STAs to transmit a signal that is configured to protect a downlink (DL) multi-user transmission to a plurality of STAs, wherein the ULTR comprises an indicator identifying a scrambling seed and information for identifying the plurality of STAs; and
      in response to the received signal, transmit the signal configured to protect the DL multi-user transmission to the plurality of STAs, wherein a scrambling seed associated with the transmitted signal configured to protect the DL multi-user transmission is the same as a scrambling seed associated with the received signal configured to cause the one or more STAs to transmit the signal configured to protect the DL multi-user transmission, wherein a time synchronization of the one or more transmissions by the one or more STAs is based on an end time of the received signal configured to cause the one or more STAs to transmit the signal configured to protect the DL multi-user transmission; and
      receive a DL multi-user transmission comprising a data packet intended for the plurality of STAs and comprising a plurality of space-time streams; and
   one or more processor(s) configured to:
      use a field included in the received data packet to determine a total number of space-time streams included in the data packet and further use the same field to select a subset of values from a set of values, the selected subset of values indicating a number of space-time streams intended for each of at least some of the plurality of STAs;
      determine a value of a user position assigned to the STA and select which of the plurality of STSs in the data packet is/are intended for the STA by considering a number of STSs allocated to any other STAs assigned a user position value lower than the user position value assigned to the STA; and
      process the one or more STSs in the data packet that is/are intended for the STA.

2. The STA of claim 1, wherein the received data packet includes a header, wherein the one or more processor(s) is/are further configured to:
   if a portion of the header is repeated at least once, determine that the data packet is not a legacy data packet; and
   if the portion of the header is not repeated at least once, determine that the data packet is a legacy data packet, wherein the portion of the header of the received data packet comprises at least one of a short training field (STF), a long training field (STF), or a signal field (SIG), a non-high throughput signal field (L-SIG), a Signal A field (SIG-A), or a Signal B field (SIG-B).

3. The STA of claim 1, wherein the transceiver is further configured to receive a frame from another STA, the frame configured to update a network/navigation allocation vector (NAV) of the STA, wherein the one or more processors is/are further configured to initiate UL transmission without evaluating a NAV of the STA if the basic service set identifier (BSSID) of the basic service set (BSS) with which the STA is associated corresponds to a BSSID of a BSS with which the other STA is associated.

4. The STA of claim 1, wherein the one or more processors is/are further configured to determine not to reset one or more parameters corresponding to a preceding network/navigation allocation vector (NAV) update caused by an apparatus with which the STA is associated, when receiving, from an overlapping basic service set (OBSS) apparatus, a message configured for or comprising information for early termination of a transmission opportunity, wherein the OBSS comprises a BSS with which the STA is not associated.

5. The STA of claim 1, wherein the one or more processors is/are further configured to initiate, in response to receiving the ULTR, transmission of a frame without considering a network/navigation allocation vector (NAV) of the STA, if a response to the ULTR comprises a block acknowledgement and a duration of the UL transmission is below a threshold value.

6. The STA of claim 1, wherein the one or more processors is/are further configured to maintain a plurality of network/navigation allocation vectors (NAVs), the plurality of network/navigation allocation vectors (NAVs) comprising a first NAV and a second NAV different from the first NAV, wherein the first NAV is adapted for frames originating from an apparatus in a BSS with which the STA is associated and the second NAV is adapted for other frames including frames originating from an apparatus in a BSS with which the STA is not associated.

7. The STA of claim 6, wherein the transceiver is further configured to receive a frame from another STA, the frame configured to update at least one of the plurality of NAVs, the received frame comprising information indicating a duration of time usable for updating a respective NAV of the STA, and wherein the one or more processors is/are further configured to update the first NAV when a basic service set (BSS) identifier (BSSID) of a BSS with which the STA is associated corresponds to a BSSID of a BSS with which the other STA is associated and update the second NAV when the BSSID of the BSS with which the STA is associated does not correspond to the BSSID of the BSS with which the other STA is associated, wherein the updating the respective NAV of the STA comprises overriding an existing duration of time of the respective NAV with the received information indicating the duration of time usable for updating the NAV, the overriding depending on a difference between the existing duration of time of the respective NAV and the received information indicating the duration of time usable for updating the respective NAV.

8. A non-transitory computer-readable medium comprising instructions that, when executed by a processing system of a station (STA), cause the processing system to:
receive a signal comprising an uplink (UL) transmission request (ULTR) configured to cause one or more STAs to transmit a signal that is configured to protect a downlink (DL) multi-user transmission to a plurality of STAs, wherein the ULTR comprises an indicator identifying a scrambling seed and information for identifying the plurality of STAs;
in response to the received signal, transmit the signal configured to protect the DL multi-user transmission to the plurality of STAs, wherein a scrambling seed associated with the transmitted signal configured to protect the DL multi-user transmission is the same as a scrambling seed associated with the received signal configured to cause the one or more STAs to transmit the signal configured to protect the DL multi-user transmission, wherein a time synchronization of the one or more transmissions by the one or more STAs is based on an end time of the received signal configured to cause the one or more STAs to transmit the signal configured to protect the DL multi-user transmission;
receive a DL multi-user transmission comprising a data packet intended for the plurality of STAs and comprising a plurality of space-time streams;
use a field included in the received data packet to determine a total number of space-time streams included in the data packet and further use the same field to select a subset of values from a set of values, the selected subset of values indicating a number of space-time streams intended for each of at least some of the plurality of STAs;
determine a value of a user position assigned to the STA and select which of the plurality of STSs in the data packet is/are intended for the STA by considering a number of STSs allocated to any other STAs assigned a user position value lower than the user position value assigned to the STA; and
process the one or more STSs in the data packet that is/are intended for the STA.

9. The non-transitory computer-readable medium of claim 8, wherein the ULTR comprises a first portion including a field common to the plurality of STAs and indicating a duration of at least a portion of the UL transmission, and a second portion including a plurality of user-specific fields indicating a description of resource allocation for UL transmission by at least some of the plurality of STAs.

10. The non-transitory computer-readable medium of claim 8, wherein the ULTR comprises information corresponding to a target received signal strength and information corresponding to a power measurement of the transmitted ULTR, wherein the non-transitory computer-readable medium further comprises instructions that, when executed by the processing system of the STA, cause the processing system to:
based on the received information corresponding to the power measurement of the transmitted ULTR, determine an amount of power loss during downlink (DL) transmission of the ULTR to the STA;
based on the determined amount of power loss during the DL transmission of the ULTR to the STA and further based on the received information corresponding to the target received signal strength, determine an amount of power for the UL transmission; and
initiate UL transmission in accordance with the determined amount of power for the UL transmission, the UL transmission comprising information corresponding to how much transmission power the STA remains capable of using relative to a transmission power currently utilized.

11. The non-transitory computer-readable medium of claim 8, wherein the non-transitory computer-readable medium further comprises instructions that, when executed by the processing system of the STA, cause the processing system to receive a frame from another STA, the frame being configured to update a network/navigation allocation vector (NAV) of the STA, and to cause the processing system to initiate UL transmission without evaluating a NAV of the STA if the NAV was set by an apparatus that transmitted the ULTR.

12. The non-transitory computer-readable medium of claim 8, wherein the non-transitory computer-readable medium further comprises instructions that, when executed by the processing system of the STA, cause the processing system to receive a frame from another STA, the frame configured to update a network/navigation allocation vector (NAV) of the STA, and to initiate UL transmission without evaluating a NAV of the STA if the other STA is in the same BSS as the STA.

13. An access point (AP) for wireless communication, the AP comprising:
a transceiver configured to:
transmit a signal comprising an uplink (UL) transmission request (ULTR) configured to cause one or more stations (STAs) to transmit a signal that is configured to protect a downlink (DL) multi-user transmission to a plurality of STAs, wherein the ULTR comprises an indicator identifying a scrambling seed and information for identifying the plurality of STAs, and in response to the transmitted signal, receive the signal configured to protect the DL multi-user transmission to the plurality of STAs, wherein a scrambling seed associated with the signal configured to protect the DL multi-user transmission is the same as a scrambling seed associated with the signal configured to cause the one or more STAs to transmit the signal configured to protect the DL multi-user transmission, wherein a time synchronization of the one or more transmissions by the one or more STAs is based on an end time of the signal configured to cause the one or more STAs to transmit the signal configured to protect the DL multi-user transmission; and one or more processors configured to:
determine to transmit a DL multi-user transmission comprising a data packet intended for the plurality of STAs and comprising a plurality of space-time streams, wherein a field included in the data packet is used to determine a total number of space-time streams included in the data packet and the same field is further used to select a subset of values from a set of values, the selected subset of values indicating a number of space-time streams intended for each of at least some of the plurality of STAs, a selection of which of the plurality of STSs in the data packet is/are intended for a STA including a consideration of a number of STSs allocated to any other STAs assigned a user position value lower than the user position value assigned to the STA, wherein the transceiver is further configured to transmit the DL multi-user transmission.

14. The AP of claim 13, wherein the ULTR comprises a field comprising a plurality of bits, wherein a first subset of the plurality of bits of the field of the ULTR determines whether one or more resources allocated to the STA is included in a primary communication channel or a non-primary communication channel, and wherein a second subset of the plurality of bits of the field of the ULTR determines a number of units of a resource(s) allocated to the STA.

15. The AP of claim 14, wherein at least some of the plurality of bits of the field of the ULTR determines an index of resources, wherein the index of resources is associated with an ordering of available resources.

16. The AP of claim 14, wherein a first range of possible values for at least some of the plurality of bits of the field of the ULTR is associated with a resource size or a number of resources that is different from another resource size or number of resources associated with a second range of possible values for at least some of the plurality of bits of the field of the ULTR.

17. The AP of claim 14, wherein at least some of the plurality of bits of the field of the ULTR is associated with a bandwidth of resources allocated to the STA and other STAs of the plurality of STAs.

18. The AP of claim 13, wherein the ULTR includes an indication indicating whether to perform carrier sensing prior to UL transmission in response to the ULTR, the carrier sensing comprising signal detection and network/navigation allocation vector (NAV) evaluation.

19. The AP of claim 18, wherein the determining whether to perform the carrier sensing prior to UL transmission in response to the ULTR comprises: not performing carrier sensing when a length or duration of the UL transmission is less than a threshold value, performing carrier sensing for at least a subchannel allocated to the UL transmission when the indication in the ULTR indicates a requirement to perform carrier sensing prior to UL transmission in response to the ULTR, and refraining from performing carrier sensing when the indication in the ULTR indicates no requirement to perform carrier sensing prior to UL transmission in response to the ULTR.

* * * * *